(12) United States Patent
Hage et al.

(10) Patent No.: US 11,551,498 B2
(45) Date of Patent: Jan. 10, 2023

(54) LOCKING SYSTEM AND METHOD FOR A MOVABLE FREIGHT CONTAINER DOOR

(71) Applicants: Joseph Hage, Huntington Beach, CA (US); Pierre Touma, Austin, TX (US); Elias Bachaalany, Halat (LB); Imad Maalouf, El Metn (LB)

(72) Inventors: Joseph Hage, Huntington Beach, CA (US); Pierre Touma, Austin, TX (US); Elias Bachaalany, Halat (LB); Imad Maalouf, El Metn (LB)

( * ) Notice: Subject to any disclaimer, the term of this patent is extended or adjusted under 35 U.S.C. 154(b) by 403 days.

(21) Appl. No.: 16/876,095

(22) Filed: May 17, 2020

(65) Prior Publication Data
US 2020/0279446 A1 Sep. 3, 2020

Related U.S. Application Data

(63) Continuation-in-part of application No. 16/271,825, filed on Feb. 9, 2019, now Pat. No. 10,713,613, which is a continuation-in-part of application No. 15/942,559, filed on Apr. 1, 2018, now Pat. No. 10,267,061.

(Continued)

(51) Int. Cl.
*G07C 9/00* (2020.01)
*E05B 39/00* (2006.01)
*H04W 4/029* (2018.01)
*E05B 13/00* (2006.01)

(52) U.S. Cl.
CPC ........ *G07C 9/00896* (2013.01); *E05B 13/002* (2013.01); *E05B 39/005* (2013.01); *H04W 4/029* (2018.02); *G07C 2009/0092* (2013.01)

(58) Field of Classification Search
CPC ........ G07C 9/00896; G07C 2009/0092; E05B 13/002; E05B 39/005; E05B 2047/0058; E05B 2047/0069; E05B 2047/0096; E05B 67/063; E05B 67/36; E05B 83/10; H04W 4/029; H04W 4/02; H04W 4/021; H04W 4/027; H04W 4/70; H04W 4/80
See application file for complete search history.

(56) References Cited

U.S. PATENT DOCUMENTS

| | | | |
|---|---|---|---|
| 4,161,870 A * | 7/1979 | Barnes | G07C 9/0073 292/DIG. 32 |
| 4,164,870 A | 7/1979 | Barnes | |

(Continued)

OTHER PUBLICATIONS

Datasheet on C-Series Padlock Single Pin that shows table of dimensions and order options.

*Primary Examiner* — Curtis J King

(57) ABSTRACT

A locking system and method for a movable freight container door comprises an electronic module and a mechanical lock element. The mechanical lock element comprises a shaft, at least of portion of which is configured to be inserted through an aperture in the electronic module, across a door handle retention region, and into a cavity in the electronic module. The shaft is securely retained in the electronic module by moving a lock mechanism to a locked position. At least one magnetic field sensor in the electronic module is used to read the position of the shaft in the cavity by sensing or not sensing one or more magnets in the shaft. A wireless communication component in the electronic module wirelessly transmits magnetic field sensor information.

20 Claims, 29 Drawing Sheets

Related U.S. Application Data

(60) Provisional application No. 62/850,546, filed on May 21, 2019.

(56) References Cited

U.S. PATENT DOCUMENTS

| | | | |
|---|---|---|---|
| 4,742,410 A * | 5/1988 | Smith | G11B 5/54 |
| 5,357,143 A * | 10/1994 | Lehr | E05B 77/54 |
| | | | 307/10.1 |
| 5,648,763 A * | 7/1997 | Long | G08B 13/22 |
| | | | 340/8.1 |
| 5,755,126 A | 5/1998 | Lanigan et al. | |
| 5,806,355 A | 9/1998 | Lanigan et al. | |
| 6,167,347 A | 12/2000 | Lin | |
| 6,259,475 B1 | 7/2001 | Ramachandran et al. | |
| 6,665,613 B2 | 12/2003 | Duval | |
| 6,747,558 B1 | 6/2004 | Thorne et al. | |
| 6,753,775 B2 | 6/2004 | Auerbach et al. | |
| 7,148,850 B2 | 12/2006 | Puente Baliarda et al. | |
| 7,202,822 B2 | 4/2007 | Puenta Baliarda et al. | |
| 7,210,316 B1 | 5/2007 | Falconer et al. | |
| 7,278,284 B1 | 10/2007 | James | |
| 7,339,473 B2 | 3/2008 | Lucas | |
| 7,411,495 B2 | 8/2008 | Auerbach et al. | |
| 7,519,463 B2 | 4/2009 | Olsen, III et al. | |
| 7,916,016 B2 | 3/2011 | Auerbach et al. | |
| 8,031,114 B2 | 10/2011 | Kellermeier et al. | |
| 8,138,917 B2 | 3/2012 | Diener et al. | |
| 8,140,265 B2 | 3/2012 | Grush | |
| 8,203,451 B2 | 6/2012 | Evans et al. | |
| 8,378,813 B2 | 2/2013 | Bannard | |
| 8,810,454 B2 | 8/2014 | Cosman | |
| 8,909,248 B2 | 12/2014 | Phillips et al. | |
| 9,013,306 B2 | 4/2015 | Koh et al. | |
| 9,177,282 B2 | 11/2015 | Stevens et al. | |
| 9,247,384 B2 | 1/2016 | Junkar et al. | |
| 9,339,224 B2 | 5/2016 | Borkholder et al. | |
| 9,349,104 B2 | 5/2016 | O'Neill et al. | |
| 9,363,636 B2 | 6/2016 | Ganesh et al. | |
| 9,369,840 B2 | 6/2016 | Alsina et al. | |
| 9,426,620 B2 | 8/2016 | Xu et al. | |
| 9,430,781 B1 | 8/2016 | Kerr et al. | |
| 9,432,068 B2 | 8/2016 | Stahlin | |
| 9,451,402 B2 | 9/2016 | Srivastava et al. | |
| 9,538,329 B1 | 1/2017 | Vivathana | |
| 9,822,558 B1 | 11/2017 | Blankenship | |
| 9,835,728 B1 | 12/2017 | Zeng | |
| 9,900,669 B2 | 2/2018 | Touma et al. | |
| 10,134,205 B2 | 11/2018 | Arena | |
| 2001/0015691 A1 * | 8/2001 | Mellen | G07C 9/00857 |
| | | | 340/8.1 |
| 2004/0041705 A1 * | 3/2004 | Auerbach | E05B 39/005 |
| | | | 340/568.1 |
| 2004/0066328 A1 * | 4/2004 | Galley, III | G06Q 10/08 |
| | | | 705/28 |
| 2004/0108938 A1 * | 6/2004 | Entrekin | G07C 9/00309 |
| | | | 340/5.73 |
| 2005/0029345 A1 * | 2/2005 | Waterhouse | E05B 47/0012 |
| | | | 235/382 |
| 2005/0134457 A1 | 6/2005 | Rajapakse et al. | |
| 2005/0179545 A1 | 8/2005 | Bergman et al. | |
| 2005/0212671 A1 * | 9/2005 | Auerbach | G07C 11/00 |
| | | | 340/539.1 |
| 2005/0263602 A1 * | 12/2005 | Lin | G06K 19/07798 |
| | | | 235/492 |
| 2008/0256991 A1 | 10/2008 | Goldman | |
| 2008/0309487 A1 * | 12/2008 | Chao | G08B 13/06 |
| | | | 340/542 |
| 2008/0315596 A1 * | 12/2008 | Terry | G09F 3/0317 |
| | | | 709/250 |
| 2009/0066503 A1 | 3/2009 | Lin | |
| 2009/0102649 A1 * | 4/2009 | Diener | G08B 13/08 |
| | | | 340/542 |
| 2009/0102650 A1 * | 4/2009 | Diener | E05B 45/06 |
| | | | 340/542 |
| 2009/0102653 A1 * | 4/2009 | McGinnis | G06Q 10/087 |
| | | | 705/28 |
| 2009/0217718 A1 * | 9/2009 | Porter | E05C 19/186 |
| | | | 292/336.3 |
| 2010/0013635 A1 * | 1/2010 | Berger | G08B 13/126 |
| | | | 340/542 |
| 2010/0170310 A1 * | 7/2010 | Ivashin | E05B 83/10 |
| | | | 70/91 |
| 2011/0018707 A1 | 1/2011 | Dobson et al. | |
| 2012/0144885 A1 | 6/2012 | Mills | |
| 2012/0293655 A1 | 11/2012 | Loughlin et al. | |
| 2013/0069776 A1 | 3/2013 | Haber | |
| 2015/0371511 A1 | 12/2015 | Miller et al. | |
| 2016/0049014 A1 | 2/2016 | Wells et al. | |
| 2016/0353239 A1 | 12/2016 | Kjellsson et al. | |
| 2018/0231664 A1 | 8/2018 | Zeng | |
| 2018/0313110 A1 | 11/2018 | Pare | |
| 2019/0027069 A1 * | 1/2019 | Meyers | G09F 3/0317 |
| 2021/0372171 A1 * | 12/2021 | Valdes Rudd | E05B 81/08 |

* cited by examiner

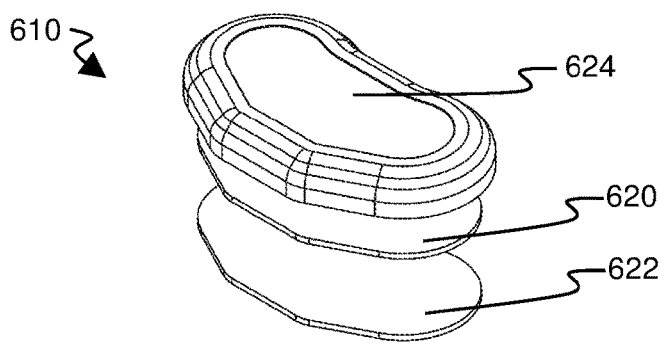
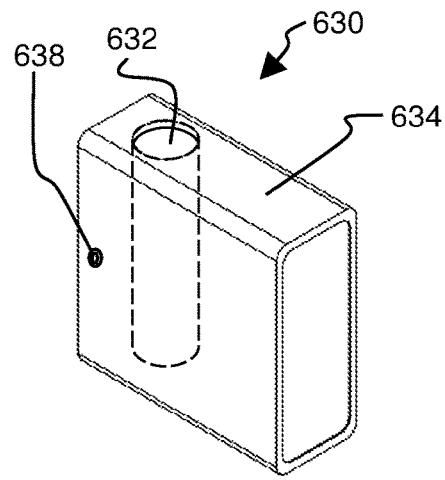
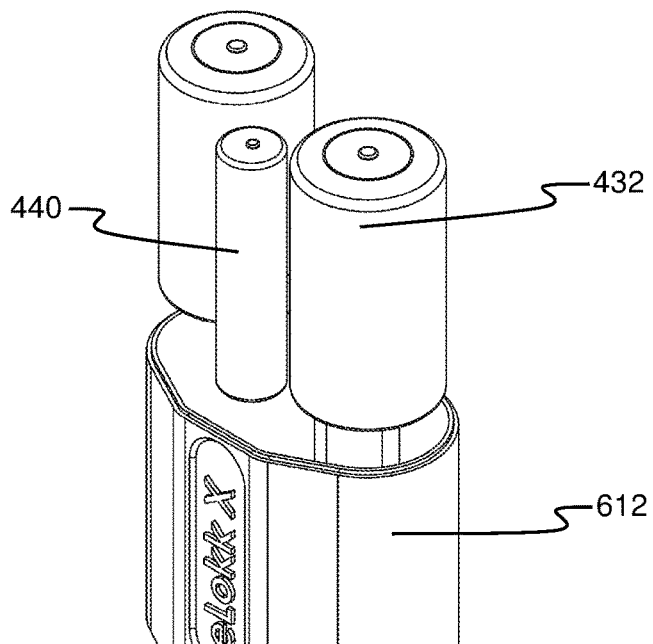
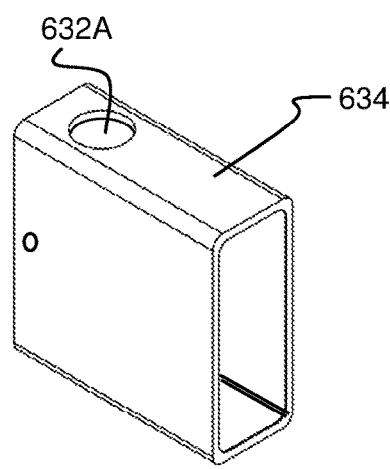
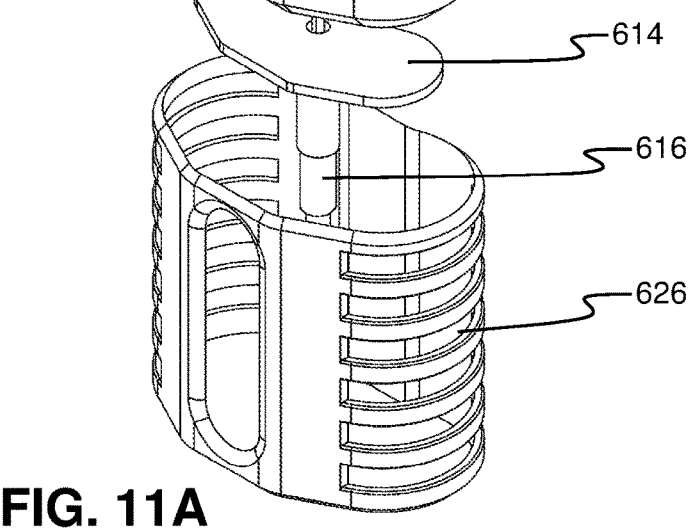
FIG. 11A
FIG. 11B
FIG. 11C
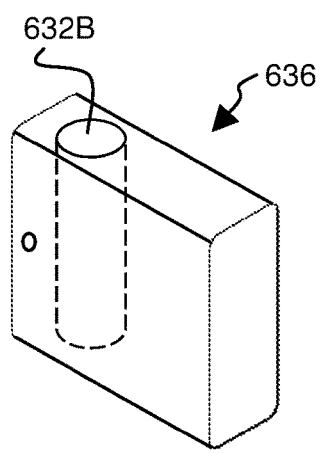
FIG. 11D

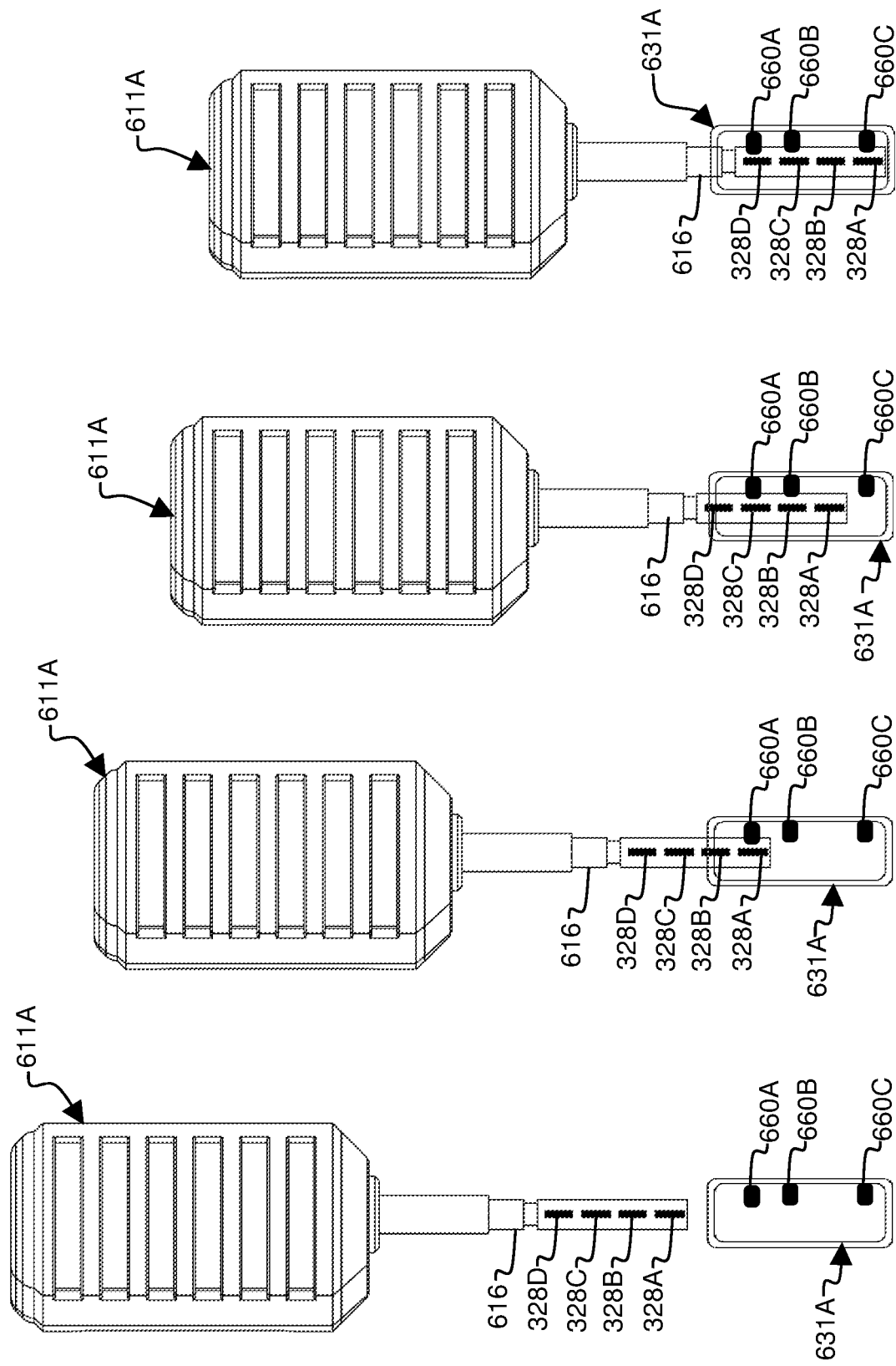

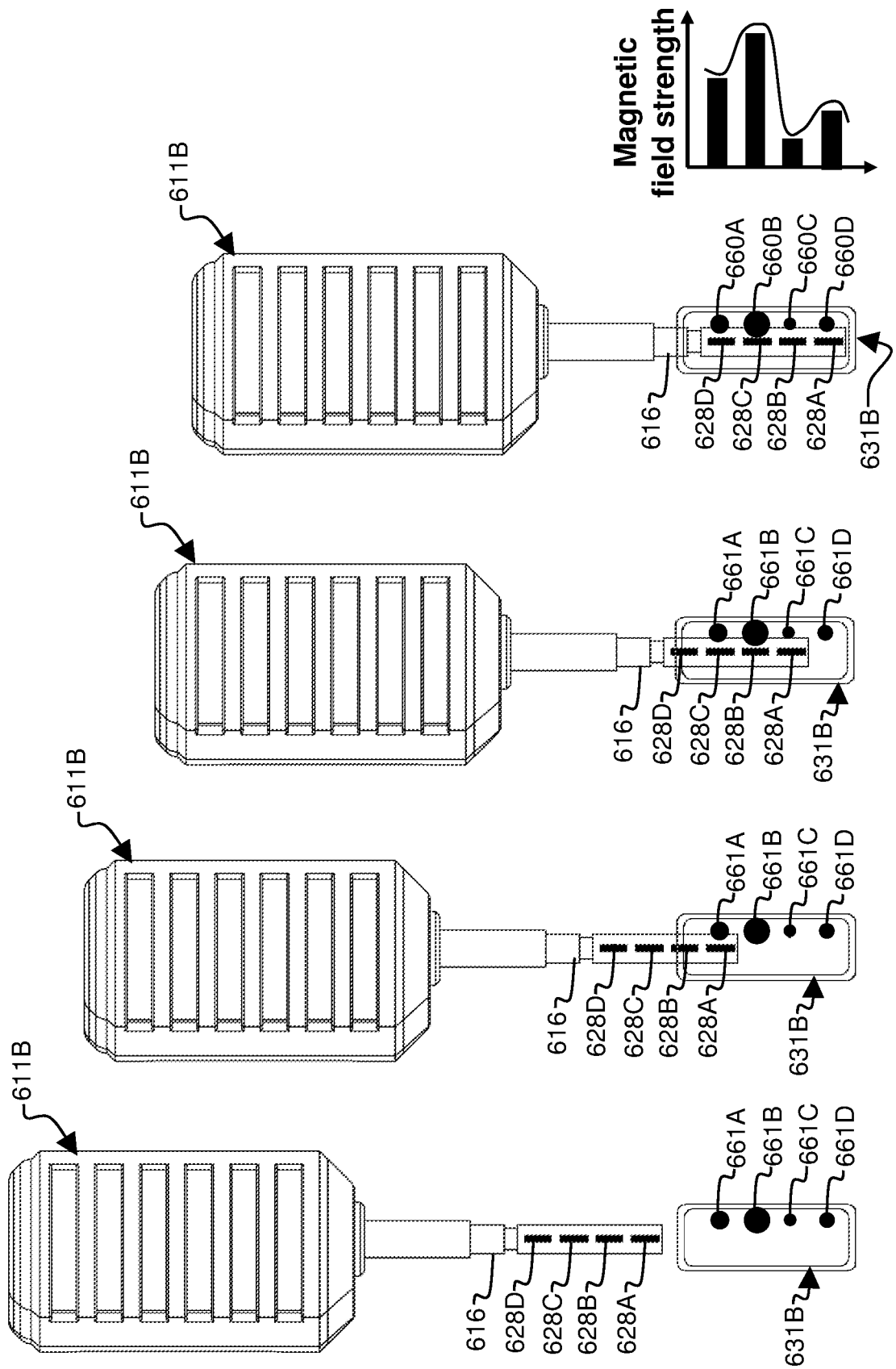

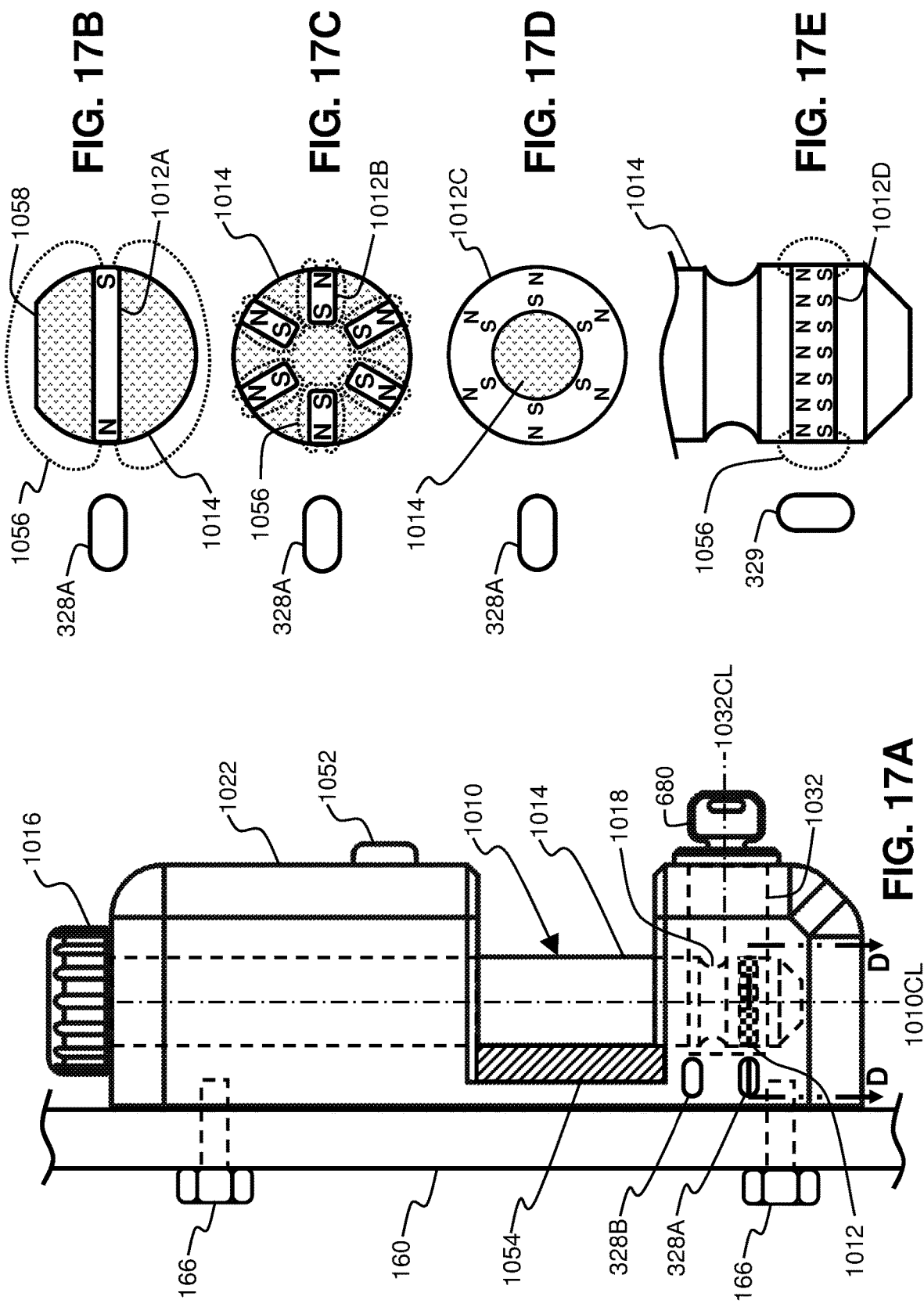

LOCKING SYSTEM AND METHOD FOR A MOVABLE FREIGHT CONTAINER DOOR

CROSS REFERENCE TO RELATED APPLICATIONS

This application is a continuation-in-part of U.S. patent application Ser. No. 16/271,825 filed 9 Feb. 2019, which is a continuation-in-part of U.S. patent application Ser. No. 15/942,559 filed 1 Apr. 2018, now U.S. Pat. No. 10,267,061, which claims benefit of U.S. Provisional Patent Application Ser. No. 62/480,983, filed 3 Apr. 2017, the entire disclosures of which are incorporated by reference herein. This application also claims benefit of U.S. Provisional Patent Application Ser. No. 62/850,546, filed 21 May 2019, which is incorporated by reference herein.

BACKGROUND

Embodiments of the present invention relate to systems and methods for electronic monitoring and/or locking of motor vehicle chassis and/or movable freight containers. This monitoring and/or locking system and/or method can comprise location tracking, geofencing, tamper detection, environmental monitoring, redundant mesh networks, redundant devices and relay controllers, and communication with locks and vehicle sensor systems.

The US Federal Bureau Investigation reported that in 2015 over $30B of cargo was lost in the USA due to theft. Theft rates can be even higher abroad. Historically, the best solution was to lock the cargo as well as possible. For additional security, it is desired to use wireless communication technologies, Global Navigation Satellite Systems (GNSS), and the Internet of Things (IoT) to track cargo location and history, in combination or in addition to a lock. This can also provide information about the location and history of a cargo.

The following is a list of desirable features for an electronic tracking, monitoring, and/or locking system or method for a vehicle chassis and/or movable freight container:

(a) The system and/or method should be as reliable as possible. For example, it should work consistently in a typical freight container environment, including exposure to a broad temperature range, moisture, humidity, shock, vibration, dirt, chemicals, and pollution.

(b) The system and/or method should report and/or record environmental exposure by, for example, recording parameters such as temperature and vibration.

(c) The system and/or method should be configured to operate for long time periods without recharging. Low power consumption, sufficient battery storage, and the capability of harvesting power while in use can be features for accomplishing this goal.

(d) The system and/or method should be tamperproof. If tampered with, the system should immediately communicate an alarm, as well as system location at the time of tampering.

(e) To reduce the possibility of tampering, the system and/or method should be secure, hidden, small, and/or unobvious.

(f) The system and/or method should track location and communicate location information back to a "base" on a regular basis.

(g) The system or method should transmit alarms when an abnormal condition occurs, such as being outside of a geographical boundary, failure or tampering with any component, loss of communication with a fixed asset, and/or any other out of normal condition.

(h) The system and/or method should be affordable, easy to manufacture, and easy to maintain.

(i) The system and/or method should integrate with industry standard communications technologies and protocols.

(j) The system and/or method should be configured to be used anywhere in the world.

(k) The system and/or method should have multi-mode communication capability with other similar systems and other vehicle systems and smart devices carried by mobile individuals, in addition to being IoT enabled.

(l) The system and/or method could incorporate optical, electro-optical and radar sensors such as cameras, lidars and radars.

BRIEF DESCRIPTION OF THE DRAWINGS

For a more complete understanding of the present invention and the advantages thereof, reference is made to the following description taken in conjunction with the accompanying drawings in which like reference numerals indicate like features and wherein:

FIG. 11A is an exploded view of the electronic module of FIG. 2C and FIG. 10A;

FIG. 11B is an isometric view of the mechanical lock module of FIG. 2C and FIG. 10A;

FIG. 11C is an isometric view of the case for the mechanical lock module of FIG. 11B;

FIG. 11D is an isometric view of the body of the mechanical lock module of FIG. 11B;

FIG. 14A an end schematic view of an alternate embodiment lock module having three magnets and an alternate embodiment electronic module having four sensors with the shaft not inserted into the lock module;

FIG. 14B shows the lock module and electronic module of FIG. 14A with a portion of the alternate embodiment shaft is partly inserted into the cavity at a position where the top magnet in the lock module is detected by the bottom magnetic sensor in the alternate embodiment shaft;

FIG. 14C shows the lock module and electronic module of FIG. 14A with the alternate embodiment shaft portion inserted into the cavity at a position where the top magnet in the lock module is detected by the second from the top magnetic sensor in the shaft;

FIG. 14D shows the lock module and electronic module of FIG. 14A when the alternate embodiment shaft portion is fully inserted;

FIG. 15A is a second alternate embodiment lock module having four magnets of different field strengths and a second alternate embodiment of the electronic module having four sensors configured to convert detected magnetic field strengths to analog electrical values;

FIG. 15B shows the lock module and electronic module of FIG. 15A with the shaft partly inserted to a position where the top magnet is detected by the bottom sensor in the shaft;

FIG. 15C shows the lock module and electronic module of FIG. 15B with the shaft further inserted to a position where the top magnet is detected by the second from the top sensor in the shaft;

FIG. 15D shows the lock module and electronic module of FIG. 15A with the shaft fully inserted;

FIG. 15E shows a graph of the magnetic field strength of the four magnets in FIG. 15D that is detected by the four sensors in FIG. 15D;

FIG. 17A is a left side view of the lock embodiment shown in FIG. 1;

FIG. 17B shows FIG. 17A section D-D in an embodiment with one transverse magnet;

FIG. 17C shows FIG. 17A section D-D in an embodiment with multiple radial magnets;

FIG. 17D shows FIG. 17A section D-D in an embodiment with one toroidal magnet;

FIG. 17E shows the end of a lock pin shaft and magnetic sensor for an embodiment with one axial magnet;

Figure 1:
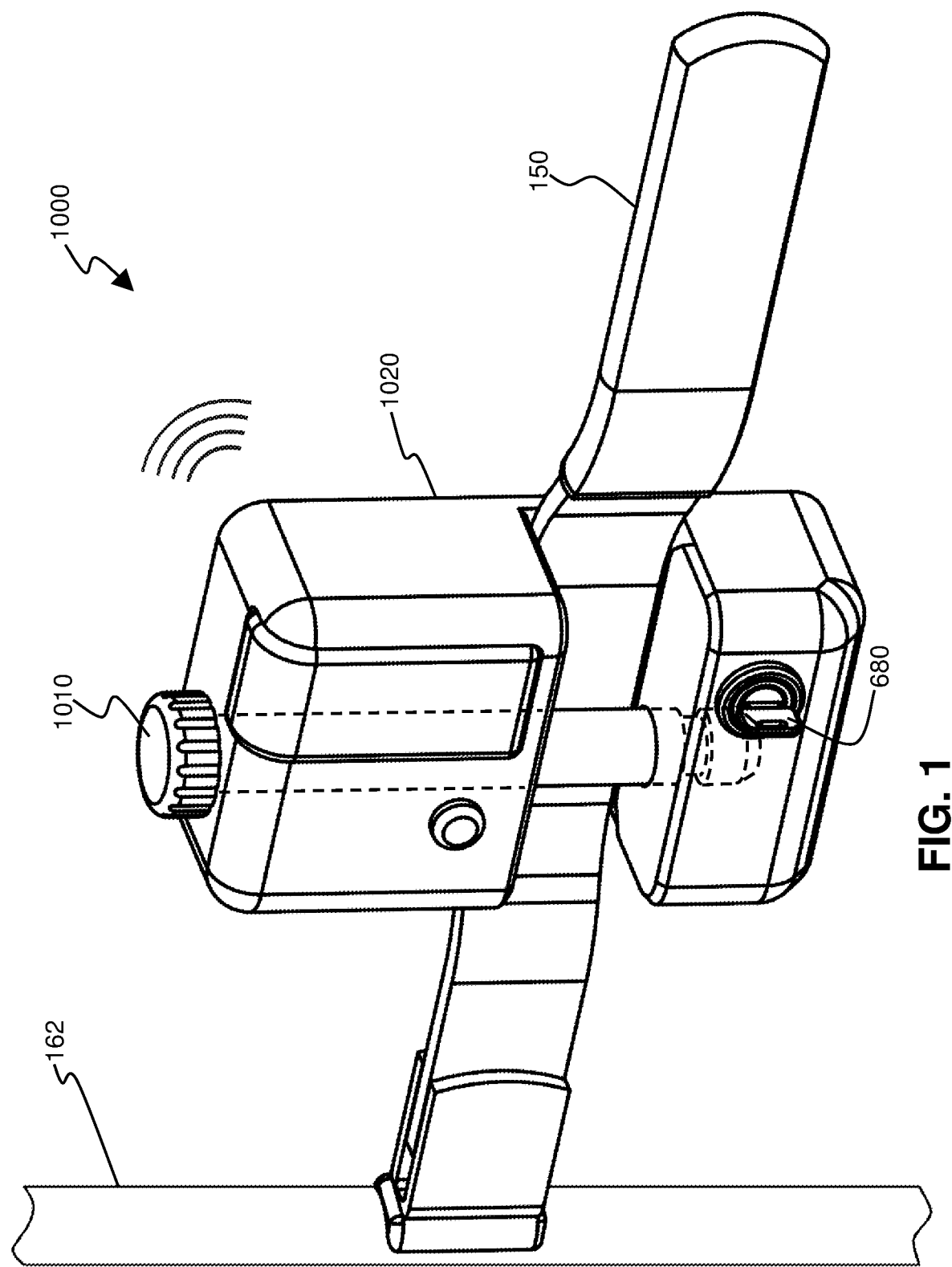
FIG. 1 shows one embodiment an electronic lock for a movable freight container.

It should be understood that the drawings are not necessarily to scale. In certain instances, details that are not necessary for an understanding of the invention or that render other details difficult to perceive may have been omitted. It should be understood that the invention is not necessarily limited to the particular embodiments illustrated herein.

DETAILED DESCRIPTION

The ensuing description provides preferred exemplary embodiment(s) only, and is not intended to limit the scope, applicability or configuration of the disclosure. Rather, the ensuing description of the preferred exemplary embodiment(s) will provide those skilled in the art with an enabling description for implementing a preferred exemplary embodiment.

It should be understood that various changes could be made in the function and arrangement of elements without departing from the spirit and scope as set forth in the appended claims. Preferred embodiments of the present invention are illustrated in the Figures, with like numerals being used to refer to like and corresponding parts of the various drawings. Specific details are given in the following description to provide a thorough understanding of the embodiments. However, it will be understood by one of ordinary skill in the art that the embodiments may be practiced without these specific details.

1. Definitions

For purposes of describing embodiments of the invention and claims, a movable freight container (hereinafter a "container") is defined as any storage unit configured to be filled with cargo, closed, and transported. Examples of movable freight containers include, but are not limited to, a sealable delivery truck cargo compartment, a motor vehicle freight trailer, an intermodal freight container, a railway wagon, and a unit load device for air freight. Movable freight containers are typically sealed, and often locked. The term "cargo trailer" is a synonym for any movable freight container that can be pulled behind a motor vehicle.

For purposes of describing embodiments of the invention and claims, an electronic tracking and monitoring module (hereinafter also called a "tracking module") is defined as an electronic module: (a) comprising sensors; (b) configured to determine position; and (c) configured to communicate position information. Such a tracking module could be part of a vehicle tail light and/or a lock. Such a tracking module could be part of any other device that is used with a container and has the functionality described herein.

For purposes of describing embodiments of the invention and claims, navigation system receivers are devices configured to determine position in response to electromagnetic signals from a plurality of transmitters. One example of a navigation system receiver is a device that receives electromagnetic signals from a plurality of Global Navigation Satellites such as the Global Positioning System (GPS) deployed by the US, the European Galileo, the Chinese BeiDou-2, or the Russian GLONASS system to determine a position from these electromagnetic signals. Navigation system receivers can also be devices configured to use triangulation techniques from terrestrial-based radio transmitters to determine a position.

For purposes of describing embodiments of the present invention and claims, digital cellular communication units are devices configured to communicate digital information to and from the cellular telephone network using electromagnetic signals. Such communication could be with terrestrial cellphone towers, with cellular satellite systems, or with any other infrastructure configured for communication with cellular phones or similar devices.

For purposes of describing embodiments of the present invention and claims, low power mesh communications units are devices for communicating digital information over distances of 100 meters or less at power levels that facilitate low power consumption. Such low power mesh communications units can incorporate IoT (internet of things) technology such as Bluetooth Low Energy, ZigBee, 6LoWPAN, Z-Wave, IoT over near field communications, Sigfox, Neul, and/or LoRa.

For purposes of describing embodiments of the present invention and claims, an electronic fusion filter is defined as an electronic computational process that compares actual and predicted angle and/or position information from multiple sensors to generate a more accurate measurement than could be obtained from using a single sensor and a single position measurement. Examples of fusion filters include Kalman filters, Madgwick filters, and Mahoney filters as will be further described further in this document.

2. Overview of One Embodiment of the System and Method

Figure 2:
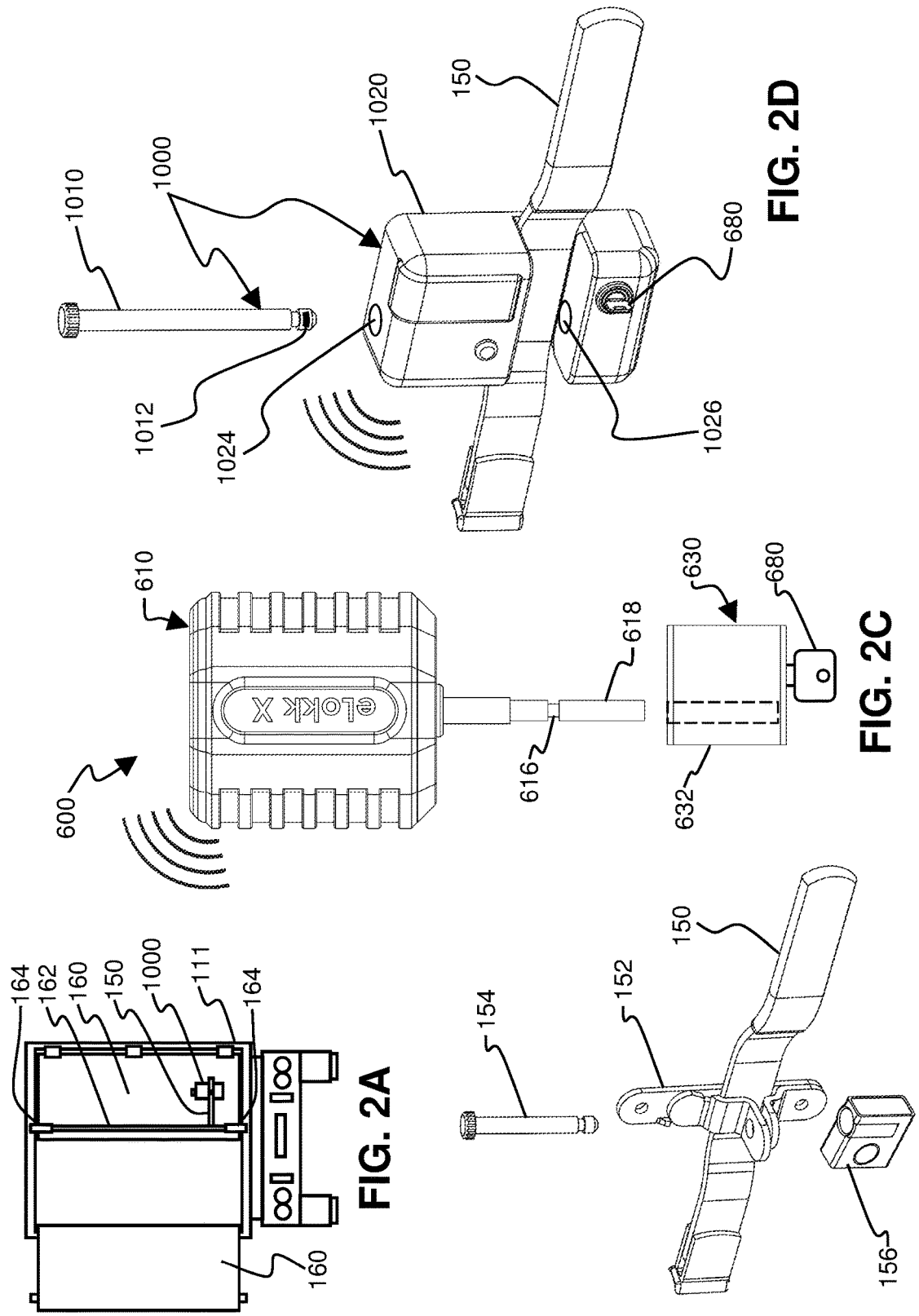
FIG. 2A shows the rear doors of a movable freight container.
FIG. 2B shows a prior art lock for a movable freight container.
FIG. 2C shows another embodiment of an electronic lock for a movable freight container.
FIG. 2D shows the embodiment of FIG. 1 with the pin removed.

FIG. 1, FIG. 2A, and FIG. 2D illustrate an embodiment of the present invention as a system and method for a movable freight container door. This system/method, shown at 1000 in these drawings, can comprise some or all of the following elements and functionality:
 (a) The system and/or method can be attached to a movable freight container door as shown in FIG. 2A.
 (b) The system and/or method can comprise an electronic lock module, 1020 in FIG. 1 and FIG. 2D, and a mechanical lock element (lock pin), shown at 1010.
 (c) The system and/or method can be configured to securely retain a freight container door handle (shown at 150 in FIG. 1, FIG. 2A and FIG. 2D) by having at least a portion of the shaft of the lock pin 1010 go through an aperture (also known as a through hole), as shown at 1024 in FIG. 2D, across a door handle retention region (shown at 1054 in FIG. 17A) and into a cavity, as shown at 1026 in FIG. 2D, of the electronic lock module 1020. FIG. 1 and FIG. 2A show that the door handle 150 is attached to a vertical cam action lock rod 162. This lock rod 162 is rotated into a position that secures the freight container door when the door handle 150 is secured in the lock system 1000 by the mechanical lock element shaft when this shaft has been secured in the electronic lock module 1020. The door handle retention region comprises a slot between portion of the electronic lock module with the through hole 1024 and the portion of the electronic lock module with the cavity 1026 and is between the pin 1010 and the part of the electronic lock module 1020 closest to the door. The door handle retention region can also be described as being between the pin (or mechanical lock element) 1010 and the door of the movable freight container (or truck trailer door) to which the lock system is attached.
 (d) The mechanical lock element 1010, can comprise at least one magnet, shown at 1012 in FIG. 2D. This magnet (or multiple magnets) 1012 can engage with one or more magnetic field sensors that can be located in the electronic lock module 1020.
 (e) The electronic lock module 1020 can comprise a processing component responsive to the magnetic field sensor or sensors, and a communication component that transmits magnetic sensor information.
 (f) The system and/or method could be part of an electronic chassis monitoring system, such as the system of FIG. 3 and/or a movable freight container monitoring system, such as the systems of FIG. 4A, FIG. 4B, FIG. 5A, FIG. 5B, FIG. 23, or FIG. 24.
 (g) The system/method could use any elements, connections, process steps, described in this document or capable of being understood by anyone skilled in the art.

3. Further Descriptions of Embodiments and Variations

Figure 4A:
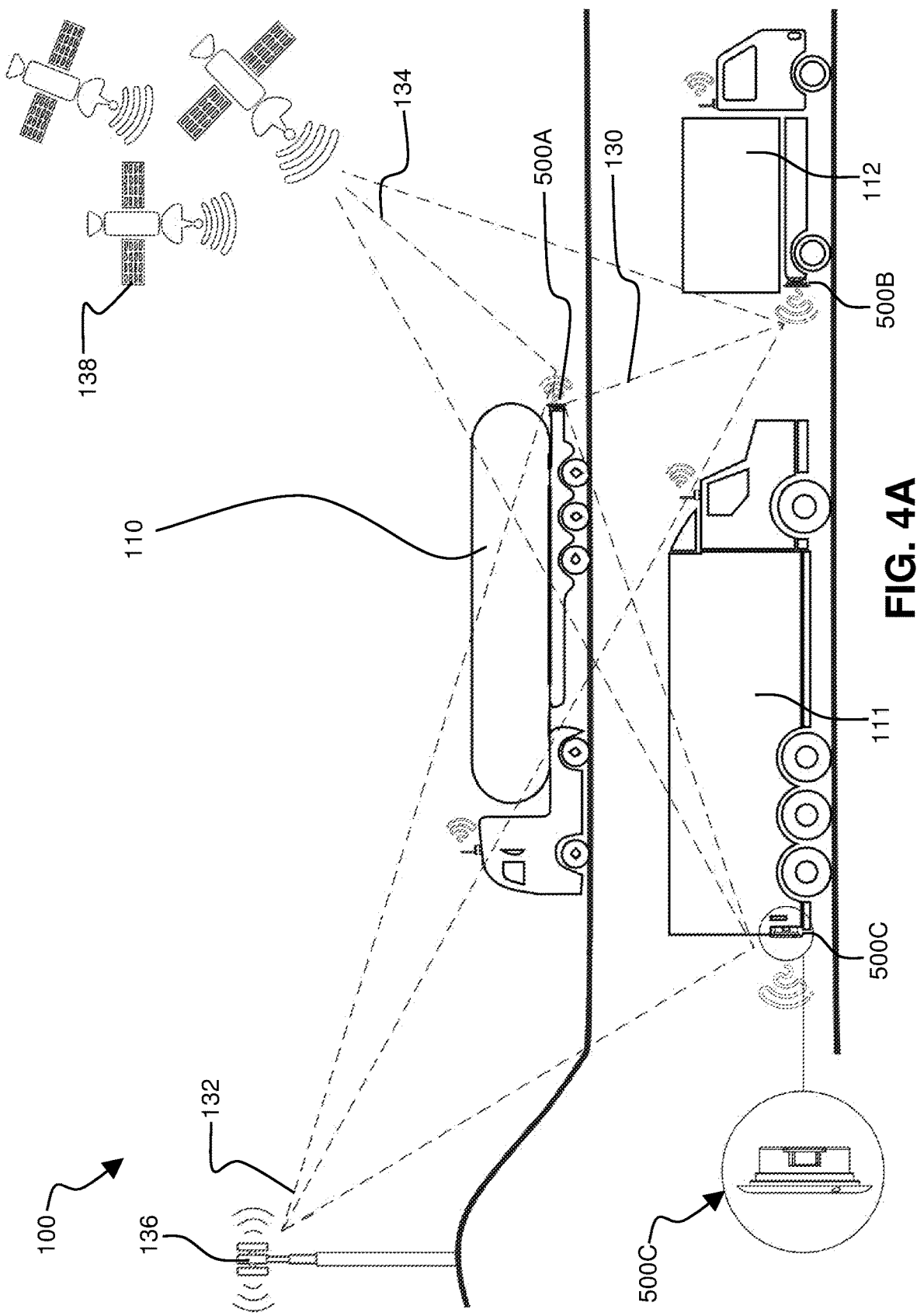
FIG. 4A shows a freight container tracking system using devices hidden in light fixtures.
Figure 4B:
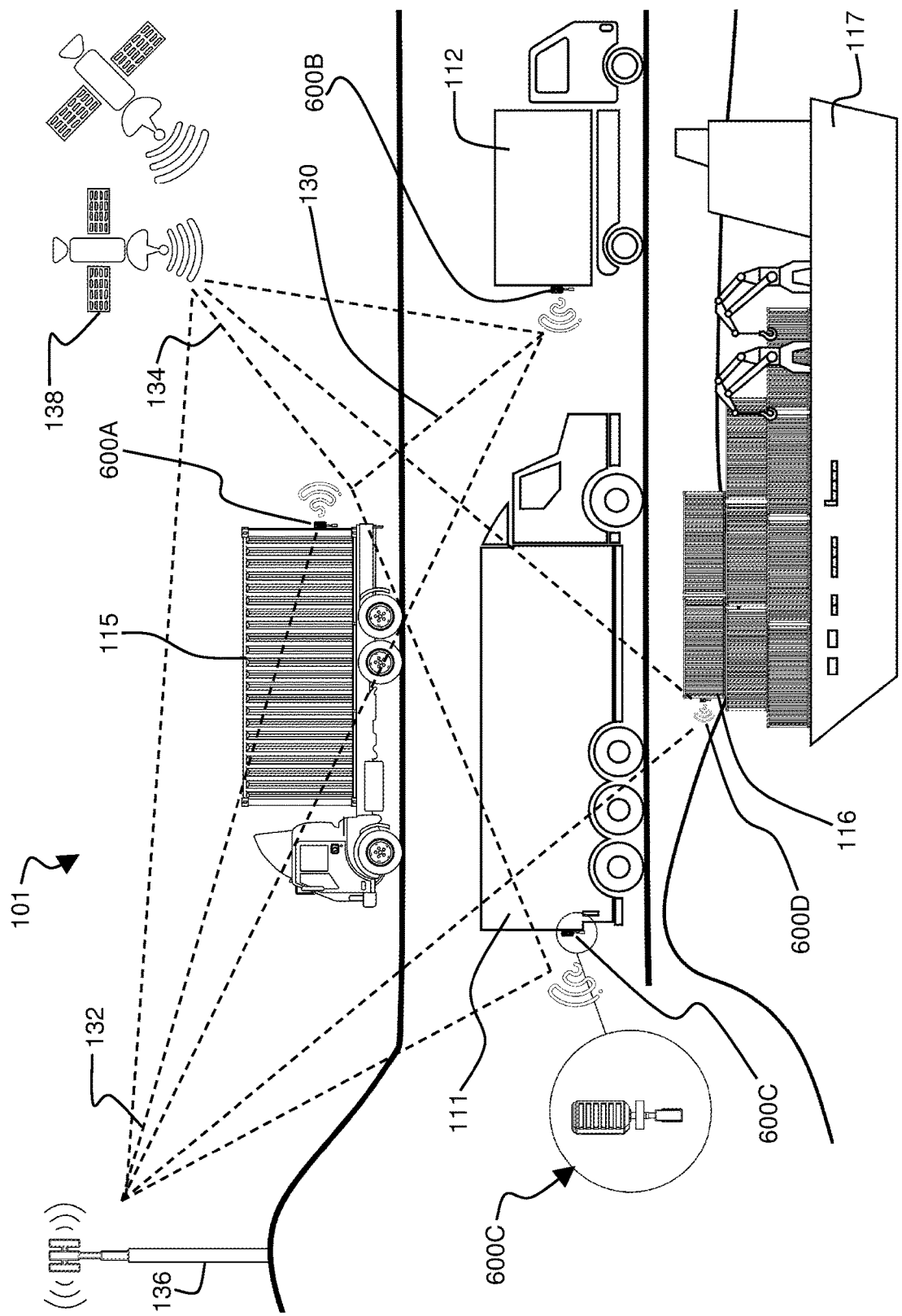
FIG. 4B shows a freight container tracking system using electronic locks.

FIG. 2A shows the rear doors of a typical movable freight container—in this case, a cargo truck 111 similar to that shown in FIG. 4B. The movable freight container 111 has two doors, shown at 160, one of which is open and the other is closed. Each door 160 can be secured by a rotating vertical cam action lock rod 162 that is engaged in braces 164, near the top and bottom of each vertical rod 162. Each vertical rod 162 can be rotated into a secure position by a door handle, shown at 150. In the embodiment shown in FIG. 2A, the door handle 150 is secured by the electronic tracking and monitoring lock 1000 that has been securely attached to the door 160 using metal fasteners through the door.

FIG. 2B shows the typical configuration of a prior art movable freight container door locking system. The system comprises the door handle 150, a hasp 152, a lock pin 154, and a prior art mechanical lock module 156. The door handle 150 is typically attached to the cam action lock rod that was shown at 162 in FIG. 1 and FIG. 2A. The hasp 152 is typically attached to the door of the movable freight container.

FIG. 2C shows an alternative embodiment of an electronic lock for a movable freight container at 600. This lock is also shown at 600 in FIG. 3 and at 600A, 600B, 600C, and 600D in FIG. 4B. More specifically, FIG. 2C shows an exploded front view of this lock 600. Referring to FIG. 2C, the lock 600 comprises an electronic module, shown at 610, and a mechanical lock module, shown at 630. FIG. 2C also shows a mechanical key 680 inserted in the mechanical lock module 630. This mechanical key 680 can be part of the system and method used to secure the mechanical lock module 630 to the electronic module 610, as well as allowing the mechanical lock module 630 to be user attached to and detached from the electronic module 610. It can be understood that the electronic lock module 600 in FIG. 2C can replace the prior art mechanical lock module 156 and lock pin 154 that are shown in FIG. 2B. Further details of this lock electronic lock are described later in this document.

FIG. 1 and FIG. 2D show another embodiment of an electronic lock for a movable freight container at 1000. As previously described, the electronic tracking and monitoring lock embodiment 1000 shown in FIG. 2D comprises a mechanical lock pin 1010 and an electronic lock module 1020. Unlike the alternate embodiment shown at 600 in FIG. 2C, the embodiment shown at 1000 in FIG. 1 and FIG. 2D has the mechanical locking functionality integrated in the electronic lock module 1020, with the mechanical lock mechanism key 680 going into the electronic lock module 1020. The electronic lock module 1020 comprises the cavity 1026 in in the embodiment shown in FIG. 2D. The electronic lock module 610 comprises the pin in the alternate embodiment of FIG. 2C. The lock embodiment 1000 of FIG. 2D could substitute for the lock 600 of FIG. 2C in the systems shown and described anywhere in this document including FIG. 3, FIG. 4B, FIG. 5B, FIG. 7, FIG. 23, and FIG. 24.

Figure 3:
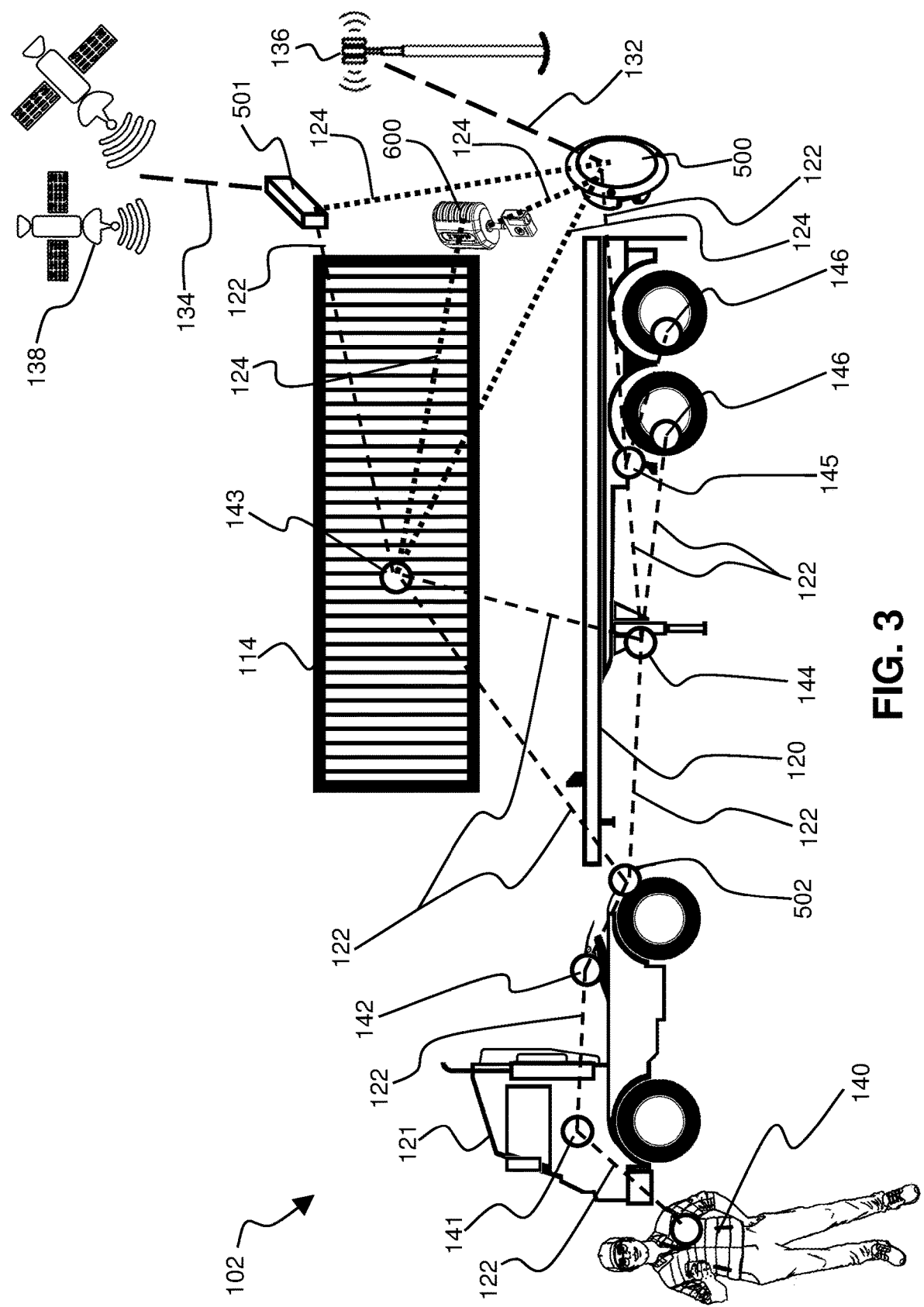
FIG. 3 shows a motor vehicle chassis monitoring network comprising a at least one electronic lock and at least one wireless tracking device hidden in a light fixture.

Further referring to the illustrations, FIG. 3 shows a motor vehicle chassis monitoring network. The vehicle monitoring network illustrated in FIG. 3 is configured for intra-vehicle communication using a plurality of communication connections shown as dotted lines. Some of these intra-vehicle communication connections could be CAN bus 1 or CAN bus 2 or similar communication connections 122. As used in this document, CAN stands for the controller area network that is typically used in vehicles and is documented in International Standards Organization (ISO) standard 11898 and related standards. In addition to the CAN bus, these intra-vehicle communication connections 122 could use any other communication method or protocol described herein or capable of being understood by anyone skilled in the art. FIG. 3 shows examples of these intra-vehicle communication connections 122 connecting a plurality of sensor and/or communication nodes that can include:

(a) User-wearable nodes, such as the vehicle driver identification, sensor, and/or communication node shown at 140;

(b) Nodes mounted on a motor vehicle tractor 121, such as the motor vehicle tractor identification, sensor and/or communication node shown at 141, the fifth-wheel sensor and/or communication node shown at 142, and the motor vehicle tractor taillight sensor and/or communication node shown at 502;

(c) Nodes mounted on a movable freight container 114, such as the movable freight container sensor and/or communication node shown at 143, and the electronic tracking and/or monitoring device hidden in a marker light shown at 501 (which can also be called a smart remote GPS antenna); and/or (d) Nodes mounted on a freight vehicle trailer 120, such as the freight vehicle landing gear sensor and/or communication node shown at 144, the freight vehicle braking system sensor and/or communication node shown at 145, the tire sensor and/or communication nodes shown at 146; and/or the electronic tracking and/or monitoring device hidden in a vehicle tail light shown at 500. For example, having a connection to the tire sensor and/or communication node would allow monitoring of tire pressure and detection of tire theft.

The vehicle monitoring network 102 shown in FIG. 3 also comprises wireless mesh network communication connections shown at 124. The wireless mesh communication connections 124 can be used between any of the nodes previously identified for the intra-vehicle communication connections shown at 122 (which are typically, but not always wired connections), and vice-versa, the intra-vehicle communication connections 122 can substitute for the wireless mesh communication connections 124 shown in FIG. 3. It is also possible for there to be both wireless mesh network communication connections 124 and intra-vehicle communication connections 122 between the same pair of nodes. In FIG. 3, the wireless mesh network communication connections 124 are shown between the following nodes:

(a) The movable freight container sensor and/or communication node 143 and an electronic tracking and monitoring lock 600;

(b) The movable freight container sensor and/or communication node 143 and the electronic tracking and or monitoring device hidden in a vehicle taillight 500;

(c) The movable freight container sensor and/or communication node 143 and the electronic tracking/monitoring device in the marker light 501 (smart remote GPS antenna); and (d) The electronic tracking and or monitoring device hidden in a vehicle taillight 500 and the electronic tracking device hidden in the marker light 501 (smart remote GPS antenna).

The vehicle monitoring network 102 shown in FIG. 3 further shows, at 134, a communication connection between the electronic tracking device in the marker light 501 (smart remote GPS antenna) and positioning satellites 138. Additionally, the vehicle monitoring network 102 shown in FIG. 3 shows, at 132, a communication connection between the electronic tracking/monitoring device in the vehicle taillight 500 and a cellphone communication tower 136. Regarding FIG. 3, it should be noted that:

(a) Embodiments of the invention can incorporate any combination of the above attributes in any combination/configuration capable of being understood by anyone skilled in the art.

(b) The interface between the intra-vehicle (CAN bus) and the wireless mech network could be made using a bridge device that connects to an OBD (on-board diagnostics) connector typically found in vehicles. This bridge device could use power available at the OBD connector to convert CAN bus protocols to a wireless mesh protocols and vice-versa.

Figure 7:
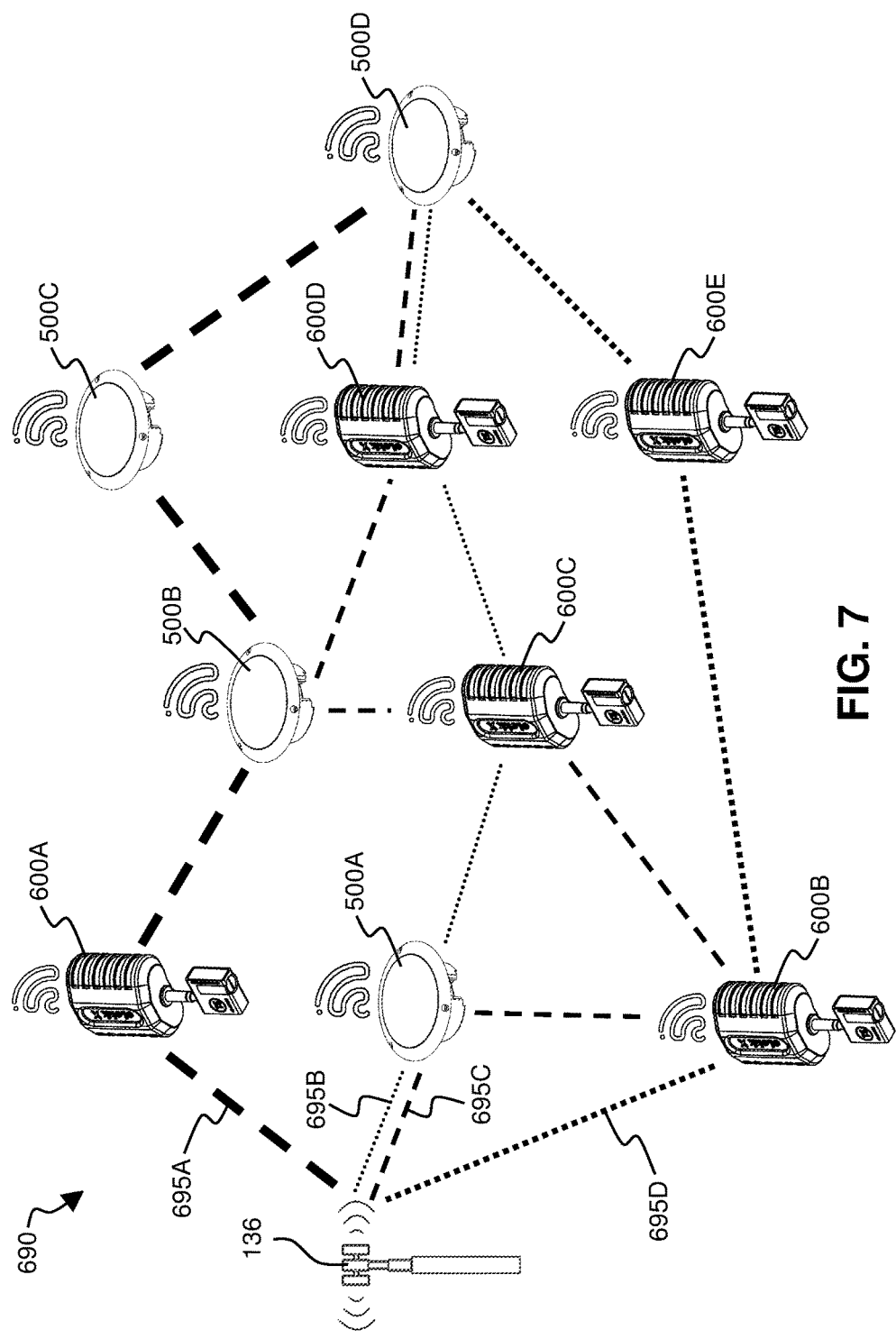
FIG. 7 illustrates a mesh network used as part of the systems of FIG. 3 through FIG. 5B.

(c) The intra-vehicle connections 122 and wireless mesh network connections 124 could be used to communicate between any of the aforementioned nodes and any other node in the network and that such connections can be redundant connections as will be further described herein with reference to FIG. 7.

(d) The systems and methods described herein are not limited to the sensors and/or communication nodes illustrated in FIG. 3, but can include any sensors and/or communication variety of sensors and/or communication nodes capable of being understood by anyone skilled in the art including, but not limited to fuel tank level sensors, oil pressure sensors, load sensors, vehicle speedometers, etc.

FIG. 4A shows a movable freight container electronic tracking and monitoring system 100 that uses an electronic tracking and monitoring device hidden in a vehicle tail light fixture. In FIG. 4A, such tail light fixtures are shown at 500A, 500B, and 500C. The tail light fixture 500A could be attached to a truck trailer of the type shown at 110. The tail light fixture 500C could be attached to a cargo truck 111. The tail light fixture 500B could be attached to a local delivery vehicle 112. The tail light fixture could be attached to a freight vehicle trailer as was shown at 120 in FIG. 3. The tail light fixture 500A could receive information from positioning satellites 138 such as those used for the Global Positioning System (GPS) maintained by the United States, the European Galileo, the Chinese BeiDou-2, or the Russian GLONASS system. This communication connection between the tail light fixture 500A and the positioning satellites 138 is shown at 134. The tail light fixture 500A could also communicate wirelessly and bi-directionally with a terrestrial system such as the communication tower shown at 136, through a wireless communication connection shown at 132. The terrestrial wireless communication tower 136 could communicate using a mobile phone protocol. The terrestrial wireless communication tower 136 could communicate using an IoT (Internet of Things) communication systems and method, such as Bluetooth Low Energy, ZigBee, 6LoWPAN, Z-Wave, IoT over near field communications (NFC), Sigfox, Neul, and LoRa. This IoT technology could use the Message Queuing Telemetry Transport (MQTT) protocol. There could be multiple and redundant communications towers, one or more of which use a mobile phone technology and one or more of which use an IoT technology. The tail light fixture 500A on one vehicle could also communicate with a tail light fixture on another vehicle 500B through a wireless interfleet (or inter-vehicle) communication connection 130. More generally, a tail light fixture on one vehicle could also communicate with the communications system of other vehicles on the road with similar capability, including self-driven vehicles and the communications systems of fixed assets and fixed structures including trucks and containers scanners, borders barriers, toll systems and similar road and highway assets and structures.

FIG. 4B shows an alternate movable freight container electronic tracking and monitoring system 101. The alternate system 101 uses one or more locks that are also electronic tracking and monitoring device(s), as shown at 600A, 600B, 600C, and 600D. The electronic lock 600A could be used to secure a truck-mounted container 115. The electronic lock 600B could be used to secure a cargo compartment of a local delivery vehicle 112. The electronic lock 600C could be used to secure a cargo compartment of a cargo truck 111. The electronic lock 600D could be used to secure a container 116 on a ship 117, or a container, 114 in FIG. 3, on a freight vehicle trailer, 120 in FIG. 3. The electronic lock could be used to secure any container at a temporary storage facility (not shown) and more generally any movable storage container located anywhere.

Further referring to FIG. 4B in view of FIG. 4A, the communication connection with a positioning satellite 134, the communication connection with a tower 132, and the communication connection between electronic devices 130 can operate in a fashion similar to what was described for the system shown in FIG. 4A. The positioning satellite or satellites 138 and communication tower or towers 136 can also be similar to those described with reference to FIG. 4A. It is also possible to combine any element of the system shown in FIG. 3 and FIG. 4A with the system shown in FIG. 4B and vice versa.

Figure 5A:
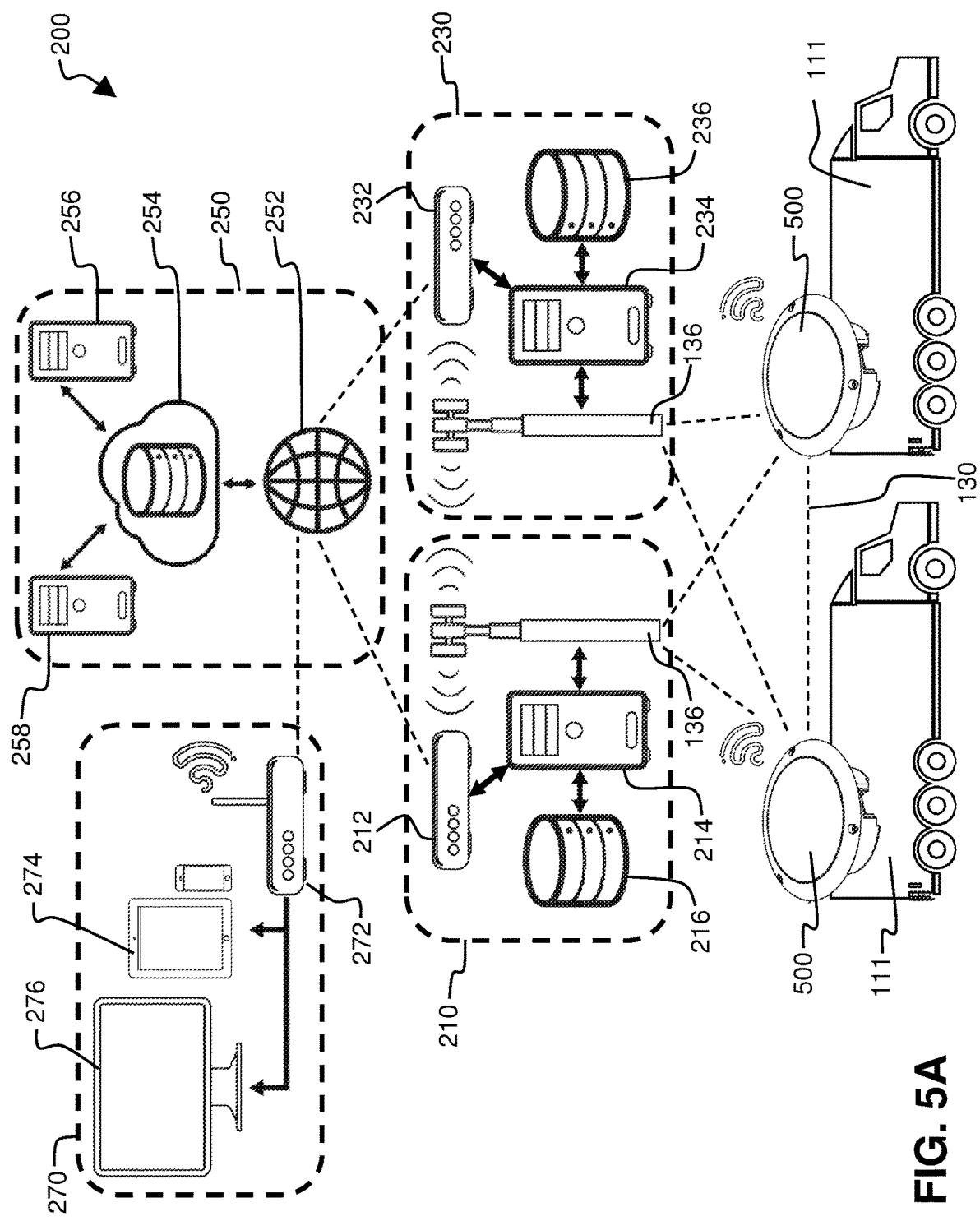
FIG. 5A shows a network topology for the system of FIG. 4A.

FIG. 5A shows a network topology for electronic tracking of movable freight containers 200 in which cargo trucks 111 with tail lights 500 communicate with one or more communication towers 136 and each other 130. In the embodiment shown in FIG. 5A, the cargo trucks 111 can communicate with both a cellular (i.e. mobile phone) network 210 and an IoT network 230. The cellular network 210 can comprise communications tower(s) 136, a cellular network modem 212, a cellular network server 214, and a cellular network database 216. The IoT network 230 can comprise one (or more) communications tower(s) 136, an IoT network modem 232, an IoT network server 234, and an IoT network database 236.

Further referring to FIG. 5A, the cellular network 210 can communicate with a cloud server 250 through a cellular network modem 212 that connects the cellular network server 214 to the internet 252. Similarly, the IoT network 230 can communicate with the cloud server 250 through an IoT network modem 232 that connects the IoT network server 234 to the internet 252. The cloud server 250 can further comprise a cloud (i.e. internet) database 254, a cloud analysis server 256, and a cloud data collection server 258.

The embodiment shown in FIG. 5A can also comprise a remote access module 270 that can include a remote access modem 272 configured for communication with the cloud server 250 via the internet 252. The remote access module 270 can include a mobile device interface 274 configured for connection to devices such as a tablet computer or a smart phone. The remote access module 270 could also have a computer device interface 276 configured for connection to a computer such as a laptop or desktop that has a keyboard, graphical user interface, mouse, etc. The remote access module 270 could be used for reporting data from the tail lights 500, programming the tail lights 500, and/or other functions that will be further described in other parts of this document.

The cellular network server 214 and database 216 can be used to process and store data received from the tail light fixtures 500 and/or the IoT network server 234 and database 236 can be used to process and store data received from the tail light fixtures 500. Here are examples of the type of data that could be stored and the structure of this data:

| Device ID | Datatype | Value | Time Stamp (YYYY-MM-DD-HH-MM-SS) |
| --- | --- | --- | --- |
| eCAT-958 | Position | 32.2588°, 50.3698°, 150 m E | 20171206181223 |
| eCAT-958 | Impact | True | 20171209180738 |
| eCAT-958 | PCB temperature | 80° F. | 20171209180738 |

-continued

| Device ID | Datatype | Value | Time Stamp (YYYY-MM-DD-HH-MM-SS) |
|---|---|---|---|
| eCAT-958 | Truck temperature | 76° F. | 20171209180738 |
| eCAT-958 | Tire pressure | 26 PSI | 20171209180738 |
| eCAT-958 | Truck ID | 12584889 | 20171209180738 |
| eCAT-958 | Tire FL ID | 25842287 | 20171209180738 |
| eCAT-958 | Speed | 45 miles/hour | 20171209180738 |
| eCAT-958 | Battery2 voltage | 3.5 V | 20171209180738 |

Figure 5B:
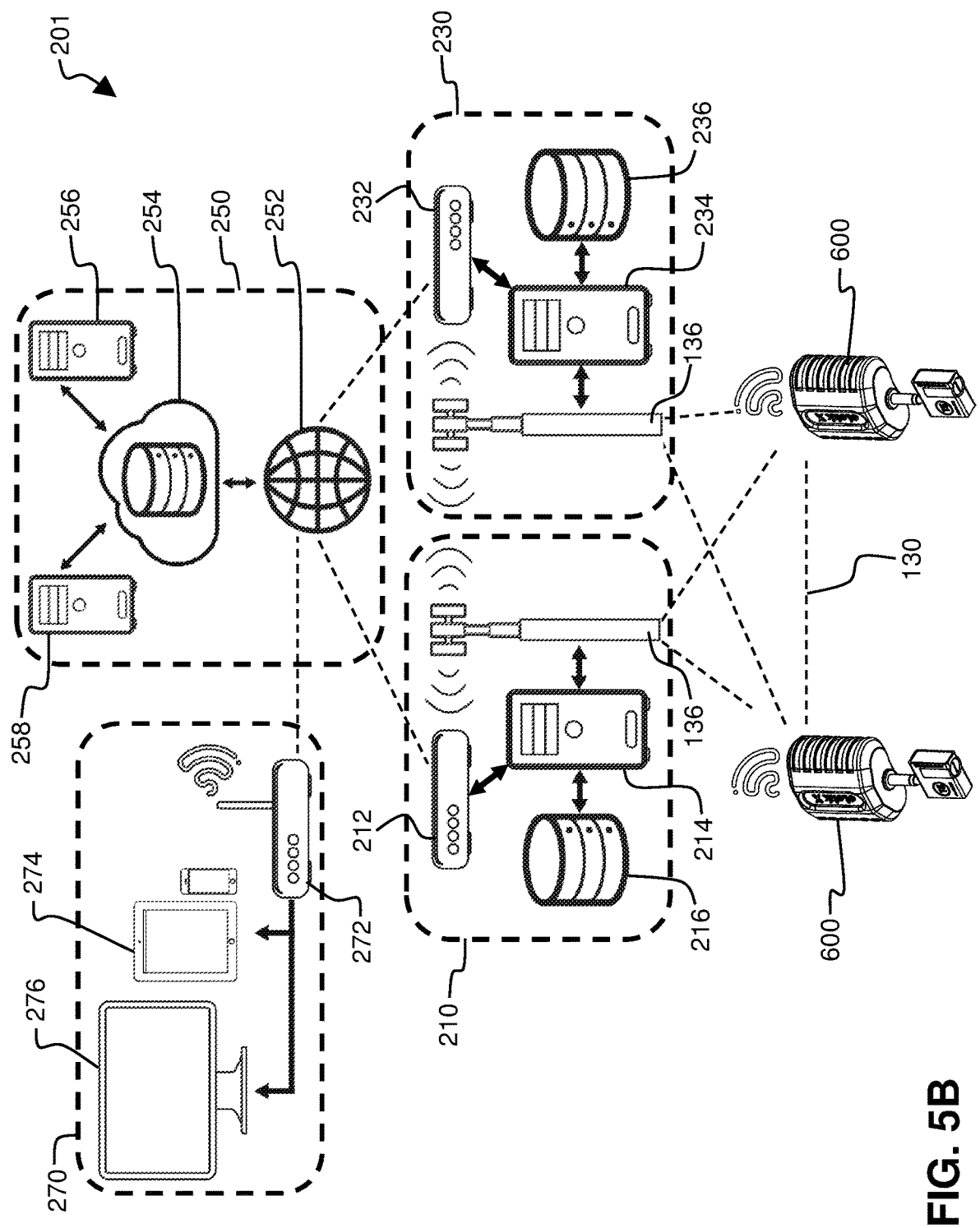
FIG. 5B shows a network topology for the system of FIG. 4B.

FIG. 5B shows an alternate network topology for electronic tracking of movable freight containers in which one or more electronic tracking and monitoring locks 600 communicate with one or more communication towers 136 and with each other 130. In the embodiment shown in FIG. 5B, the electronic locks 600 can communicate with both a cellular (or mobile phone) base station 210 and an IoT base station 230 and this communication and the other elements shown in FIG. 5B serve the same functions as the similarly numbered elements that were shown and described with reference to FIG. 5A. It is also possible to combine any element of the systems shown in FIG. 3, FIG. 4A, FIG. 4B and FIG. 5A with the system shown in FIG. 5B and vice versa. The system can also be configured so that any device such as any lock shown at 600 or any tail light shown at 500 could be controlled by external operators via the mobile device interface 274 or the computer device interface 276.

Figure 6:
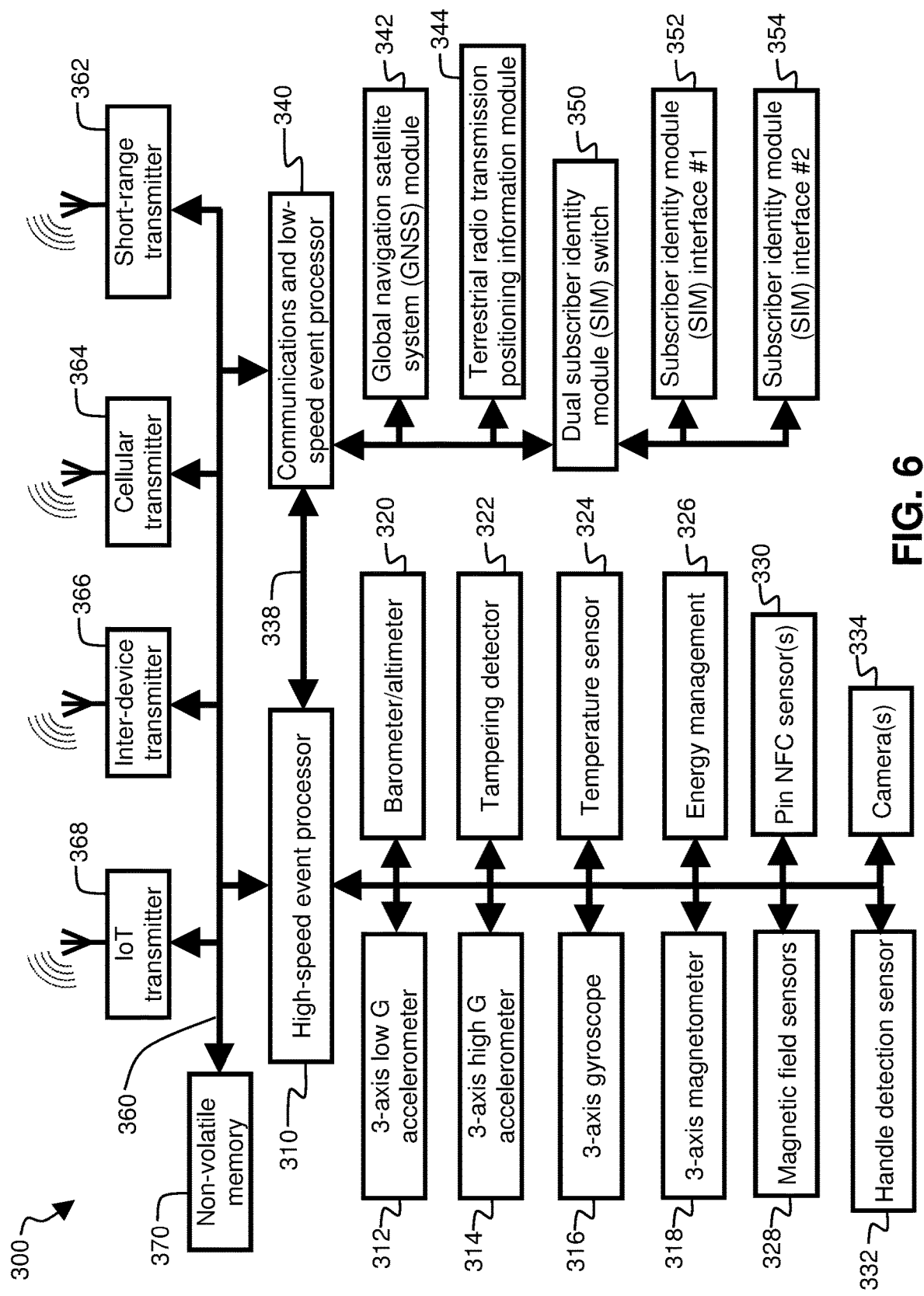
FIG. 6 is a block diagram of the electronics in the devices of FIG. 1 through FIG. 5B.

FIG. 6 shows a block diagram of the main functional elements of an electronic tracking and monitoring module 300. The electronic tracking and monitoring module 300 could be part of a vehicle light, such as the units shown at 500 in FIG. 3, and FIG. 5A. This module 300 could be part of an electronic lock, such as the units shown at 600 in FIG. 3 or FIG. 2C, or the electronic lock shown at 1000 in FIG. 1 and FIG. 2D. In one embodiment, the electronic tracking and monitoring module 300 comprises a high-speed event processor 310 and a low-speed event processor 340 that share a processor communication link 338. In one embodiment the processor communication link 338 is a dedicated serial connection. This serial connection can use a universal synchronous and asynchronous receiver-transmitter and could run in either a synchronous mode or an asynchronous mode. The processor communication link 338 can operate in a full duplex serial communication mode. Note that the functionality of the high-speed event processor 310 and the functionality of the communications and low-speed event processor 340 could also be implemented in a single processor that communicates with all of the elements shown in FIG. 6.

In the embodiment shown in FIG. 6, the high-speed event processor 310 can be connected to a 3-axis low g-force accelerometer 312, a 3-axis gyroscope 316, and a 3-axis magnetometer 318. These devices (the low g-force accelerometer 312, gyroscope 316, and magnetometer 318) can be in a single 9 degree of freedom insertional measurement unit (9-DOF IMU). The implementation of the IMU in embodiments of the invention will be further described later with reference to FIG. 19A, FIG. 19B, FIG. 20, and FIG. 21A and FIG. 21B. The system can include a 3-axis high g-force accelerometer 314, a barometer/altimeter 320 configured to measure an atmospheric pressure and convert this to a barometric measurement or an altitude measurement, a tampering detector 322, a temperature sensor 324, an energy management circuit 326, a near field communications (NFC) sensor for detecting the presence of a pin (such as the pin 1010 in FIG. 1), and a handle detection sensor 332. The low g-force accelerometer 312 and/or the high g-force accelerometer 314 could be used to measure acceleration, vibration, and/or shock information. This acceleration, vibration, and/or shock information, as well as other information in the electronic tracking and monitoring module 300, could be stored in the non-volatile memory 370, and transmitted to other parts of the system through any of the transmitters (368, 366, 364, or 362) to other parts of the system or externally to any parts of the systems that were described with reference to FIG. 3 through FIG. 5B.

The system could also include a camera or cameras, as shown at 334. This camera or cameras could be used as part of a multi-factor authentication process using iris or face scanning. The system could also use other biometrics, such as fingerprints.

If the embodiment shown in FIG. 6 is used as an electronic lock, such as the lock shown at 600 in FIG. 2C or the lock shown at 1000 in FIG. 2C, the high-speed event processor 310, could also communicate with magnetic field sensors (magnetic sensors), as shown at 328, the functionality of which will be further described later in this document. These magnetic field sensors 328 could be used to generate an alarm signal which could be stored and/or transmitted using any of the functionality described in this document. The system 300 could also include one or more handle detection sensor(s) shown at 332 or one or more near field communication sensor(s) shown at 330 if the system 300 is used as an electronic lock. The near field communication (NFC) sensor(s) 330 could be used to detect the presence of the lock pin, shown at 1010 in FIG. 2D. The handle detection sensor(s) 332 could be used to detect the handle, shown at 150 in FIG. 2D.

Further referring to FIG. 6, the low speed event processor 340 can be connected to a global navigation satellite system (GNSS) module 342, a terrestrial radio transmission positioning information module 344, and a dual subscriber identity module (dual SIM) switch 350. The dual SIM switch 350 in turn will connect with a first subscriber identity module (SIM) interface 352 and a second subscriber identity module (SIM) interface 354. The two SIM interfaces 352 and 354 can connect to subscriber identity module cards (SIM cards) that store an international mobile subscriber identity (IMSI) number and its related key, which are used to identify and authenticate subscribers on mobile telephony devices. More generally, a SIM card can be referred to as smart cards or universal integrated circuit cards (UICCs). A SIM card typically stores its unique serial number (ICCID), international mobile subscriber identity (IMSI) number, security authentication and ciphering information, temporary information related to the local network, a list of services the user has access to, and two passwords: a personal identification number (PIN) for ordinary use and a personal unblocking code (PUK) for unlocking. Two SIM interfaces 352 and 354 can be used so the system 300 can use two different SIM cards for two different mobile phone networks to provide backup if the system 300 is in a location where one of the mobile phone networks is not available. The dual SIM switch 350 can be any device configured for electronically multiplexing more than one SIM connection. It is a multi-pole double-throw switch so that all of the necessary active connections of a typical subscriber identity module (SIM) are switched from one SIM to another. One example of such as switch is the FSA2567 made by Fairchild Semiconductor Corporation. In one embodiment, the system can be configured so that one or more of the subscriber identity modules (SIMs) can be non-removable SIMs, which are typically called embedded SIMs or eSIMs.

The terrestrial radio transmission positioning information module 344 can be configured to detect the distance and/or direction from the electronic tracking and monitoring module 300 to a plurality of communication towers (136 in FIG. 4A through FIG. 5B) and/or receive detected information of the distance and/or direction from communication towers (136 in FIG. 4A through FIG. 5B) to the electronic tracking and monitoring module 300. Techniques for measuring distance and/or direction between one or more communication towers and the device or vice versa can include multi-lateration (also known as hyperbolic navigation), trilateration timing, triangulation, relative transmission power level measurement, Cell ID (unique number used to identify each base station transceiver or sector of a base station transceiver), angular direction determination from an antenna pattern, antenna phase discrimination, and other techniques for signal direction finding. The Cell ID, distance, and/or direction information can then be further improved through averaging, interpolation, and other types of computation to determine a relative location. Having determined a relative position of the electronic tracking and monitoring module 300 to the towers (136 in FIG. 4A through FIG. 5B), absolute location of the module 300 can then be calculated based on combining the relative position information with known and unchanging absolute position information for the towers (136 in FIG. 4A through FIG. 5B).

The terrestrial radio transmission positioning information module 344 can also work in conjunction with the GNSS module 342 to improve the speed or accuracy of a position for the module 300 by using Assisted Global Positioning System (A-GPS) techniques. These A-GPS techniques can comprise (a) receiving orbital data or almanac information more quickly from a terrestrial tower (136 in FIG. 4A through FIG. 5B) than would be available from a GNSS satellite and/or (b) calculation of the position of the module by combining information received by the module 300 from the GNSS satellite (138 in FIG. 4A and FIG. 4B) with information received by the terrestrial tower (136 in FIG. 4A through FIG. 5B) from the GNSS satellite (138 in FIG. 4A and FIG. 4B).

The tampering detector 322 in FIG. 6 can be configured to detect any attempt by a person to open the electronic tracking and monitoring device (500 or 500A/B/C in FIG. 3, FIG. 4A, and FIG. 5A; 600 or 600A/B/C/D in FIG. 4B, FIG. 2C, and FIG. 5B; and 1000 in FIG. 2D). In one embodiment, the tampering device 322 is a switch that is configured to detect opening of the electronic tracking and monitoring device. The tampering detector 322 could also be implemented using a different type of sensor such as a magnetic sensor, a light sensor, or any other technology capable of being understood by anyone skilled in the art.

The electronic tracking and monitoring module 300 in FIG. 6 can be configured with a short-range communications transmitter 362, a cellular communications transmitter 364, inter-device communications transmitter 366, and an IoT (Internet of Things) communications transmitters 368. In one embodiment these communications transmitters (362, 364, 366, and 368) are managed by the low-speed event processor 340 over a communications bus 360. The electronic tracking and monitoring module 300 can also comprise a non-volatile memory 370 that can be used for logging data from any of the devices in the module 300. This non-volatile memory 370 could be flash memory that could be used to log and store measured data during the time when no data transmission can occur. The logged data can then be transmitted once a transmission connection is re-established. The logged data can comprise position information and event information, such as impacts and impact intensity, temperatures and other environmental parameters, and lock openings and closings, as well as other information associated with any element of the system shown in FIG. 6. This logged information could be stored with time stamps and this time stamp information can then be later used to reconstruct a timeline of everything that has happened to the electronic tracking and monitoring module 300 and associated cargo.

The data stored in the non-volatile memory, 370 in FIG. 6, can comprise magnetic field alarm information, inertial information, geographic position and geographic boundary information, environmental information, loss of communication alarm information (such as loss of communication with a fixed physical asset), and tampering alarm information. This information could be encrypted. Data stored in other parts of the system including, but not limited to data stored in the remote access module, 270 in FIG. 5B, data stored in the cloud database, 254 in FIG. 5B, data stored in the cellular network 210 in FIG. 5B, and data stored in the IoT server, 230 in FIG. 5B, could also be encrypted. Similarly, all transmission of data between any component in the system as shown in FIG. 3, FIG. 4A, FIG. 4B, FIG. 5A, FIG. 5B, and FIG. 7 could be encrypted.

The cellular transmitter 364 in FIG. 6 can be used for bi-directional communication with the communication tower 136, shown in FIG. 4A, FIG. 4B, FIG. 5A and FIG. 5B and the cellphone network 210 in FIG. 5A and FIG. 5B. The IoT transmitter 368 in FIG. 6 can be used for bi-directional communication with the communication tower 136, shown in FIG. 4A, FIG. 4B, FIG. 5A and FIG. 5B and the IoT network 310 in FIG. 5A and FIG. 5B. The inter-device transmitter 366 in FIG. 6 can be used for bi-directional communication between electronic tracking and monitoring devices, such as the taillight fixtures 500 shown in FIG. 3, FIG. 4A and FIG. 5A and/or the electronic locks 600 shown in FIG. 4B and FIG. 5B.

The short-range transmitter 362 in FIG. 6 can be used for wired or wireless mesh networking or for a Bluetooth connection with peripherals, such as tablet computers that could download data from the electronic tracking and monitoring module 300. In one embodiment, the short-range transmitter 362 in FIG. 6 is part of a wireless mesh network, such as the one illustrated in FIG. 7.

Referring in more detail to FIG. 7, a mesh network, and more specifically a wireless mesh network is shown at 690. The wireless mesh network 690 provides a plurality of communication nodes (more specifically wireless communication nodes) between the communication tower 136 and an electronic tracking and monitoring device 500D. The specific device shown at 500D is a device configured to be hidden in a vehicle tail light fixture, as was described previously. The wireless mesh network 690 comprises a plurality of possible communication paths, shown at 695A, 695B, 695C, and 695D between the communication tower 136 and the electronic tracking and monitoring device 500D using a variety of nodes, shown at 500A, 500B, 500C, 600A, 600B, 600C, 600D and 600E. Each path has been shown with a different type of dotted line. For example, path 695A goes to and from the communication tower 136 via lock 600A, tail light fixture 500B, tail light fixture 500C, and tail light fixture 500D. The communication path for the data can be chosen on an ad hoc basis based on performance parameters such as available communication bandwidth, availability of a node or nodes for communication, minimization of number of hops, signal error rates, and any other parameter capable of being understood by anyone skilled in the art. The communication tower 136 could be replaced by any other communication gateway such as a WiFi router, a cellphone tower, a communications satellite, a Zigbee or Xbee communications gateway or any other communications device capable of being understood by anyone skilled in the art. Communication between nodes could be using any wired or wireless communication protocol such as WiFi, Xbee, Zigbee, etc.

Referring to FIG. 7 in conjunction with FIG. 3, it should be noted that the redundant mesh network communication shown in FIG. 7 can also be applied to intra-vehicle communication connections, such as those shown at 122 in FIG. 3. Such redundant mesh network connections could be used to communicate between any element of the system illustrated in FIG. 3 with any other element in this system. For example, a vehicle could have multiple devices hidden in taillights.

Figure 8A:
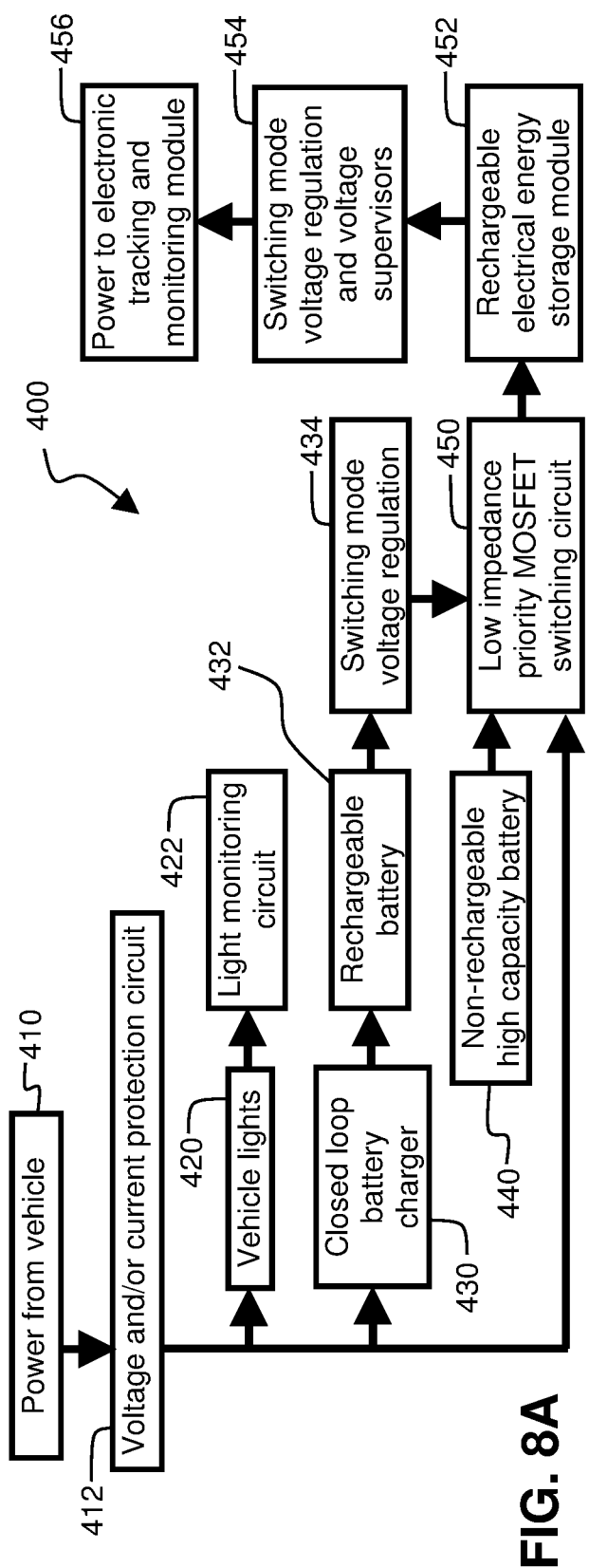
FIG. 8A is a block diagram of a power module for the devices of FIG. 1 through FIG. 6.

FIG. 8A illustrates an electrical power circuit 400 that can be used with embodiments of the present invention. The electrical power circuit 400 shown in FIG. 8A is configured for situations where external electrical power is available. The embodiment of FIG. 8A receives power from a vehicle, as shown at 410. A voltage and/or current protection circuit 412 can be used to protect the device from being plugged into the wrong voltage or to protect against voltage and/or current spikes. Such a protection circuit 412 can comprise a fuse, a zener diode, and/or a thyristor. The protected electrical power can then power vehicle lights 420, a battery charger 430, and a switching circuit. The vehicle lights 420, could be incandescent, they could be halogen lights, they could be LED lights, and/or they could be any other electrical illumination source capable of being understood by someone skilled in the art. The vehicle lights 420 could be connected to a light monitoring circuit 422 that determines whether the lights are burning by determining whether they are drawing current.

Further referring to FIG. 8A, the battery charger 430 can be a configured to provide electrical power to a rechargeable battery 432 in a closed-loop fashion in which the charger output current and/or voltage are regulated in response to a comparison with a reference value. The rechargeable battery 432 can use any known electrical energy storage technology such as alkaline, lithium ion, lithium polymer, lithium phosphorous, nickel cadmium, nickel metal hydride, zinc oxide, and lead acid. The system can also comprise a non-rechargeable high capacity battery 440. The rechargeable battery 432 and non-rechargeable battery 440 provide backup in case the power from the vehicle 410 (as regulated by the voltage and/or current protection circuit 412) is not available.

As shown in FIG. 8A, the source of power from either of the batteries, 432 and 440, or the vehicle power 410, can be selected by means of a switching circuit, shown at 450. The electrical power from the rechargeable battery 432 can pass through a switching mode voltage regulator 434 before being supplied to the switching circuit 450. The switching circuit 450 can use low impedance priority MOSFET technology to optimally regulate the power supplied to a rechargeable electrical energy storage unit 452. The electrical storage unit 452 could any combination of capacitor(s), supercapacitor(s), hybrid capacitor(s), rechargeable battery (s), and/or pulse capacitor(s) known in the art. The electrical storage unit 452 output could be controlled by voltage regulator(s) and/or supervisor(s) 454 before being supplied as freight electronic tracking unit power 456.

Figure 8B:
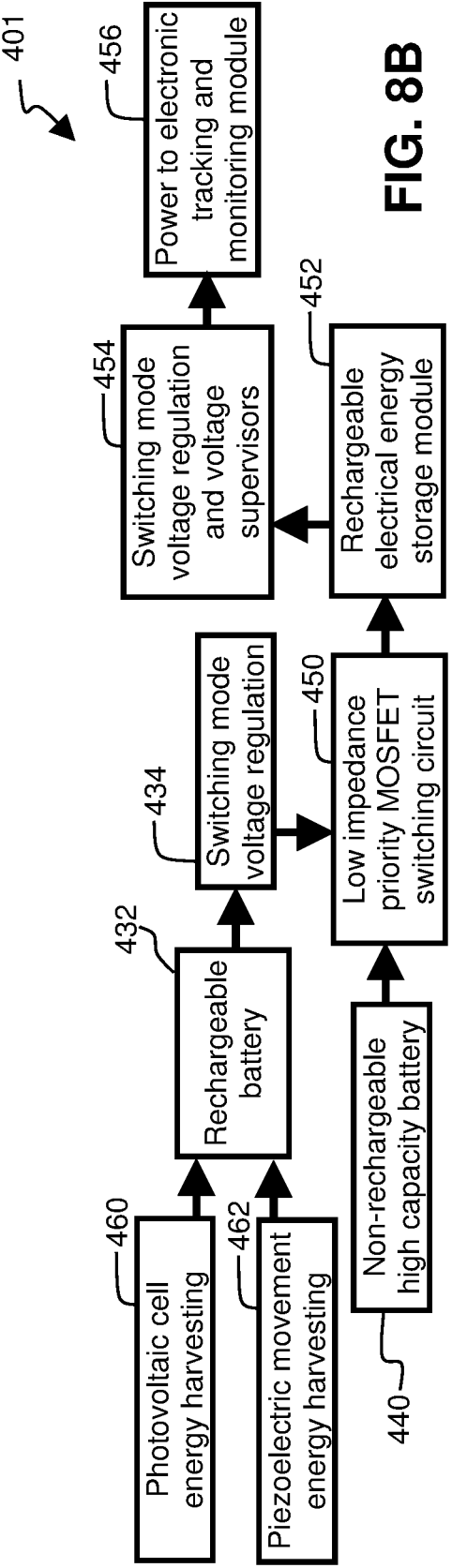
FIG. 8B is a block diagram of an alternate power module for the devices of FIGS. 1 to 6.

FIG. 8B illustrates an alternative embodiment of an electrical power circuit 401 that can be used with embodiments of the present invention. The alternative embodiment electrical power circuit 401 shown in FIG. 8B is configured for situations in which external electrical power is not available. The alternative embodiment, 401 in FIG. 8B, and the embodiment 400 in FIG. 8A both use the non-rechargeable battery 440, the rechargeable battery 432, the switching mode voltage regulator 434, the low impedance priority MOSFET switching circuit 450, the rechargeable electrical energy storage unit 452, and the switching mode voltage regulation and voltage supervisors 454 in the same way to power the electronic tracking and monitoring module 456. Because external electrical power is not available in the alternate embodiment, 401 in FIG. 8B, this embodiment 401 is configured to harvest electrical energy using a photovoltaic cell 460 and/or a piezoelectrical movement element 462. The piezoelectrical movement element 462 can use the movement of a mass or a pendulum to generate electrical power from the displacement of the mass or pendulum as a result of movement of the device. Such movement could be a vibration, which would result in the ability to harvest vibrational energy.

Figure 9A:
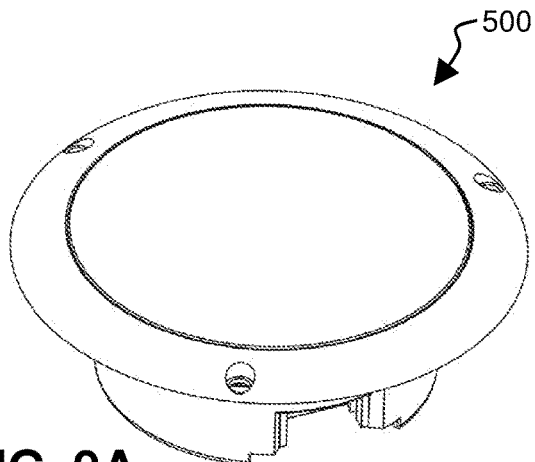
FIG. 9A is an isometric top view of the tail light shown in FIG. 3, FIG. 4A and FIG. 5A.
Figure 9B:
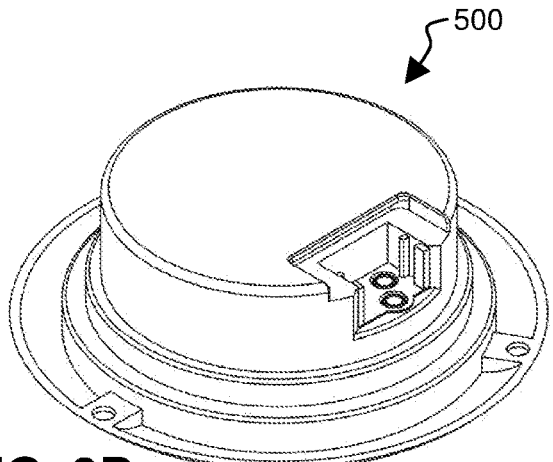
FIG. 9B is an isometric bottom view of the tail light of FIG. 9A.
Figure 9C:
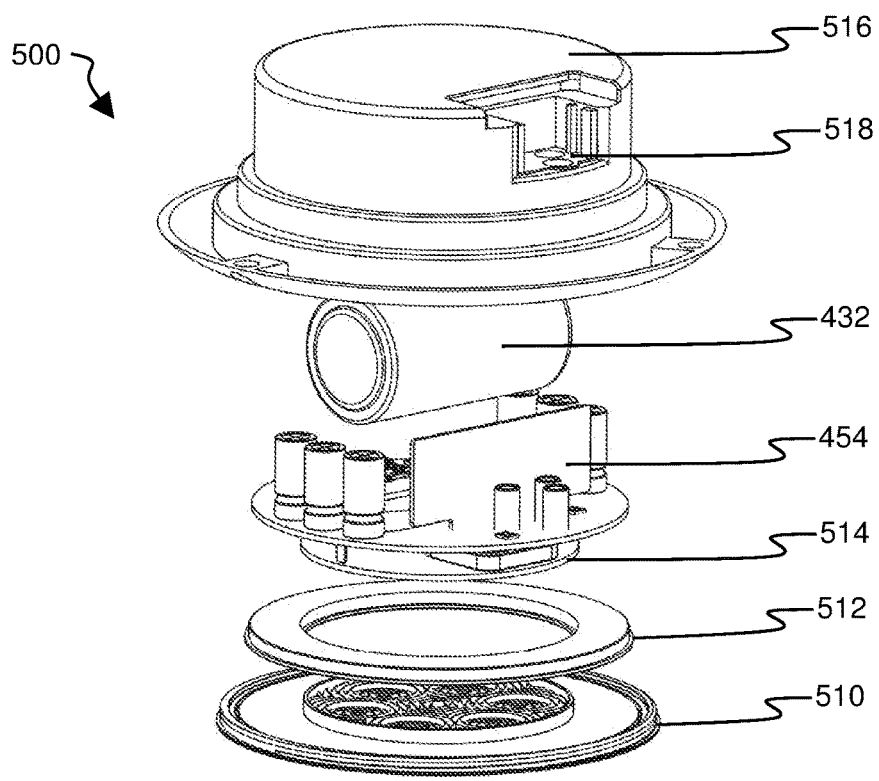
FIG. 9C is an exploded view of the tail light of FIG. 9A and FIG. 9B.

FIG. 9A, FIG. 9B, and FIG. 9C show a tail light fixture 500 for electronic tracking and monitoring of movable freight containers. FIG. 9A shows an isometric top view of the electronic tail light fixture 500. FIG. 9B, shows an isometric bottom view of the tail light fixture 500. FIG. 9C shows an exploded view of the tail light fixture 500. Referring to FIG. 9C, the electronic tracking tail light fixture 500 comprises an external lens 510, an internal lens and/or diffuser 512, an electronic circuit board with light sources and antennas 514, the rechargeable electrical energy storage unit 454 and rechargeable battery 432 that were discussed with reference to FIG. 5A, a back cover 516, and a standard light connector 518. The standard light connector 518 is used to get the power from the vehicle, 410 in FIG. 8A.

Further referring to FIG. 9C, the electronic circuit board with light sources and antennas 514 comprises the circuit elements that were shown with reference to FIG. 6. The electronic circuit board with light sources and antennas 514 also comprises the voltage and/or current protection circuit 412, the vehicle lights 420, the light monitoring circuit 422, the closed loop battery charger 430, the switching mode voltage regulation 434, the non-rechargeable high capacity battery 440, the low impedance priority MOSFET switching circuit, and the switching mode voltage regulation and voltage supervisors 454 that were shown with reference to FIG. 8A.

Figure 9D:
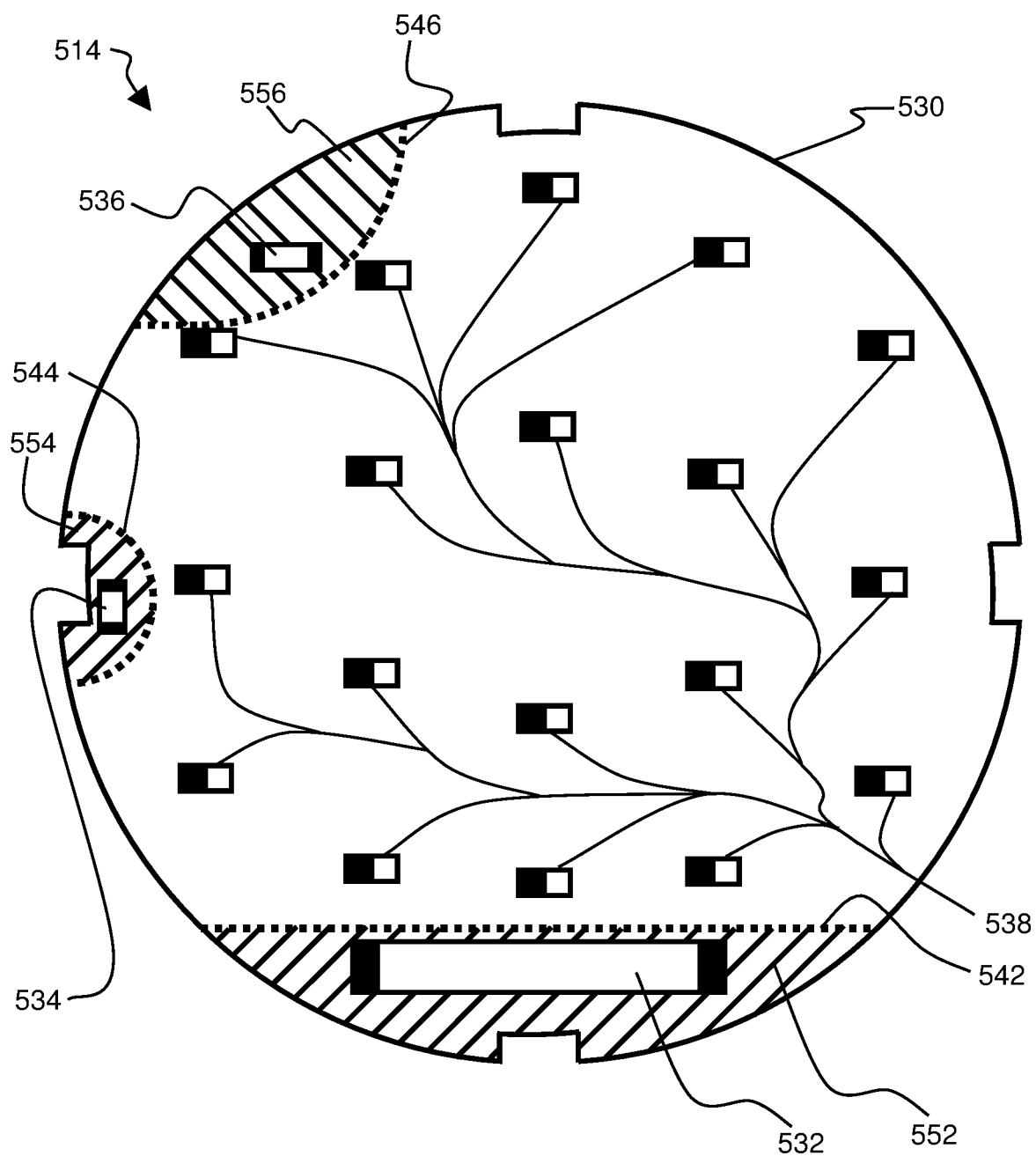
FIG. 9D is a layout of the circuit board for the tail light of FIG. 9A to FIG. 9C.

FIG. 9D shows the circuit board layout 514 of FIG. 9C to illustrate the relative placement of the three main antennas (for GPS/GNSS, mesh networking, and cellular communication) and the associated ground planes and electromagnetic shielding. Antenna selection, orientation, and location and size of the related ground planes, and associated electromagnetic shielding are critical to performance of this multi-antenna system. This configuration was analyzed and optimized to minimize electromagnetic interference and to ensure that the antennas will perform adequately when used in a taillight fixture attached to trailer or cargo container, since the metal trailer acts as an electromagnetic shield. Referring to FIG. 9D, the electronic circuit board assembly is shown at 514. This circuit board assembly 514 comprises a printed circuit board 530. It also typically included the components described previously with reference to FIG. 6, FIG. 8A, and FIG. 8B, many of which are not shown in FIG. 9D. What is shown in FIG. 9D are the light sources 538, antennas 532, 534, and 536, and associated electromagnetic shielding shown at 542, 544, and 546. The light sources 538 in this embodiment are light emitting diodes (LEDs) that are electrically connected to the printed circuit board 530. In the embodiment shown, there are 18 LEDs that are surface-mounted on the printed circuit board 530 to produce an approximate circle of light for the circular tail light assembly that was shown in FIG. 9A, FIG. 9B, and FIG. 9C.

Further referring to FIG. 9D, the circuit board assembly 514 comprises a cellular phone antenna, shown at 532. In the embodiment shown, the cellular phone antenna 532 is a ceramic omnidirectional monopole antenna configured for receiving and transmitting radio waves in a range of frequencies from 800 megahertz to 2.2 gigahertz. The cellular phone antenna 532 is surface mounted on a ground plane on the printed circuit board 530 and is electromagnetically isolated from other parts of the circuit board by ground vias in the printed circuit board shown at 542. These ground vias 542 can be combined with an electromagnetic shield that is perpendicular to the plane of the circuit board 530 to maximize shielding.

Because the circuit board assembly 514 will be mounted vertically against a metal surface (typically, the vertical wall of a truck trailer or cargo container) and the truck trailer or cargo container could sometimes be angled with the back of the trailer/container pointing partly downward, obscuring a direct vertically upwards electromagnetic line of sight, the configuration shown in FIG. 9D is sensitive to antenna type and placement on the circuit board. For these reasons, the cellular phone antenna 532, is a ceramic multi-band surface mount antenna that is horizontally oriented when in use. In one embodiment, the cellular phone antenna 532 is a Taoglas PA-25 antenna specifically designed for automotive applications. The approximately 35 mm long (¼ wavelength=2150 Megahertz) cellular phone antenna 532 is mounted onto a cellular antenna ground plane 552 that is at least 45 mm long in the direction of the antenna 532 to optimize efficiency in the cellphone frequency ranges of 824-960 MHz and 1700-2170 MHz. The efficiency of this antenna in the 824-960 MHz range increases significantly if the ground plane 552 can be about ½ wavelength, which calculates out to greater than 7 mm, which is approximately the maximum length of the cellular antenna ground plane 552 shown in FIG. 9D.

The circuit board assembly 514 also comprises a Global Navigation Satellite System (GNSS) antenna, shown at 534. Such antennas are also referred to as GPS, Galileo, BaiDou, or GLOSNASS antennas, depending upon the satellite navigation system being used. In the embodiment shown, the GNSS antenna 534 is an omnidirectional loop antenna optimized to receive satellite timing signals at a frequency of 1575.42 MHz. The GNSS antenna 534 is oriented orthogonally from the cellular phone antenna 532 and mesh networking antenna 536 on the circuit board assembly 514 to minimize electromagnetic interference and to optimize received signal strength. For this application, a ceramic loop antenna provides at least three times better efficiency than a traditional polarized linear antenna for the frequency range being used. It is also about 3× smaller in all dimensions than an equivalent patch antenna. The GNSS antenna 534 is mounted on a GNSS antenna ground plane 554 on the edge of the circuit board 530 and electromagnetically isolated from other parts of the circuit board by ground vias in the printed circuit board shown at 544. These ground vias 544 can be combined with an electromagnetic shield that is perpendicular to the plane of the circuit board 530 to provide maximum electromagnetic shielding. In one embodiment, the GNSS antenna 534 is a Taoglas GLA.01 low profile surface mount antenna.

The circuit board assembly 514 further comprises a mesh networking antenna, shown at 536. In the embodiment shown, the mesh networking antenna 536 is an omnidirectional monopole antenna configured to send and receive electromagnetic signals in a range of frequencies from 2200 MHz to 2800 MHz with optimal performance in a range of frequencies from 2400 MHz to 2500 MHz to match the requirements for Zigbee and 802.11 b/g/n WiFi. In order to fit into a size smaller than ¼ wavelength, the mesh networking antenna 536 comprises small antenna segments that are oriented at angles or arcs to each other and are connected to one another at their ends to create a folded line that never loops having a total length of approximately 30 mm (equal to ¼ of a wavelength at a frequency of 2450 MHz). However, the package size is no greater than 7 mm (less than 1/16 of a wavelength) in its maximum dimension. In one embodiment, the mesh networking antenna 536 is a Fractus FR05-S1-N-0-102 antenna using the principles described in U.S. patent Ser. No. 7,148,850. The mesh networking antenna 536 is oriented parallel to the cellular phone antenna 532 and orthogonal to the GNSS antenna 534. The mesh networking antenna 536 is surface mounted onto the circuit board 530 and electromagnetically isolated from other parts of the circuit board by mesh networking ground vias 546 in the printed circuit board. These ground vias 546 can be combined with an electromagnetic shield that is perpendicular to the plane of the circuit board 530 to provide maximum electromagnetic shielding. There is a mesh networking antenna ground plane 556 in the circuit board 530, which helps to optimize performance of the mesh networking antenna 536 for this configuration.

The three antennas 532, 534, and 536 and the LEDs 538 are all mounted on the external surface of the circuit board assembly in order to be as far away as possible from the steel on the truck chassis and to have a clear as possible of a line-of-sight to the "outside world". The three antennas 532, 534, and 536 and the LEDs 538 are mounted in a coplanar configuration to minimize assembly cost. All of the components on the circuit board assembly 514 fit inside of a 4-inch diameter tail light fixture, such as the unit shown in FIGS. 9A, 9B, and 9C.

Referring to FIG. 9A, FIG. 9B, FIG. 9C, and FIG. 9D in conjunction with FIG. 3, it should be noted that all of the features and elements of the tail light fixtures shown in FIGS. 9A to 9D could also be incorporated in a marker light fixture, wherein an electronic tracking and/or monitoring device hidden in a marker light fixture 501 (smart remote GPS antenna) in FIG. 3 would be located high on a motor vehicle trailer and/or freight container 114 in FIG. 3, at a region proximate to the top of the movable freight container 114 in FIG. 3. Placing an electronic tracking and/or monitoring device in a marker light fixture can have the following functional advantages:

(a) A GPS (or other types of GNSS) antenna that is high up is in a better position to receive more signals from more satellites than one that is shielded from viewing some of the positioning satellites by the metal enclosures of a freight container;

(b) Redundant GPS (or other types of GNSS) devices can improve the capability for the system to pick up at least one positioning signal;

(c) The redundant GPS (or other types of GNSS) devices can improve positional accuracy.

More generally, the device in the marker light fixture, 501 (smart remote GPS antenna) in FIG. 3, can be used as a remote device in a system that also has a electronic tracking and/or monitoring device hidden in the vehicle tail light, 500 in FIG. 3, FIG. 9A, FIG. 9B, and FIG. 9C. In this case, the remote device 501 (smart remote GPS antenna) can make an important functional improvement to the operation of the system. It is difficult to receive GNSS (Global Navigation Satellite Signals) from a location that does not have a clear view of as much of the sky as possible. Since the taillight is near the bottom of the freight container, it is difficult to reliably receive a high quality GNSS signal. This problem is even worse if the vehicle is backed up at a loading dock. In such cases, there is a significant benefit to having a remote device configured for attachment to the vehicle at a location higher on the vehicle that is separate from the taillight. This remote device could be part of a marker light 501 (i.e. a smart remote GPS antenna) in FIG. 3. It could be module placed on top of the freight container. It could be any other device placed anywhere on the vehicle, preferably as high on the vehicle as possible and preferably at a location that facilitates communication with the taillight device 500. Like the taillight device 500, the remote device 501 (smart remote GPS antenna) needs to comprise a remote device global navigation satellite system antenna and this antenna should be configured to receive electromagnetic signals at frequency of 1575.42 MHz. Typically, the remote device 501 would include a processor and this processor would be configured for converting the GNSS signals into position information, just like for the taillight device 500, if the taillight device has GNSS capabilities. The remote device 501 would also be configured for communicating with the taillight 500, which means that the remote device might also have any and/or all of the transmitters described with reference to FIG. 6. In at least one embodiment, the remote device 501 is configured for communicating position information with the taillight (tracking) device 500 using a mesh networking antenna configured for transmitting and receiving electromagnetic signals in the range of 2400 MHz to 2500 MHz. It can be understood that the remote device 501 could have any and all of the same characteristics, features, and configuration of the taillight tracking device described herein.

Figure 10A:
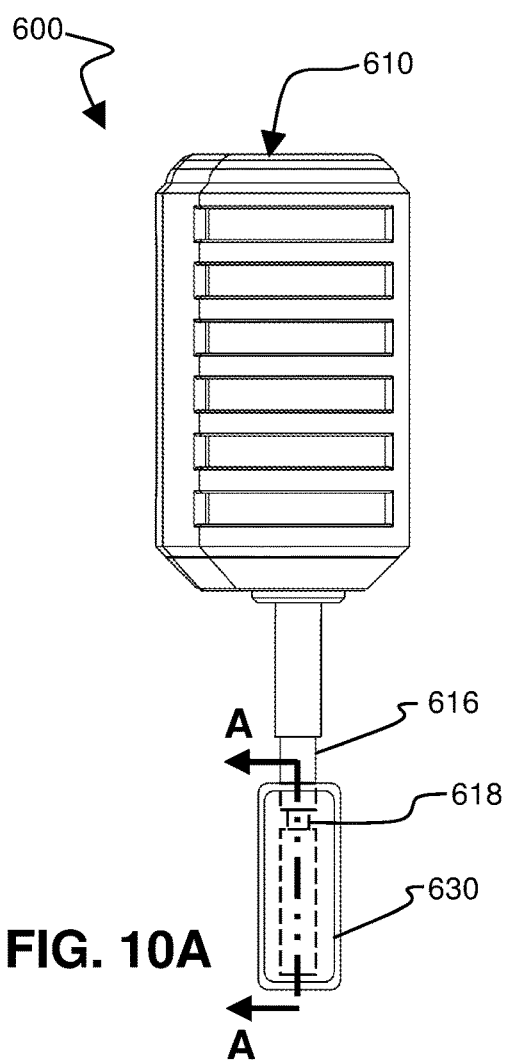
FIG. 10A is a side view of the lock shown in FIG. 2C.
Figure 10B:
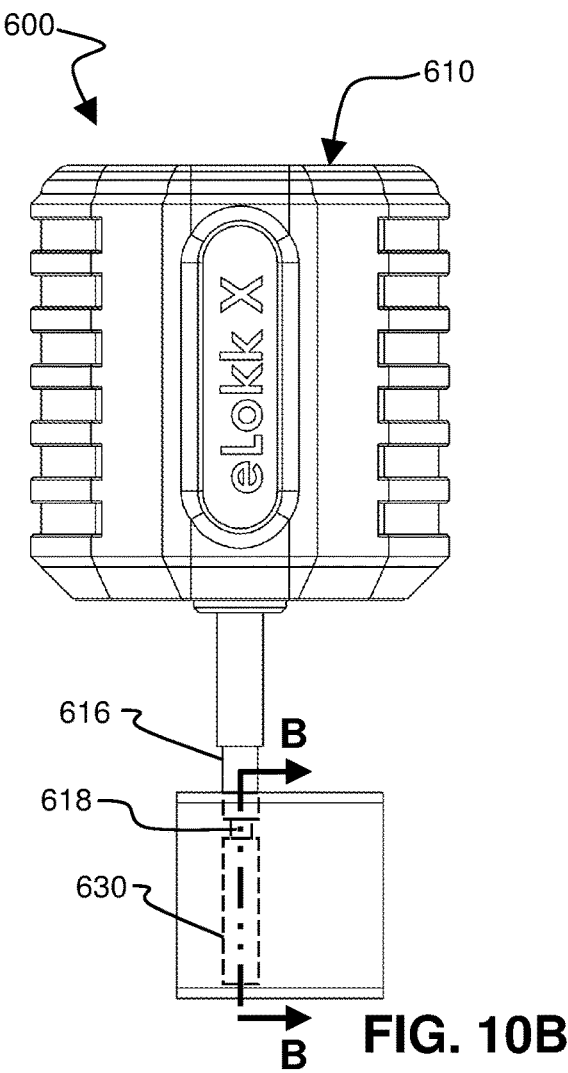
FIG. 10B is a front view of the lock of FIG. 10A.
Figure 10C:
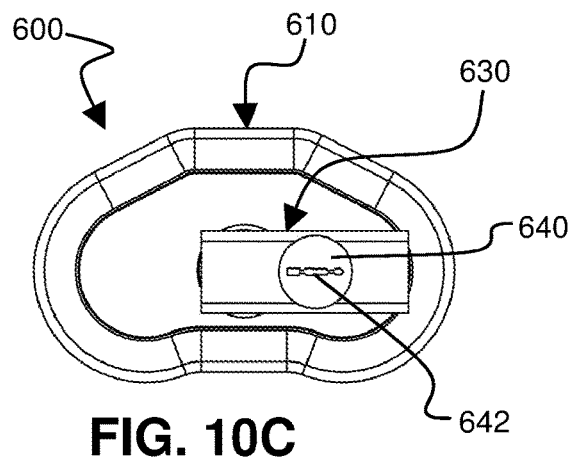
FIG. 10C is a bottom view of the lock of FIG. 10B.

FIG. 10A, FIG. 10B, and FIG. 10C show three orthogonal views of an electronic tracking and monitoring lock 600 for movable freight containers. This electronic tracking and monitoring lock 600 was previously shown in FIG. 4B (at 600A, 600B, 600C, and 600D), in FIG. 2C, in FIG. 5A and in FIG. 7 (at 600A, 600B, 600C, 600D, and 600E). FIG. 10A is a side view. FIG. 10B is a front view. FIG. 10C is a bottom view. Referring to FIG. 10A, FIG. 10B, and FIG. 10C, the lock 600, as previously described with reference to FIG. 2C, comprises an electronic module, shown at 610, and a mechanical lock module, shown at 630. FIG. 10C shows a keyhole 642 into which the mechanical key, 680 in FIG. 2C, could be inserted to rotate a cylindrical plug 640 and move elements of the mechanical lock module 630 from a locked position to an unlocked position, and vice versa. It should be understood that the mechanical lock module 630 could be any type of a lock module capable of being understood by anyone skilled in the art, including but not limited to:

(a) A mechanical lock module that uses a mechanical key;

(b) A mechanical lock module that uses a combination lock; and (c) A mechanical lock module that uses a key and/or a combination lock in combination with another locking method such as an electromagnetic actuator, and/or an electronic sensor/transducer.

FIG. 2C, FIG. 10A, and FIG. 10B show that the electronic module 610 comprises an electronic lock module shaft, shown at 616. A portion of the shaft 616 is inserted into a cavity 632 in the mechanical lock module 630 when the lock 600 is in locked configuration (the configuration shown in FIG. 10A and FIG. 10B). The electronic module shaft 616 is fully removed from the mechanical lock module 630 when the lock 600 is in an unlocked configuration (a configuration shown in FIG. 2C). The electronic module shaft 616 comprises a retaining feature, shown at 618. The electronic module shaft retaining feature 618 is used to secure the shaft 616 into the mechanical lock module 630 when the lock 600 is in a locked configuration. The electronic module shaft 616 can be any shape capable of being understood by anyone skilled in the art, including but not limited to a cylindrical shape, a rectangular shape, a hexagonal extruded shape, and an octagonal extruded shape. The retaining feature 618 can be any mechanical feature for retaining a mechanical assembly onto a shaft capable of being understood by anyone skilled in the art, including but not limited to a circular groove in a cylindrical shaft, a groove in a rectangular, hexagonal, or octagonal shaft, a notch, and a protrusion. The electronic module shaft 616 can be made of any material capable of being understood by anyone skilled in the art including, but not limited to various alloys of steel, aluminum, titanium, and ceramics. In one embodiment, the shaft comprises a non-magnetic hollow stainless-steel cylinder. The electronic module shaft 616 can also undergo a heat treatment or case-hardening process to improve the ability for the lock to be broken or cut.

FIG. 11A shows an exploded isometric view of the electronic module 610 shown previously. In the embodiment shown in FIG. 11A, the electronic module shaft 616, is securely attached to an electronic module case bottom 614. An electronic module main shell 612 attaches to the electronic module case bottom and houses the batteries 432 and 440 that were previously described with reference to FIG. 8B. The electronic module 610 comprises one or more circuit boards, shown at 620 and 622, that hold the circuitry that was described with reference to FIG. 6 and FIG. 8B. In the embodiment shown in FIG. 11A, the first circuit board 620, second circuit board 622, non-rechargeable high capacity battery 440, and rechargeable battery 432 are held within the volume that is inside the assembled electronic module case bottom 614, electronic module main shell 612, and an electronic module top cover 624. The electronic module case bottom 614, electronic module main shell 612, and electronic module top cover 624 could be made of any material capable of being understood by anyone skilled in the art including metals and plastics. There can be an electronic module rubber sleeve 626 around the outside of the electronic module main shell 612.

FIG. 11B, isometric view of the mechanical lock module 630 shown previously, illustrates that in one embodiment, the mechanical lock module comprises a mechanical lock module case, shown at 634, and a set screw, shown at 638. The mechanical lock module case 634 is shown by itself in FIG. 11C. FIG. 11D gives an outline view the of the mechanical lock body internal parts 636 that are held inside the mechanical lock body case 634 when the case has been slid over the internal parts 636 and the set screw 638 has been fasted to prevent the case from sliding relative to the internal parts 636. The mechanical lock module case 634 is typically made of a hardened steel material to ensure that the lock module 630 cannot easily be broken by impact or other means used to physically destroy a lock.

Further referring to FIG. 11B, FIG. 11C, and FIG. 11D, the mechanical lock module cavity 632 comprises an aperture 632A in the top of the mechanical lock body case and a cavity 632B in the mechanical lock body internal parts. When the electronic module shaft (616 in FIG. 2C, FIG. 10A, FIG. 10B, and FIG. 11A) is inserted through the mechanical lock body case aperture 632A at least far enough so that a portion of the shaft 616 is inside the cavity 632B in the mechanical lock body internal parts 636, the shaft 616 will also prevent the case 634 from sliding relative to the mechanical lock body internal parts 636.

Figure 12A:
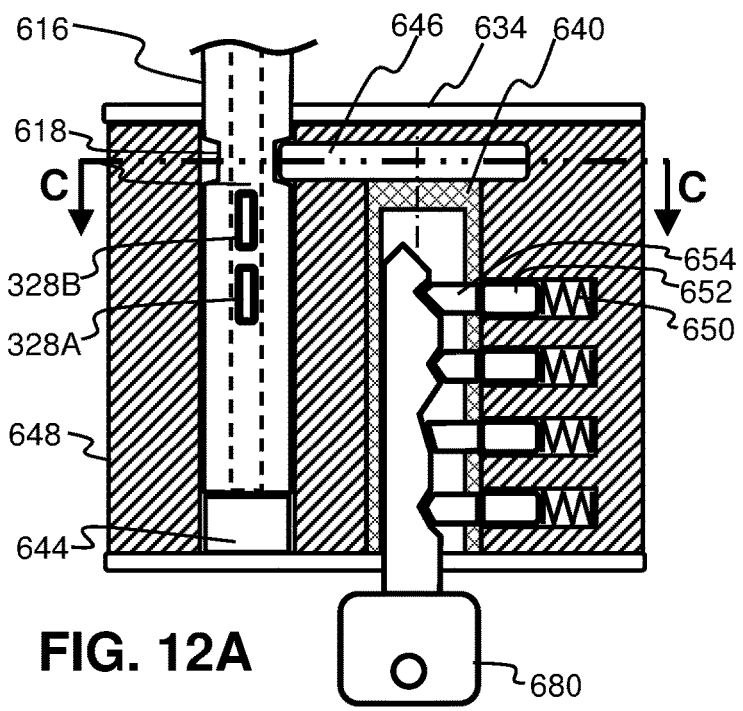
FIG. 12A shows Section A-A of FIG. 10A.
Figure 12B:
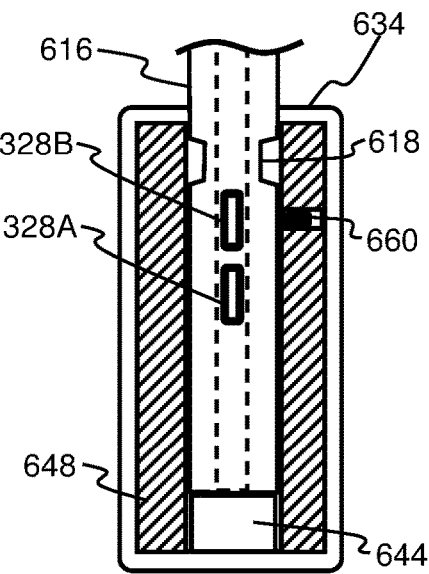
FIG. 12B shows Section B-B of FIG. 10B.
Figure 12C:
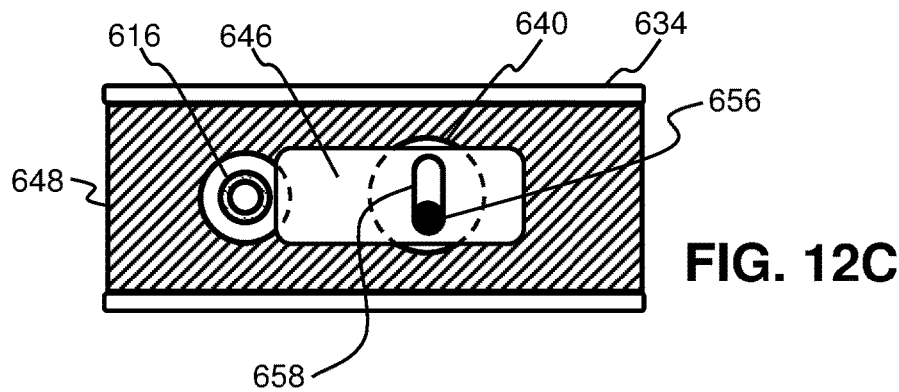
FIG. 12C shows Section C-C of FIG. 12A.

FIG. 12A shows Section A-A of FIG. 10A and FIG. 12B shows Section B-B of FIG. 10B. FIG. 12C shows Section C-C of FIG. 12A. These three drawings illustrate and describe the functionality of the mechanical lock module 630 in FIG. 10A and FIG. 10B and the interactions of the mechanical lock module 630 with the mechanical key 680 and electronic module shaft 616. In FIG. 12A, FIG. 12B, and FIG. 12C, a portion of the electronic module shaft 616 is held in the cavity (632 in FIG. 2C and FIG. 11B) of the mechanical lock module (630 in FIG. 2C and FIG. 11B). In this embodiment, the main components of the mechanical lock module 630 are held by a mechanical lock module frame 648, which is held inside the mechanical lock module case 634 by a set screw. The use of a set screw to secure the mechanical module case was described with reference to FIG. 11B. The electronic module shaft 616 is secured inside the cavity 632 by a locking plate, shown at 646 in FIG. 12A and FIG. 12C, because the locking plate 646 engages with the shaft retaining feature, shown at 618 in FIG. 12A. In the embodiment shown, the retaining feature 618 is a circular groove in the hollow cylindrical shaft 616. The locking plate 646 can be moved right and left in the view shown in FIG. 12A and FIG. 12B by using the mechanical key 680 to rotate the cylindrical plug, shown at 640. In the embodiment shown in FIG. 12A and FIG. 12C, the cylindrical plug 640 is a cylindrical assembly that can be rotated about a vertical axis and the cylindrical plug 640 comprises a locking plate engagement pin, shown at 656 in FIG. 12C that is located at the top of the cylindrical plug 640. The locking plate engagement pin 656 engages with a slot 658 in the locking plate 646 to move the locking plate 646 right and left in the view shown in FIG. 12A, which causes a portion of the locking plate 646 to move into and out of the shaft retaining feature region and lock and unlock the shaft 616. For lock embodiments, the mechanism to secure and release the shaft 616 inside the mechanical lock module 630 is not limited to the example shown here. The mechanism used to secure and release the shaft 616 inside the mechanical lock module 630 can be any mechanism capable of being understood by a person skilled in designing mechanical locks.

FIG. 12A shows a tumbler lock mechanism in which the cylindrical plug 640 can only rotate if a mechanical key 680 is inserted into the cylindrical plug 640 and the mechanical key 680 has the correct profile for a plurality of key pins, shown at 654, each of which is pushed by a spring 650 and a driver pin 652, to align to the correct depths. If this alignment is correct, the cylindrical plug 640 can be rotated by the mechanical key 680 which causes the locking plate eccentric pin 656 in FIG. 12C to rotate, which causes a linear movement of the locking plate 646. When the electronic module shaft 616 is not secured by the locking plate 646, the shaft 616 can be removed from the mechanical lock module, 630 in FIG. 2C and FIG. 11B. When the mechanical lock module 630 is unlocked and the shaft 616 is inserted, the maximum depth of insertion can be set by using a stop pin, shown at 644 in FIG. 12A and FIG. 12B. The use of a stop pin 644 facilitates the use of a standard mechanical lock module 630 with a shaft 616 having its retaining feature 618 at a specific distance from the end of the shaft 616.

FIG. 12A and FIG. 12B illustrate the location of magnetic field sensors, shown at 328A and 328B inside electronic module shaft 616. These magnetic field sensors 328 were described with reference to the system diagram shown in FIG. 6. They will also be described later in this document with reference to FIG. 17A. The magnetic field sensors 328A and 328B are electrically coupled with the circuit boards shown at 620 and 622 in FIG. 11A or the circuit board shown at 1040 in FIG. 16A and FIG. 16B. When the magnetic field sensors 328A and 328B are proximate to a magnet, such as the lock module magnet 660 shown in FIG. 12A or the magnet shown at 1012 in FIG. 16A, FIG. 16B, and FIG. 16C, a signal is generated which can be interpreted by an electronic processing module in the system and used to determine the position of the shaft 616 in the mechanical lock module 630 in FIG. 12A and FIG. 12B, or the pin 1010 in FIG. 16A, FIG. 16B, and FIG. 16B. The lock module magnet 660 shown in FIG. 12B is mounted in the mechanical lock module frame 648 in an orientation in which one of the poles of the lock module magnet 600 will align with the upper magnetic field sensor 328B when the electronic module shaft 616 is fully inserted into the mechanical lock module 630. The lock module magnet 660 aligns with the lower magnetic field sensor 328A when the shaft 616 is partially inserted into the mechanical lock module.

The magnetic field sensors 328 used in embodiments of this invention can be any type of magnetic field sensors capable of being understood by anyone skilled in the art, including but not limited to:
  (a) Magnetically-actuated reed switches;
  (b) Hall effect sensors;
  (c) Electro-magnetic coils; and
  (d) Magneto-resistive sensors, which can include ordinary magnetoresistance (OMR) sensors, anisotropic magnetoresistance (AMR) sensors, tunneling magnetoresistance (TMR) sensors, spin Hall magnetoresistance (SMR) sensors, giant magnetoresistance (GMR) sensors, colossal magnetoresistance (CMR) sensors, Hanle magnetoresistance (HMR) sensors, and non-local magnetoresistance (NMR) sensors.

The magnetic field sensors 328 can be used to generate an analog (continuously varying) signal or a digital (on/off or switch closed/switch open) signal. In one embodiment, the magnetic field sensors are magnet Reed switches that are off when no magnetic field is present and on when a magnetic field is present. Such magnetic Reed switches have the benefit of being a proven technology that is reliable and available for a low cost.

Figure 12D:
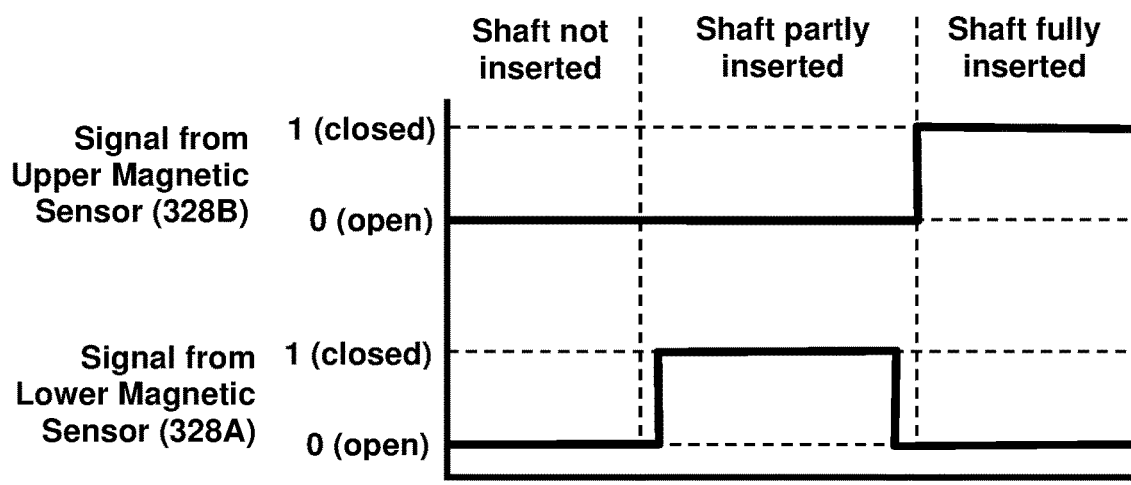
FIG. 12D is an example of an output signal generated by the magnetic field sensors shown in FIG. 12A and FIG. 12B as these sensors pass by the magnet shown in FIG. 12B during the insertion of a portion of the electronic module shaft into the mechanical lock module cavity.

FIG. 12D is an example of an output signal generated by the magnetic field sensors, 328A and 328B shown in FIG. 12A and FIG. 12B, as these magnetic field sensors pass by the mechanical lock module magnet, 660 shown in FIG. 12B, as the portion of the electronic module shaft, 616 in FIG. 12A and FIG. 12B, is inserted into the mechanical lock module cavity, 632 in FIG. 11B. The top graph section of FIG. 12D shows the signal generated by the upper magnetic sensor, 328B in FIG. 12A and FIG. 12B, as a function of shaft insertion depth and the bottom graph section of FIG. 12D shows the signal generated by the lower magnetic sensor, 328A in FIG. 12A and FIG. 12B as a function of shaft insertion depth. The output shown in FIG. 12D is a typical output from magnetic field sensors that are magnetic Reed switches. The following is a state table relating shaft insertion position to the outputs of the two magnetic sensors:

| Signal from Lower Magnetic Sensor (328A) | Signal from Upper Magnetic Sensor (328B) | System State |
|---|---|---|
| Low (no magnetic field detected) | Low (no magnetic field detected) | Shaft not inserted into mechanical lock module |
| High (magnetic field detected) | Low (no magnet field detected) | Shaft partly inserted into mechanical lock module |
| Low (no magnet detected) | High (magnetic field detected) | Shaft fully inserted into mechanical lock module |
| High (magnetic field detected) | High (magnetic field detected) | Error. There is something not correct about the system |

The above state table illustrates how the magnetic field sensors, 328A and 328B, and lock module magnet 660 can be used in embodiments of the present invention to monitor the locking and unlocking processes, as well as continuously monitoring that the lock system operates correctly. During the locking process, the lower magnetic sensor must go from low to high and back to low. The first time when the lower magnetic sensor is low, the upper magnetic sensor must also be low. The second time when the lower magnetic sensor is low, the upper magnetic sensor must be high. When the system is locked, the lower magnetic sensor must always be low and the upper magnetic sensor must always be high. During the unlocking process, the lower magnetic sensor must go from low to high and back to low. The upper magnetic sensor must be high when the unlocking process is initiated and the lower magnetic sensor is low. The upper magnetic sensor must be low when the lower magnetic sensor goes low and the unlocking process is complete. If these sequences are not followed, or if at any time, both magnetic sensors go high, an alarm can be set and communicated.

The use of a minimum of one lock module magnet 660 and a minimum of two magnetic field sensors, 328A and 328B, in the configuration shown in FIG. 12A, FIG. 12B, and FIG. 12C and connected to a processor and a wireless communication system, as described with reference to FIG. 6 creates a system that cannot be broken into by mounting a powerful magnet outside of the lock system to fool a magnetic field sensor 628 into detecting a magnetic field normally associated with a lock module magnet 660 when the mechanical lock module 630 has been removed from the electronic module shaft 616. Another feature of the system illustrated herein is that the mechanical lock module is a totally passive module. It has no electronics in it. All active electronic components are in the electronic module 610.

Figure 13A:
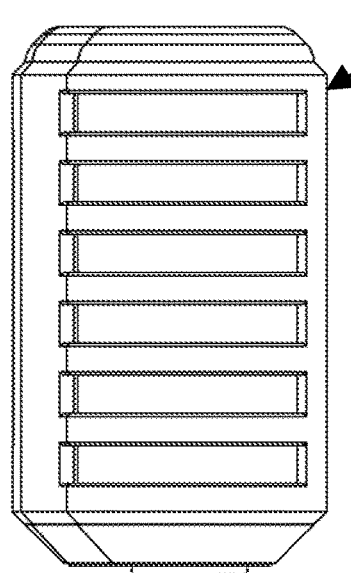
FIG. 13A is an end schematic view of the lock module and electronic module shown in the previous figures when the shaft is not inserted into the lock module.
Figure 13B:
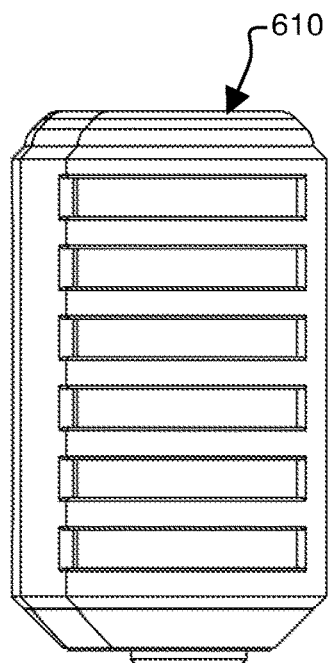
FIG. 13B is an end schematic view of the lock module and shaft module of FIG. 13A when a portion of the shaft is partly inserted into the lock module cavity.
Figure 13C:
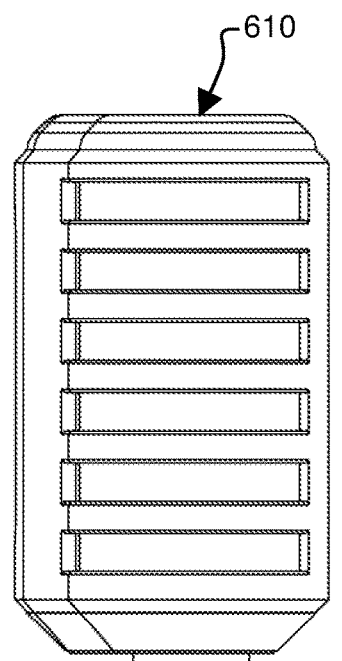
FIG. 13C is an end schematic view of the lock module and shaft module of FIG. 13A when and FIG. 13B when the shaft portion is fully inserted into the lock module cavity.

FIG. 13A, FIG. 13B, and FIG. 13C schematically show three positions for the electronic module relative to the mechanical lock module. FIG. 13A is an end schematic view of the electronic module 610 and the mechanical lock module 630 where the electronic module shaft 616 is not inserted into the mechanical lock module 630. This is the state when both the upper magnetic field sensor 328B and the lower magnetic field sensor 328B do not detect the lock module magnet 660 (i.e. the left region of the graph in FIG. 12D). FIG. 13B is an end schematic view of the electronic module 610 and the mechanical lock module 630 where the electronic module shaft 616 is partly inserted into the mechanical lock module 630 in a position where the lower magnetic field sensor 328A detects the lock module magnet 660 and the upper magnetic field sensor 328A does not detect the lock module magnet 660 (i.e. the center region of the graph in FIG. 12D). FIG. 13C is an end schematic view of the electronic module 610 and the mechanical lock module 630 where the electronic module shaft 616 is fully inserted into the mechanical lock module 630 in a position where the lower magnetic field sensor 328A does not detect the lock module magnet 660 and the upper magnetic field sensor 328A does detect the lock module magnet 660 (i.e. the right region of the graph in FIG. 12D).

Additional magnets and sensors can be added to the lock system to make it more secure and tamper-proof. By placing the magnets at different positions, it is also possible to ensure that a specific electronic module must be mated with a specific mechanical lock module. For example, the system shown in FIG. 14A, FIG. 14B, FIG. 14C, and FIG. 14D comprises three lock module magnets 660A, 660B, and 660C that are located at different positions in an alternate embodiment lock module 631A so that the magnets 660A, 660B, and 660C, will be detected by magnetic field sensors at different insertion positions for the electronic module shaft 616. The alternate embodiment electronic module 611A shown in FIG. 14A, FIG. 14B, FIG. 14C, and FIG. 14D has four magnetic field sensors 328A, 328B, 328C, and 328D that are located at various positions inside the length of the shaft 616. FIG. 14A is an end schematic view of this alternate embodiment mechanical lock module 631A having three magnets, 660A, 660B, and 660C and the alternate embodiment electronic module 611A having four magnetic field sensors, 628A, 628B, 628C, and 628D with the shaft 616 not inserted into the lock module 631A. FIG. 14B shows the alternate embodiment lock module 631A and the alternate embodiment electronic module 611A of FIG. 14A with the shaft 616 partly inserted into lock module 631A at a position where the top magnet 660A is detected by the bottom magnetic field sensor 328A in the shaft 616. FIG. 14C shows the lock module 631A and electronic module 611A of FIG. 14A with the shaft 616 inserted into lock module 631A at a position where the top magnet 660A is detected by the second from the top magnetic field sensor 328C. FIG. 14D shows the lock module 631A and electronic module 611A of FIG. 14A when the shaft is fully inserted.

The magnets can have different field strengths and the sensors can be analog magnetic field sensors to make the lock system even more secure and tamper-proof. For example, FIG. 15A, FIG. 15B, FIG. 15C, FIG. 15D, and FIG. 15E illustrate a second alternate embodiment locking system in which there are four analog magnetic field sensors that can detect magnetic field strength, 628A, 628B, 628C, and 628D and four alternate lock module magnets 661A, 661B, 661C, and 661D, that have differing magnetic field strengths, as indicated by the diameters of the circles for these magnets. The systems shown in FIG. 15A, FIG. 15B, FIG. 15C, and FIG. 15D is configured to convert these different magnetic fields strengths to analog electrical values. In FIG. 15A, this system is illustrated with the shaft 616 of the second alternate embodiment electronic module 611B not inserted into the second alternate embodiment lock module 631B. In FIG. 15B, this system is illustrated with the shaft 616 inserted so that the bottom sensor can read the top magnet. In FIG. 15C, this system is illustrated with the shaft inserted so that the second from the top sensor can read the top magnet. In FIG. 15D, this system is illustrated with the shaft fully inserted.

FIG. 15E shows a graph of the magnetic field strength of the four alternate lock module magnets 661A, 661B, 661C, and 661D of FIG. 15D as these magnetic field strengths are detected by the four sensors, 628A, 628B, 628C, and 628C when the shaft 616 of the second alternate embodiment electronic module 611B is inside the second alternate embodiment lock module in the position shown in FIG. 15D. It can be appreciated from this graph that the profile being read by the four analog magnetic field sensors looks analogous to the profile on a typical key used in a lock. This illustrates that the use of multiple magnets with multiple field strengths in conjunction with multiple magnetic field sensors capable of reading analog values can be used to "key" the mechanical lock modules to specific electronic modules.

One way of summarizing some of the functionality and of the magnet(s) and sensors systems illustrated in FIG. 12A through FIG. 15E is as follows:

- The electronic module 610 comprises a shaft 616 made of a non-magnetic material, typically stainless steel;
- The electronic module shaft 616 is hollow, so a plurality of magnetic field sensors 328 can be placed into the center of the shaft at various points along the length of the shaft;
- The mechanical lock module 630 comprises at least one magnet 660;
- When the shaft 616 is inserted into the mechanical lock module 630, each magnetic field sensor will detect the magnet (or each magnet) at specific positions of insertion of the shaft 616 into a cavity 632 of the mechanical lock module 630;
- The signals from the magnetic field sensors can be used to determine a variety of conditions related to the lock system.

Among the conditions of the lock system that the magnetic field sensors can detect and wirelessly communicate can include:

(a) Interruptions in any of the signals indicating a fault with any part of the system;
(b) A condition indicative of an attempt to fool the lock; and
(c) An incorrect combination of an electronic module 610 and mechanical lock module 630.

Figure 16B:
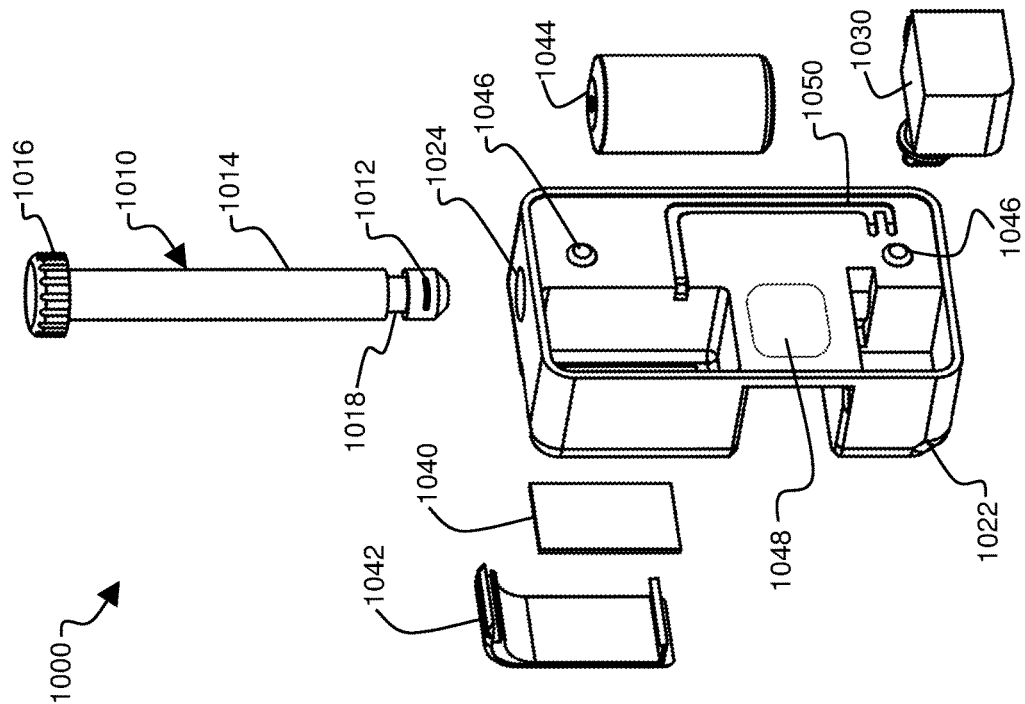
FIG. 16B shows an exploded rear view of the lock embodiment shown in FIG. 1.
Figure 16A:
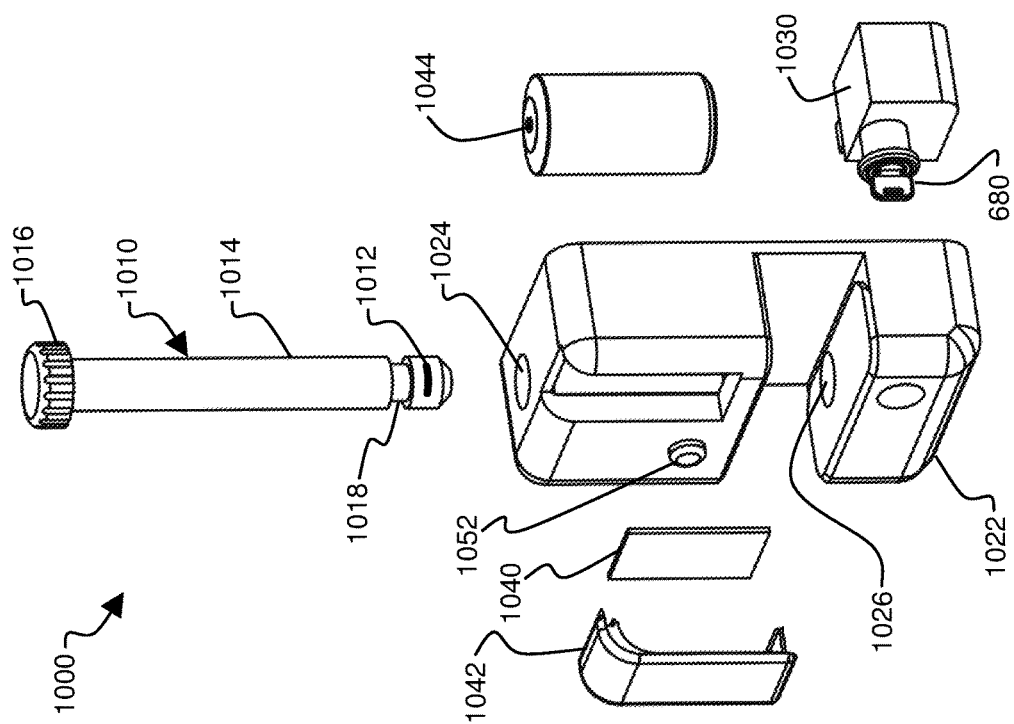
FIG. 16A shows an exploded front view of the lock embodiment shown in FIG. 1.

FIG. 16A shows an exploded front view of the electronic tracking and monitoring lock 1000 that was also shown in FIG. 1 and FIG. 2D. FIG. 16B shows an exploded rear view of this same electronic tracking and monitoring lock 1000. FIG. 17A is a left side view of this lock mounted on a movable freight container door 160 using two movable freight container door mounting bolts 166. The lock or locking system comprises a mechanical lock element shown at 1010. The mechanical lock element 1010 comprises a mechanical lock element shaft 1014 and a mechanical lock element head 1016. The mechanical lock element 1010 can also be called a locking pin. Such locking pins exist in the prior art, but the pin in this embodiment was modified to include one or more magnets, shown at 1012. The locking pin 1010 comprises a mechanical lock pin shaft retaining feature 1018, which in the embodiment shown, is a circular groove 1018 in the round cylindrical shaft of the mechanical lock element 1010. The locking pin 1010 can be made any material, but should be non-magnetic, such as a non-ferromagnetic hardened stainless steel.

The lock 1000 in FIG. 16A, FIG. 16B, and FIG. 17A also comprises an electronic lock module (1020 in FIG. 1 and FIG. 2D), which can comprise a locking system housing, shown at 1022. The locking system housing 1022 can be made as a die casting from a material such as aluminum or it could be machined hardened steel case, for example. The locking system housing 1022 can comprise an electronic lock module through hole (or aperture) in a first section, shown at 1024 in FIG. 16A and FIG. 16B, and an electronic lock module cavity in a second section, shown at 1026 in FIG. 16B. The system 1000 can be designed so the pin 1010 goes through the through hole 1024 and at least a portion of the shaft 1014 of the pin 1010 goes into the cavity 1026. In one embodiment, the magnet 1012 is inside the cavity 1026 when the pin 1010 is secured in the locking system housing 1022 of the electronic lock module.

Further referring to FIG. 16A and FIG. 16B, a lock mechanism is shown at 1030. The lock mechanism 1030 is located inside the locking system housing 1022 when the system is assembled. The lock mechanism 1030 comprises a mechanical movement that can be used to move the lock mechanism from an unlocked position to a locked position. In one embodiment, the lock mechanism is operated using a mechanical key, shown at 680 in FIG. 16A, FIG. 16B, and FIG. 17, that can be used to move the lock mechanism from an unlocked to a locked position to retain at least a portion of the shaft 1014 of the mechanical lock pin 1010, and more specifically, the portion of the shaft 1014 that comprises the magnet 1012.

The operation of the lock mechanism 1030 shown in FIG. 16A and FIG. 16B can be similar to the lock mechanism shown and described with reference to FIG. 12A, FIG. 12B, and FIG. 12C, and this lock mechanism 1030 can comprise any of the elements shown in FIG. 12A, FIG. 12B, and FIG. 12C, such as the key pins 654 and driver pins 652 (collectively called lock pins), and springs 650. The lock mechanism cylinder, shown by dotted (hidden) lines at 1032 in FIG. 17A can be the same as the lock mechanism cylinder shown at 640 in FIG. 12A and FIG. 12B and this cylinder can engage with a plurality of lock pins, the key, and a locking plate in a manner similar to what was shown and described with reference to FIG. 12A and FIG. 12C. One important difference between the embodiment shown in FIG. 12A and FIG. 12C, versus the embodiment shown in FIG. 17A is that in the embodiment show in FIG. 17A the centerline of the lock cylinder, 1032CL, is perpendicular to the centerline of the lock pin (or lock pin shaft), as shown at 1010CL In the embodiment shown in FIG. 12A and FIG. 12C, these two centerlines are parallel.

Referring to FIG. 16A and FIG. 16B, the lock mechanism 1030 can also be a keyless lock mechanism that is motor operated. The motor driven keyless lock mechanism could be responsive to a wireless signal, such as a Bluetooth signal, or near field communications (NFC) in order to move the lock mechanism 1030 from an unlocked to a locked position to retain at least a portion of the shaft 1014 of the lock pin 1010 as described previously. The lock mechanism 1030 could be a removable unit or it could be integrated into the electronic lock module 1020 in FIG. 1 and FIG. 2D.

As shown in FIG. 16A and FIG. 16B, the locking pin (mechanical lock element) 1010 is fully removable. In order to hold the mechanical lock element 1010, the electronic lock module can comprise a mechanical lock element keeper, shown at 1052 in FIG. 16A and FIG. 17A, that engages with the mechanical lock element shaft retaining feature 1018 to hold the locking system 1000 in an open configuration that allows the door handle (150 in FIG. 1 and FIG. 2D) to be placed (i.e. rotated) into the slot of the door handle retaining region. The mechanical lock element keeper 1052 can be a detent that is normally pressed against the shaft 1014 and is pushed into the retaining feature groove 1018 by a spring. Externally, the keeper 1052 can look like a button that is pushed by a user to release the pin, in a manner and configuration capable of being understood by anyone skilled in the art.

FIG. 16A and FIG. 16B show that these embodiments can comprise a circuit board, shown at 1040 and this circuit board can comprise any or all of the electronic components that were described for the electronic tracking and monitoring module 300 of FIG. 6 and/or the power circuit 400 of FIG. 8A and/or the alternate power circuit 401 of FIG. 8B. The circuit board 1040 can be located in the locking system housing 1022 behind a circuit board cover 1042 when the electronic lock module (1020 in FIG. 2D) is assembled. The circuit board cover 1042 could be made of a material that is transparent to electromagnetic waves, to facilitate wireless communication to and from the circuit board. The system 1000 shown in FIG. 16A and FIG. 16B can also comprise a battery, shown at 1044. The battery can sit behind the circuit board 1040 when the system 1000 is assembled. The battery 1044 can of any type, including but not limited to the rechargeable battery 432 and/or the non-rechargeable high capacity battery 440, both of FIG. 8A, FIG. 8B, and FIG. 11A. The battery could also be any other type of electrical storage medium such as a capacitor, super capacitor, ultra-capacitor or any other electrical storage medium capable of being understood by anyone skilled in the art.

The embodiment shown in FIG. 16B also shows mounting bosses at 1046, which can be used for securely mounting the system 1000 to the door of a movable vehicle container, through for example, the use of metal fasteners through the door, such as bolts that have heads on the inside of the movable vehicle container door, as was shown at 166 in FIG. 17A. It can be understood that the system could also have a back plate and grommet (not shown) to seal the locking system housing 1022 from the elements. Also shown in FIG. 16B is a door handle presence detection sensor 1048. The door handle presence detection sensor 1048 can be any sensor capable of being understood by a person skilled in the art such as a hall effect proximity probe, an optical sensor, a magnetic sensor, an inductive sensor, an ultrasonic sensor, or a capacitance sensor.

The shaded area shown at 1054 in FIG. 17A is the door handle securing region. This securing region 1054 is between the locking pin 1010 and the door 160 and in a slot that separates the part of the electronic lock module that has the aperture (or through hole), shown at 1024 in FIG. 16A and FIG. 16B, and the part of the electronic lock module that has the cavity, shown at 1026 in FIG. 16A.

FIG. 16B also shows magnetic field sensor wiring 1050 that connects the circuit board 1040 to one or more magnetic field sensors, shown at 328A and 328B in FIG. 17A. The magnetic field sensor or sensors (328A and/or 328B) can be configured for detecting the mechanical lock pin magnet (or magnets) 1012 when the end portion of the mechanical lock pin shaft 1014 is inserted into the electronic lock module cavity 1026 of the assembled system 1000. The magnetic sensors 328A and 328B can be of any type described in this document, or capable of being understood by anyone skilled in the art. The magnetic sensors 328A and 328B work with the processing component and communications component in the same way as was described for the locking system 600 that was described with reference to FIG. 2A, FIG. 3, FIG. 4B, FIG. 5B, FIG. 6, FIG. 7, FIG. 8B, and FIG. 10A to FIG. 15E. The only difference is that the upper sensor 328B is now the first sensor to detect the magnet, which is now in the shaft, and the lower sensor 328A is the second sensor to detect the magnet, which changes the table shown previously to the one below:

| Signal from Lower Magnetic Sensor (328A) | Signal from Upper Magnetic Sensor (328B) | System State |
| --- | --- | --- |
| Low (no magnetic field detected) | Low (no magnetic field detected) | Shaft not inserted into mechanical lock module |
| Low (no magnetic field detected) | High (magnetic field detected) | Shaft partly inserted into mechanical lock module |
| High (magnetic field detected) | Low (no magnetic field detected) | Shaft fully inserted into mechanical lock module |
| High (magnetic field detected) | High (magnetic field detected) | Error. There is something not correct about the system |

It should further be noted that the locking system shown in FIG. 17A could also use more than one magnet and more than two magnetic sensors in the same way as the system shown in FIG. 14A through FIG. 15E used more than one magnet and more than two magnetic sensors. The magnetic sensors could be analog magnetic sensors or digital magnetic sensors, or any other variety or combination that has been described herein with reference any lock, locking system, or locking method described and/or illustrated in this document. The one or more mechanical lock element (lock pin) magnets could be in any part of the pin 1010 in FIG. 16A, including the pin head 1016, the shaft 1014, the groove 1018, and/or the tip portion and not all of the magnets need to be in the same part of the mechanical lock element 1010 in FIG. 16A. In one embodiment, the mechanical lock element 1010 comprises two magnets located in the tip portion of the shaft 1014. The magnetic sensors 328A, 328B, and/or any other magnetic sensors could be located anywhere in the electronic lock module 1020 in FIG. 1, that will function correctly based on the location of the magnet or magnets.

The lock, locking system, or locking methods shown in FIG. 1, FIG. 2D, FIG. 16A, FIG. 16B, and FIG. 17A can be sensitive to the orientation of the magnet (or magnets) 1012 relative to the location and orientation of the magnetic field sensor or sensors 328A and 328B in FIG. 17A. FIG. 17B shows one embodiment of the invention in which the magnet in Section D-D of FIG. 17A, is a transversally-oriented magnet 1012A that has a magnetic north-south pole axis spans across the diameter of the mechanical lock pin shaft 1014 and is therefore perpendicular to the lock pin shaft (mechanical lock element shaft) 1014. When the transversally-oriented magnet 1012A is aligned so that either its north (N) or its south (S) pole is facing the magnetic field sensor 328A, the magnetic flux lines, shown at dotted lines at 1056, provide the strongest magnetic signal to be picked up by the magnetic field sensor 328A based on how it is oriented. If the mechanical lock pin shaft 1014 and transversally-oriented magnet 1012A are rotated 90 degrees, either clockwise or counterclockwise, the magnetic field sensor 328A receives the weakest magnetic signal based on the orientation of the magnetic field sensor shown. Thus, to optimize performance for the configuration shown in FIG. 17B, it is beneficial to have a mechanical lock pin shaft orientation feature 1058 (in this case a flat) that engages with some part of the electronic lock module 1010 in FIG. 2D to ensure that the lock pin shaft 1014 and transversally-oriented magnet 1012A have the optimal orientation relative to the magnetic field sensor 328A by preventing rotation of the lock pin shaft (mechanical lock element shaft) 1014 in the electronic lock module, 1020 in FIG. 1D.

FIG. 17C illustrates configuration for reducing the sensitivity of the magnetic field sensor to the orientation of the magnet(s) in the lock pin. FIG. 17C is the same cross section D-D of FIG. 17A as FIG. 17B. In the configuration shown in FIG. 17C, a plurality of magnets 1012B are placed radially around the center of the lock pin shaft 1014 with one pole pointing to the center of the lock pin shaft 1014 and the other pole pointing radially outwards. The radially-oriented lock pin magnets 1012B ensure that the magnetic field seen by the magnetic field sensor 328B varies significantly less as the lock pin shaft is rotate in the configuration of FIG. 17C, than in the configuration of FIG. 17B, reducing or eliminating the need for orienting the lock pin shaft 1014.

FIG. 17D illustrates a further refinement of the configurations that were shown in FIG. 17B and FIG. 17C when applied to section D-D of FIG. 17A. The plurality of radial magnets 1012B in FIG. 17C have been replace by a single toroidal lock pin magnet 1012C in FIG. 17D, that is wrapped around center of the lock pin shaft 1014. This toroidal lock pin magnet 1012C can also be described as having a hollow cylindrical shape. This single toroidal lock pin magnet 1012C has one magnetic pole pointing to the central aperture (donut hole) of its toroidal shape and the and the other magnetic pole pointing radially outward from its central plane, i.e. the plane perpendicular to the central axis of its cylindrical shape. In this configuration, the central axis of the hollow cylindrical magnet 1012C is aligned with the central axis of the lock pin shaft 1014 (mechanical lock element shaft circular cross section). Thus, the magnetic flux field seen by the magnetic field sensor 328A is insensitive to the rotation of the lock pin shaft 1014 and the toroidal lock pin magnet 1012C in the embodiment shown in FIG. 17D.

FIG. 17E illustrates another alternative magnet and magnetic field sensor arrangement that can be used in embodiments of the present invention. FIG. 17E is a detailed view of the end of the lock pin shaft 1014 that was also shown in FIG. 17A, along with an alternate embodiment magnetic field sensor 329, that is similar to the sensor 328A that was shown in FIG. 17A. In the embodiment shown in FIG. 17E, the alternate magnetic field sensor 329 is a type that detects the magnetic flux field 1056 differently from the magnetic field sensors 328A that were shown in FIG. 17A, FIG. 17B, FIG. 17C, and FIG. 17D in that the alternate magnetic field sensor 329 is designed to operate when aligned with the magnetic flux lines 1056. The axially-oriented lock pin magnet 1012D in the embodiment shown in FIG. 17E is wrapped around the diameter of the lock pin shaft and has its north and south poles are oriented axially (i.e. in parallel with the axis of the cylindrical mechanical lock element shaft 1014), which produces a magnetic field that is insensitive to rotation of the lock pin shaft 1014.

Figure 18:
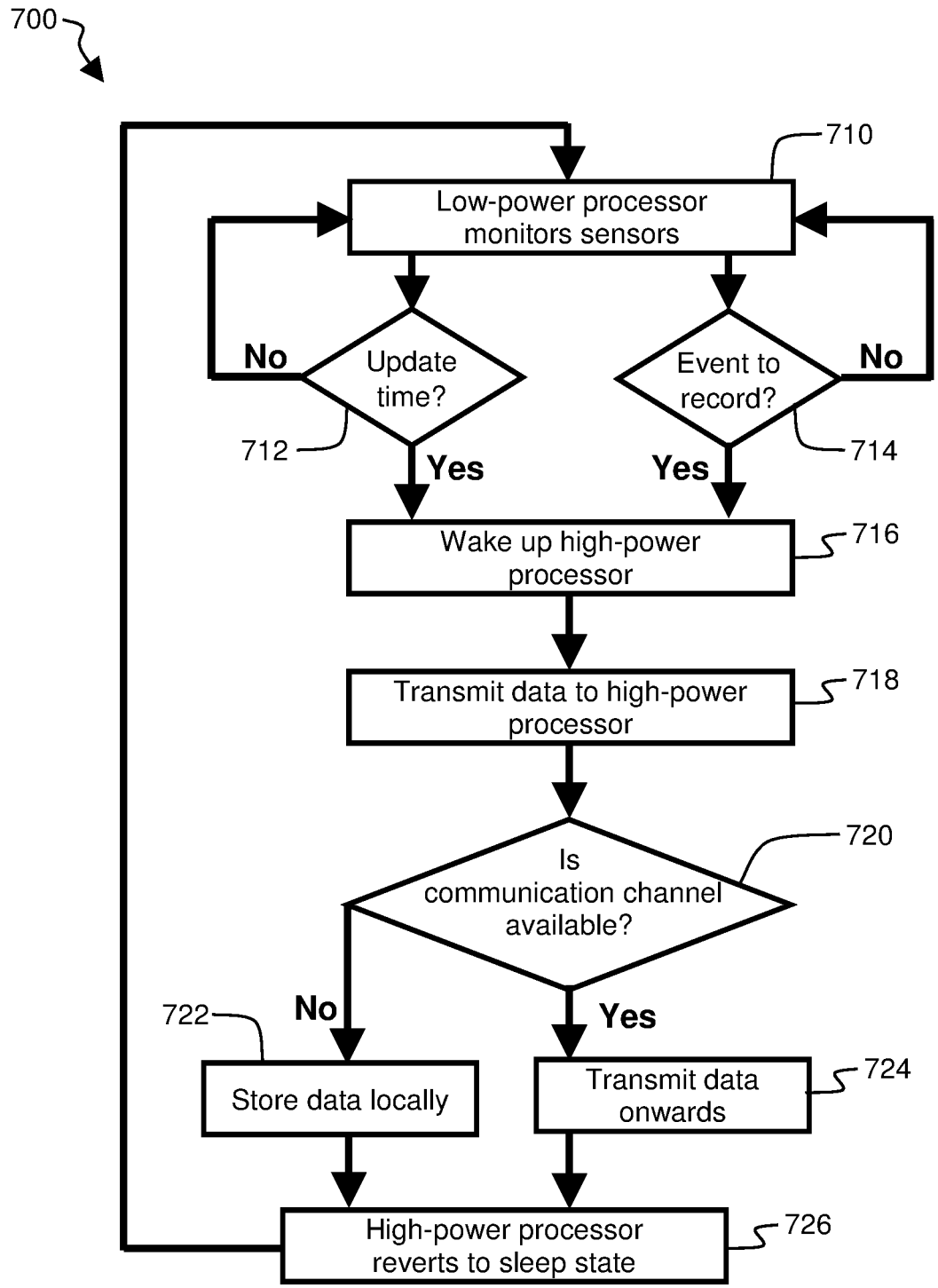
FIG. 18 is a process flow chart for how a low-power processor and high-power processor that can be used to minimize energy consumption for an electronic tracking device.

FIG. 18 shows a process for using a low power processor to minimize energy consumption for an electronic tracking device 700. The power minimization process uses a low power processor to monitor sensors as shown at 710. As long as a pre-determined update time is not reached, as shown at 712, or an event occurs that needs to be recorded, as shown at 712, the high-power processor stays asleep. When it is time to update the information 712 or there is an event to record, the high-power processor is woken up, as shown at 716. This allows data to be transmitted to the high-power processor, as shown at 718. Next, a decision needs to be made based on whether a communication channel is available, a step shown at 720. This communication channel could be a cellular communication channel, it could be an inter-device (e.g. mesh network communication channel as was described with reference to FIG. 7), it could be a WiFi communication channel, and/or it could be any other communication channel based on any other communication method or protocol described herein or capable of being understood by anyone skilled in the art. If no communication channel is available, data is stored locally, as shown at 722. If a communication channel is available, data is transmitted onwards, as shown at 724. Once data has either been stored locally 722 or transmitted onwards 724, the high-power processor can revert to a low power consuming sleep mode, as shown at 726.

The use of "dead reckoning" to determine the position of a device when other positioning information is not available requires the system to (a) start calculating from a known position, (b) use acceleration information as a function of time to determine velocity information as a function of time, and (c) use the velocity information as a function of time and the known position information to determine position information for the device as a function of time. This velocity information can come from the IMU. It can also be supplemented with velocity information from the vehicle. Since the acceleration information from the inertial measurement unit (IMU) can be noisy, it is important to try to use redundancy and noise filtering technologies to improve the accuracy of the system. Embodiments of the present invention can use a Kalman filter, a Madgwick filter, and/or a Mahony filter as well as redundant IMUs to help improve the accuracy of the position information calculated using "dead reckoning".

Fusion filters such as those attributed to Mahoney, Madgwick and Kalman, can use Euler angles or quaternions for coordinate transformations. The Euler angle representation is sometimes called a 3-2-1-rotation sequence of yaw (or heading), pitch, and roll. Using Euler angles, the position of a point in space can be determined using a spherical coordinate system. A spherical coordinate system permits the user to identify any point in space from two tilt angles and one radial distance. The tilt angles, pitch and roll, captured from an inertial sensor (such as an accelerometer, gyroscope, and/or magnetometer) can be used respectively as Alpha and Beta angles of the spherical coordinate system as illustrated in the equations below. Orientation can be captured by measuring the projection of the static gravity on a tilted accelerometer (or other type of inertial sensor). Radial distance R can be measured using a linear measurement from an accelerometer. Combining orientation and radius, the instantaneous position of an object in an inertial frame can be expressed as a function of the time-varying radius and spherical angles (Euler angle transformation).

$X = R(t) \cdot \cos(\alpha) \cdot \sin(\beta)$ $Y = R(t) \cdot \sin(\alpha) \cdot \sin(\beta)$ $Z = R(t) \cdot \cos(\beta)$ It is important to distinguish between the inertial frame and the user frames. The inertial frame is considered as a reference and all objects in the 3D virtual environment are expressed with respect to it. Thus, the inertial frame is fixed. The x-axis is pointing to any convenient direction, the z-axis is pointing vertically upward and the y-axis is perpendicular to both. The user frame is the moveable system containing the pointer. It is defined by a rotation around the z-axis by $\psi$ and by the rotation around x and y by $\theta$ and $\Phi$. Moreover, the distance between those frames defines the offset of the pointer with respect to the inertial frame. The figure below illustrates those rotations (Euler angle transformations). The matrix linking between those two frames is the product of the following rotation matrix.

$$E = e^{(\tilde{z} \times)\psi} e^{(\tilde{y} \times)\theta} e^{(\tilde{x} \times)\phi} = \begin{bmatrix} \cos(\psi) & -\sin(\psi) & 0 \\ \sin(\psi) & \cos(\psi) & 0 \\ 0 & 0 & 1 \end{bmatrix} \cdot$$

$$\begin{bmatrix} \cos(\theta) & 0 & \sin(\theta) \\ 0 & 1 & 0 \\ -\sin(\theta) & 0 & \cos(\theta) \end{bmatrix} \cdot \begin{bmatrix} 1 & 0 & 0 \\ 0 & \cos(\varphi) & -\sin(\varphi) \\ 0 & \sin(\varphi) & \cos(\varphi) \end{bmatrix}$$

After developing we get:

$$R_{IB} = \begin{bmatrix} \cos(\psi).\cos(\theta) & \cos(\psi).\sin(\theta).\sin(\varphi) - \sin(\psi).\cos(\varphi) & \cos(\psi).\sin(\theta).\cos(\varphi) - \sin(\psi).\sin(\varphi) \\ \sin(\psi).\cos(\theta) & \sin(\psi).\sin(\theta).\sin(\varphi) - \cos(\psi).\cos(\varphi) & \sin(\psi).\sin(\theta).\cos(\varphi) - \cos(\psi).\sin(\varphi) \\ -\sin(\theta) & \cos(\theta).\sin(\varphi) & \cos(\theta).\cos(\varphi) \end{bmatrix}$$

In comparison, a quaternion is an abstract means for representing a change or reference frames as a four-dimensional vector to describe a three-dimensional change in orientation (or attitude). Although the Euler angle representations of attitude, is quite intuitive as a three-dimensional vector representing a three-dimensional attitude, it suffers from an inherent problem with its attitude representation. There are two attitudes (90 degrees and 270 degrees) where a singularity occurs in which case the yaw and the roll would perform the same operations. This "gimbal lock" issue could be quite problematic in the control of a body when dealing with angles close to the singularity points. A quaternion attitude representation can be used to provide a full description of an orientation without the need for handling the Euler angle singularities computationally. There are several other advantages to using a quaternion attitude representation over Euler angles. One of these advantages is that the use of quaternions is that no trigonometric functions need to be solved, as is the case when using Euler angles. Trigonometric functions are computationally expensive to solve and can slow down the control look. Small angle approximations can be used for orientation changes of less than 5 degrees, but this can create other issues. Quaternions require a single trigonometric calculation only when a non-zero yaw angle is included in the orientations. Otherwise, quaternion calculations are solely algebraic and computationally inexpensive. It is also simpler to smoothly interpolate between two orientations when using quaternions rather than Euler angles. However, converting a quaternion orientation into a usable pitch, roll, and yaw orientation does require an extra algebraic transformation that is not needed when using Euler angles.

Quaternions get around the "gimbal lock" problem by over defining an attitude representation through the addition of an additional degree not included when calculating Euler transformations. Like Euler angles, quaternions are based on Euler's concept that: "A rigid body or coordinate reference frame can be brought from an arbitrary initial orientation to an arbitrary final orientation by a single rigid body rotation through a principal angle $\Phi$ about the principal axis; the principal axis is a judicious axis fixed in both initial and final orientation." This principle means that any arbitrary orientation could be represented with just a unit vector and an angle where the unit vector (r) defines the direction of rotation and the angle ($\theta$) being the amount of rotation about the direction's axis to reach a final attitude from an initial one. The quaternion approach is based upon this principle and can be derived from the principal axis (r) and principal angle ($\theta$). A quaternion is a 4-dimensional hyper-complex number. The three complex parts, denoted as I, j, and k are interrelated by the following equations:

$i2 = j2 = k2 = 1$ $ij = k = ji$ $jk = i = kj$ $ki = j = ik$

While different papers on the subject use different ordering of the terms, all quaternions fundamentally represent the same thing. Hence, a quaternion could be used to represent the orientation of a rigid body or coordinate frame in three-dimensional space $${}^{A}_{B}\hat{q} = [q_0 \ q_1 \ q_2 \ q_3] = \left[\cos\frac{\theta}{2} \ -r_x\sin\frac{\theta}{2} \ -r_y\sin\frac{\theta}{2} \ -r_z\sin\frac{\theta}{2}\right]$$

representation of the quaternion coordinate transformations in embodiments of the sensor signal filter systems shown in FIG. 19A, FIG. 19B, FIG. 20, FIG. 21A and FIG. 21B. The following equation describes a quaternion-based transformation where $_B^A\hat{q}$ is a quaternion representing the coordinate transformation and $_B^A\hat{q}$ is defined by the following equation: Where:

$q_0$ is the scalar component of the quaternion and $q_1$, $q_2$, and $q_3$ represent the vector components of the quaternion. Note that quaternions can be written as a vector with 4-scalar components ($q_0$, $q_1$, $q_2$, and $q_3$), with components $q_1$, $q_2$, and $q_3$ corresponding to the distance along the quaternion basis vectors of i, j, and k. The $q_0$ component is considered the scalar part of the quaternion and $q_1$, $q_2$, and $q_3$ together form the vector part. Hence, another representation of the quaternion in the complex domain is $_B^A\hat{q} = q_0 + q_1 i + q_2 j + q_3 k$ r is the axis of rotation in frame A and $r_x$, $r_y$, and $r_z$ are the axis components also the x, y and z axes θ is the angle of rotation around the axis r It is often useful to represent a quaternion rotation with an orthogonal matrix that, when post-multiplied by a column vector representing a point ins pace, results in the point rotated by the quaternion. This orthogonal matrix R is shown in the following equation:

$$_B^A R = \begin{bmatrix} 2q_0^2 - 1 + 2q_1^2 & 2(q_1 q_2 + q_0 q_3) & 2(q_1 q_3 - q_0 q_2) \\ 2(q_1 q_2 - q_0 q_3) & 2q_0^2 - 1 + 2q_2^2 & 2(q_2 q_3 + q_0 q_1) \\ 2(q_1 q_3 + q_0 q_2) & 2(q_2 q_3 - q_0 q_1) & 2q_0^2 - 1 + 2q_3^2 \end{bmatrix}$$

It is also useful to represent the Euler angles as a function of the quaternions. In an Euler angle representation of a transformation the ZYX Euler angles Φ, θ, and ψ, describe the orientation of frame B achieved by the sequential rotations from alignment with frame A, of ψ around the Z axis of Frame B, θ around the Y axis of Frame B, Φ and around the X axis of Frame B. Hence, the Euler angles can be calculated by the following equations using $$_B^A \hat{q} = [q_0 \ q_1 \ q_2 \ q_3] = \left[\cos\frac{\theta}{2} \ -r_x \sin\frac{\theta}{2} \ -r_y \sin\frac{\theta}{2} \ -r_z \sin\frac{\theta}{2}\right]$$

$$\phi = \text{atan2}\ (2(q_2 q_3 - q_0 q_1), 2q_0^2 - 1 + 2q_3^2)$$

$$\theta = -\arctan\left(\frac{2(q_1 q_3 + q_0 q_2)}{\sqrt{1 - (2q_1 q_3 + 2q_0 q_2)^2}}\right)$$

$$\psi = \text{atan2}\ (2(q_1 q_2 - q_0 q_3), 2q_0^2 - 1 + 2q_1^2)$$

Figure 19A:
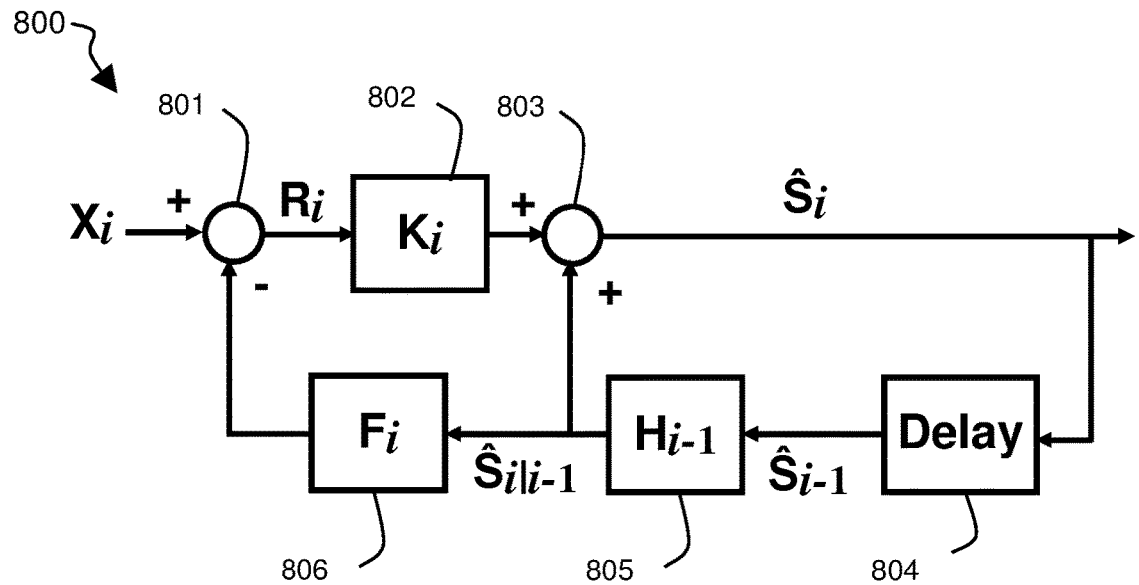
FIG. 19A shows a generalized Kalman filter.

FIG. 19A shows the main elements of a generalized Kalman filter, 800. A Kalman filter is a linear, unbiased, and minimum error variance recursive algorithm that optimally estimates the unknown state of a linear dynamic system from noisy data taken at discrete real-time intervals. Referring to FIG. 19A, the actual measurement Xi is compared with the predicted measurement from the prediction model 806, a step shown at 801. The measured difference between actual measurement Xi and the output from the prediction model 806 is called residual or innovation Ri. This residual Ri is multiplied by a Kalman filter gain in the step labeled 802. Step 802 can comprise a matrix multiplication. In the step labeled 803 the output of the Kalman gain computation is added to the system model output based on the previous estimate, a value shown as Ŝi|i+1. The result of the addition in step 803 is a new state estimate Ŝi. The new state estimate Ŝi is updated at discrete time intervals based on the length of the time interval delay 804. After this time delay, the most recent state estimate becomes Ŝi−1, and is called the previous state estimate. The previous state estimate Ŝi−1 is then fed through a system model 805 which results in a system model output based on the previous state estimate Ŝi|i−1. This system model transformation 805 can comprise a matrix multiplication. The system model output based on the previous estimate Ŝi|i−1 serves as the input for a prediction model transformation, shown at 806. The prediction model transformation 806 can also comprise a matrix multiplication. When using a Kalman filter for generating position and orientation information, coordinate transformations performed in the Kalman filter gain calculation 802, the system model transformation 805, and the prediction model transformation 806, can be performed using the Euler angle transformations or through the use of quaternions.

Figure 19B:
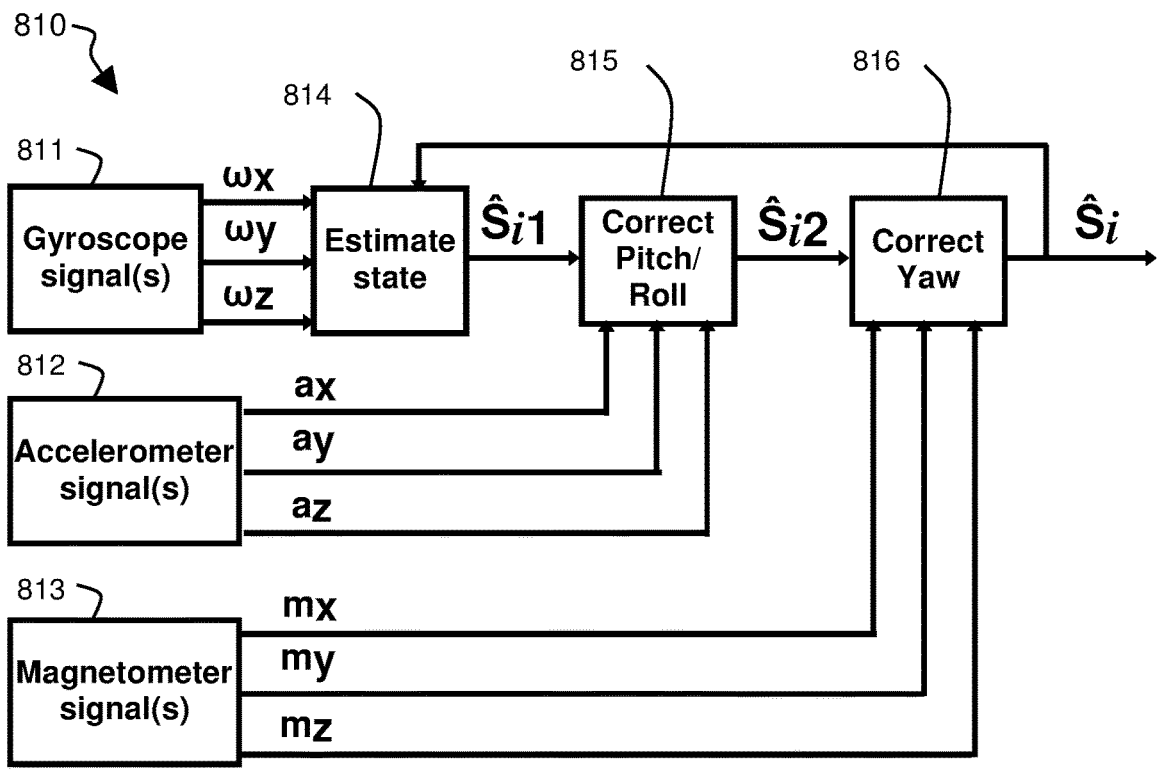
FIG. 19B shows an extended Kalman filter for use in an inertial measurement unit.

FIG. 19B shows the main elements of an extended Kalman filter 810 configured for use in an inertial measurement unit (IMU). In FIG. 19B there are three signals that come from a gyroscope 811 and used to estimate state 814, using a Kalman filter implementation similar to the generalized Kalman filter 800 shown in FIG. 19A. These three signals are labeled ωx, ωy, and ωz in FIG. 19B and represent the rate of change of rotation of the gyroscope about three mutually perpendicular (x, y, and z axes) in a Cartesian reference frame. The result of this first Kalman filter to estimate state 814, is a first state estimate Ŝi1. This first state estimate Ŝi1 can be combined with accelerometer orientation signals ax, ay, and az from the accelerometer 812. These three accelerometer orientation signals ax, ay, and az are rotation signals about the same three perpendicular axes as for the gyroscope. Combining ax, ay, and az with Ŝi1 in the second Kalman filter, shown at 815, results in a second state estimate Ŝi2, in which pitch and/or roll have been corrected. This second state estimate Ŝi2 can be combined with magnetometer orientation signals mx, my, and mz from the magnetometer 813. These three magnetometer orientation signals mx, my, and mz are rotation signals about the same three perpendicular axes as for the gyroscope and the accelerometer. Combining mx, my, and mz with Ŝi2 in the third Kalman filter, shown at 816, results in an output state estimate Ŝi, in which yaw has also been corrected. The resulting orientation state estimation can be made significantly more accurate using this extended Kalman filter and three different orientation signal inputs 811, 812, and 813, than a Kalman filter using only one input, as was illustrated in FIG. 19A.

Figure 20:
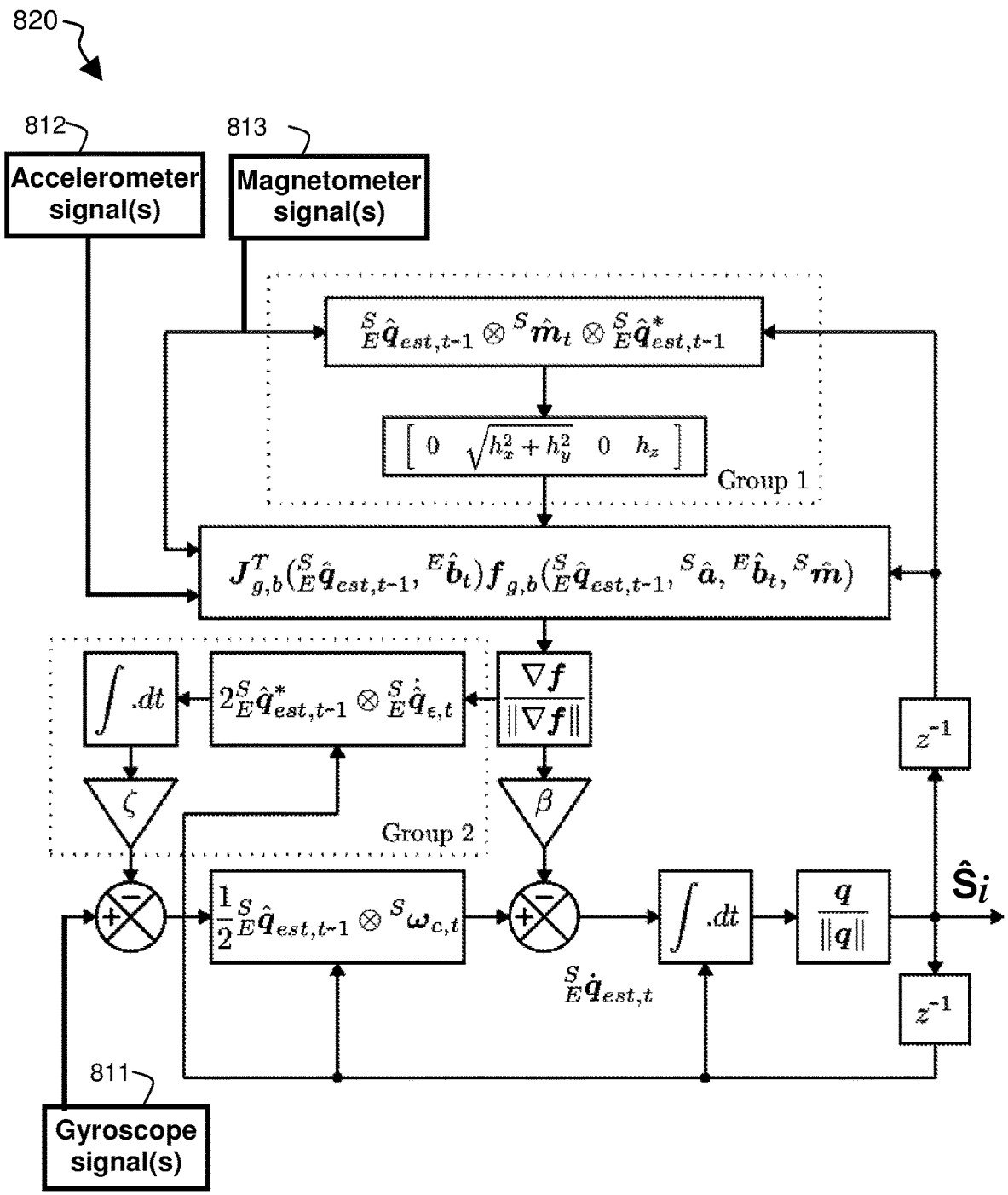
FIG. 20 shows a Madgwick filter using magnetometer, accelerometer, and gyroscope inputs (MAGI)

FIG. 20 shows the main elements of a Madgwick filter 820 used for an IMU. Referring to FIG. 20 the Madgwick filter 820 also uses orientation inputs from a gyroscope 811, a magnetometer 813, and an accelerometer 812 to generate the output state estimate Ŝi. The Madgwick filter calculates the orientation output Ŝi by numerically integrating the estimated orientation rates. The orientation output Ŝi is computed based on the rate of change of orientation measured by the gyroscope 811. The magnitude of the gyroscope measurement error is removed in the direction of the estimated error. This estimated error is computed from accelerometer measurements 812 and magnetometer measurements 813 using the equations shown in FIG. 20.

Figure 21A:
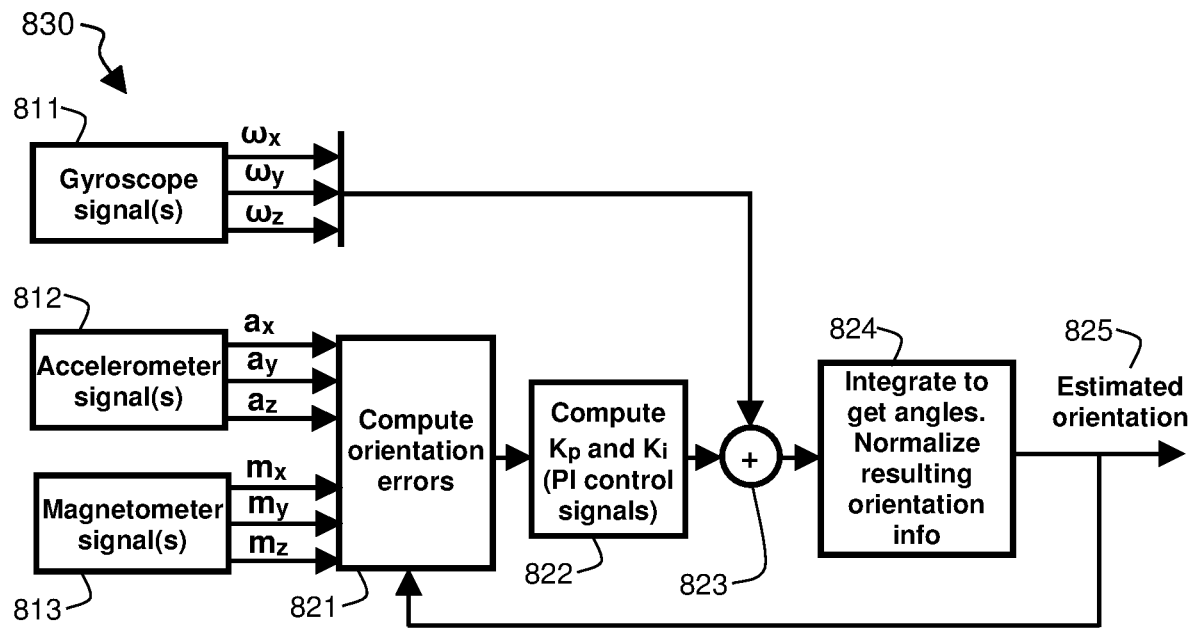
FIG. 21A and FIG. 21B show the main elements of a Mahony filter using magnetometer, accelerometer, and gyroscope inputs (MAGI)
Figure 21B:
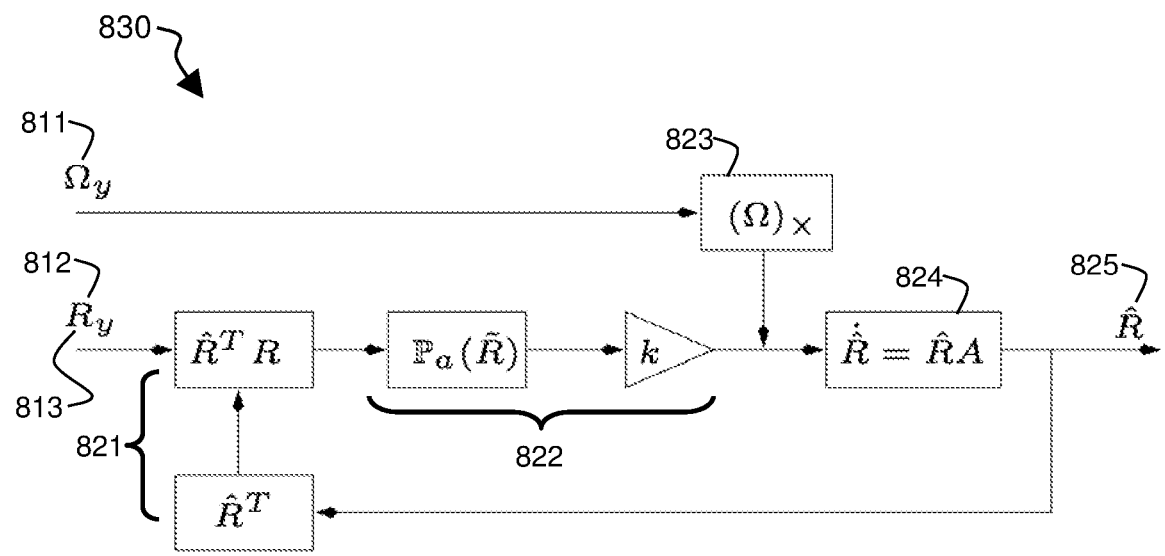

FIG. 21A and FIG. 21B show the main elements of a Mahony 830 filter. The Mahony filter is similar to the Madgwick filter 820 and can be implemented using Euler angles or quaternions. FIG. 21A provides an overview of one embodiment of a Mahony filter 820 using Euler angles x, y, and z from a gyroscope (ω, shown at 811), accelerometer (a, shown at 812) and magnetometer (m, shown at 813). These same signals are shown in FIG. 21B in a more generalized fashion as orientation matrices (which could be Euler angles or quaternions) from a gyroscope (Ω shown at 811) and an accelerometer and/or magnetometer (R, shown at 812/813). The first step of the process or system computes orientation errors by comparing the estimated orientation 825 with the signals for the orientation signals from the accelerometer 812 and/or magnetometer 813, a step shown at 821. These signals are then multiplied and integrated in in the step shown at 822. This multiplication and integration is the same as the P (proportional) and I (integral) steps in a PID (proportional integral derivative) controller. In the case of a Mahony filter, the derivative information (i.e. angular rate change information) is provided by the gyroscope signals 811 and added to the PI information in the adder shown at 823. The resulting information is integrated and normalized, as shown in step 824, to get an improved estimated orientation 825. This process is repeated as new gyroscope 811, accelerometer 812, and/or magnetometer 813 signals are received.

Figure 22:
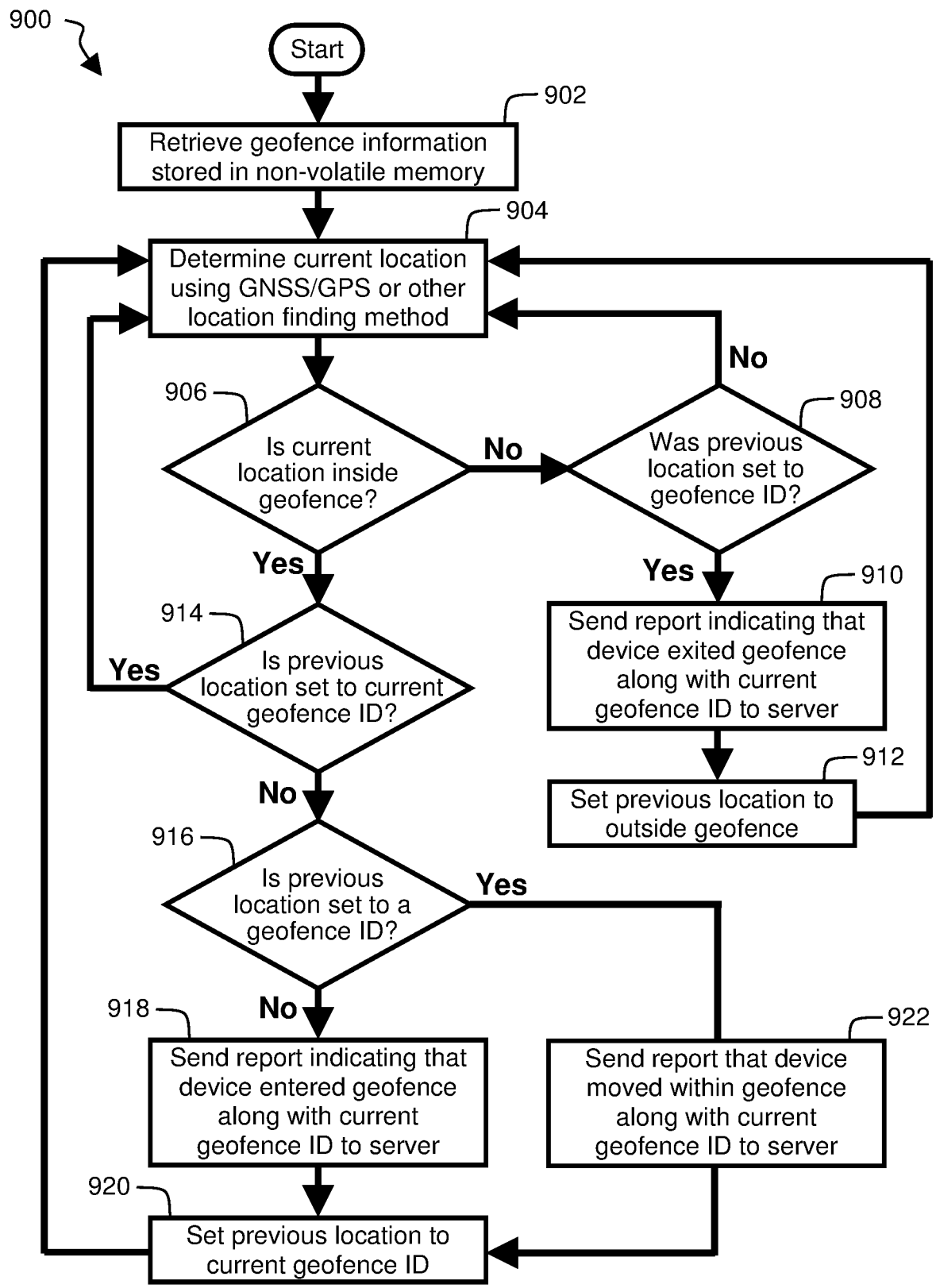
FIG. 22 shows a method for geofencing a movable freight container.

FIG. 22 shows a method for a geofencing a movable freight container (or other device) at 900 The method starts by retrieving geofence information from a non-volatile memory as shown at 902. This stored geofence information specifies the geographical boundaries within which the freight container should be located. The following table provides an example of the types of records and fields that may be used to store geofence information to be within a virtual geographical "fence" that has been established for the freight container. The geofence information can comprise geofence identifiers (IDs) representing different subregions, locations, or zones within the geofence boundaries.

| Geo ID | Zone Type | Radius (meters) | Center Latitude | Center Longitude | Min Latitude | Max Latitude | Min Longitude | Max Longitude |
|---|---|---|---|---|---|---|---|---|
| Geo1 | 0 | 40 | 33.11982 | 35.44262 | 33.11946 | 33.12018 | 35.44219 | 35.44305 |
| Geo2 | 0 | 40 | 33.23110 | 35.40356 | 33.23074 | 33.23146 | 35.40313 | 35.40399 |
| Geo3 | 0 | 40 | 33.80846 | 35.59520 | 33.80810 | 33.80882 | 35.59477 | 35.59563 |
| Geo4 | 1 | 40 | 33.81237 | 35.62788 | 33.81201 | 33.81273 | 35.62744 | 35.62833 |
| Geo5 | 1 | 40 | 33.81252 | 35.62794 | 33.81216 | 33.81288 | 35.62750 | 35.62837 |

Referring to the geofence data table above, the Geo ID (also called a Geozone ID) is an identifier for a geofence record. The Zone Type field can be used to identify the shape of a geozone. In the table above, a zone type of "0" means that the zone is circular and a zone type of "1" means that the zone is rectangular. The Radius field identifies the maximum distance that an object can be away from the center of a geozone and still be in the geozone. In the example table above, this distance is given in meters. The center latitude and center longitude define the center point of the geozone. Min Latitude, Max Latitude, Min Longitude, and Max Longitude define the geographical boundaries of each geozone.

Referring again to FIG. 22, at step 904, the current location of the freight container (or other device) is determined using GNSS, GPS, or some other location finding method. Dead reckoning based on a previous location and motion information since the previous time is one example of an alternate location finding method. Getting location information from terrestrial-based transmitters in known locations using a technique described elsewhere in this document is another example. Next, at step 906, the current location is compared to the geofence information to determine whether the freight container (or other device) is inside the geofence, or physical boundaries of the virtual "fence". The area inside the geofence can also be called the geozone. There could also be multiple geozones with different IDs.

If the result of step 906 is "No", meaning that the current location of the freight container (or other device) is not within the boundaries of the geofence (i.e. not within the geozone or geozones), the method shown in FIG. 22 checks to see if the previous location that was recorded was within the geofence (within a geozone or geozones), a decision box shown at 908. If the result is "No", which means that the freight container (or other device) was outside of the geofence boundaries previously and still outside the geofence boundaries, the method goes back to step 904 to read the current location again, going around this loop until something changes.

If the result of step 908 is "Yes", meaning that the previous location of the freight container (or other device) was within the boundaries of the geofence (i.e. within a geozone or subregion within the geofence) and the current location is outside the boundaries of the geofence (i.e. not within a geozone or subregion within the geofence), a report is sent to a server (or other electronic information receiving apparatus external to this process) to indicate that the freight container (or other device) has exited the geofence boundaries (i.e. has left a geozone), a step shown at 910. In this case, the next step, shown at 912, is to set the previous location to outside the geofence. This condition can generate a geofencing alarm signal and this alarm signal can be transmitted immediately as an exception. The method then goes back to determining the current location, as shown at 904, and will follow the loop from 904 to 906 to 908 to 904 until the current location is inside the geofence boundaries (i.e. in a geozone).

If the result of step 906 is "Yes", meaning that the current location of the freight container (or other device) is within the boundaries of the geofence (i.e. within a geozone or subregion), the method checks to see if the previous location inside the geofence boundaries (geozone or subregion) was the same, as indicated by a geofence ID, a comparison shown at 914. If both the previous geofence ID and the current geofence ID are the same, meaning that the freight container (or other device) has stayed in the same location (geozone or subregion) inside the geofence boundaries, the method goes back to step 904 and determines the current location. The method will loop through 904, 906, and 914 until the freight container (or other device) moves to a different geofence ID (i.e. geozone or subregion).

If the result of the comparison in step 914 determines that the geofence ID has changed (a "No" in step 914), the method then determines whether the previous location was a different geofence ID, which would indicate that the freight container (or other device) has moved from one location within the geofence boundaries (one geozone or subregion) to another location within the geofence boundaries, a comparison shown at step 916. If the result of the comparison in step 916 is "No", it means that the freight container (or other device) was previously outside of the geofence boundaries and is now inside of these boundaries (now inside the geozone). If that is the case, a report is sent to the server (or other electronic information receiving apparatus external to this process) to indicate that the freight container (or other device) has entered the geofence boundaries (i.e. geozone or subregion), a step shown at 918. The previous location is then set to the current geofence ID (i.e. location within the geozone) at step 920 and the process then goes back to step 904 to determine the current location.

If the result of the comparison in step 916 is "Yes", it means that the freight container (or other device) was previously inside of the geofence boundaries and is now also inside of these boundaries (now inside the geozone), but has moved from one location (geozone or subregion) to another location (geozone or subregion) within the geofence boundaries. If that is the case, a report is sent to the server (or other electronic information receiving apparatus external to this process) to indicate that the freight container (or other device) has moved, a step shown at 922. The previous location is then set to the current geofence ID (i.e. location within the geozone) at step 920 and the process then goes back to step 904 to determine the current location.

4. Embodiments Using a Communication Relay Controller

Figure 23:
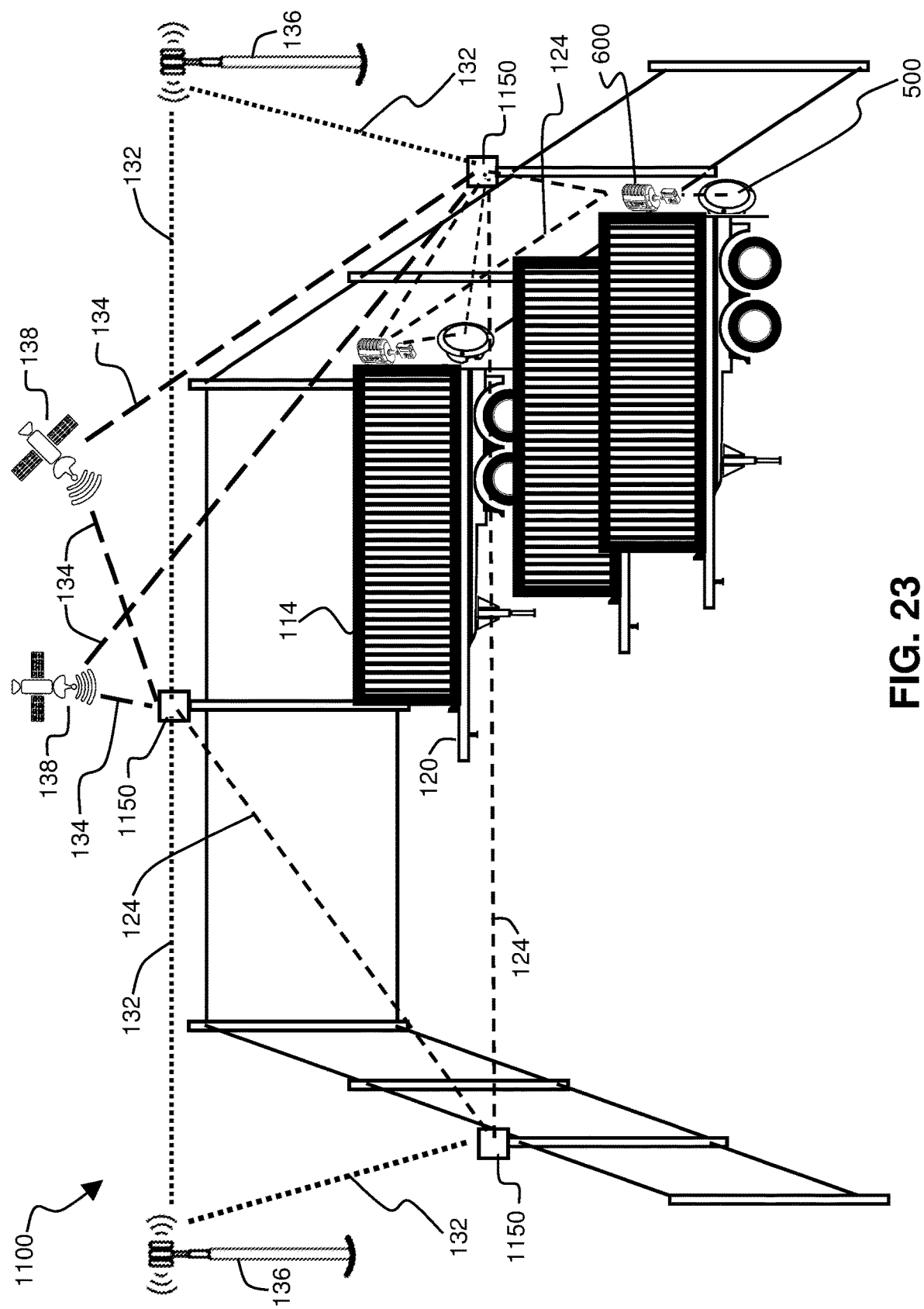
FIG. 23 shows a yard for storing movable freight containers that incorporates an electromagnetic communications relay controller.
Figure 24:
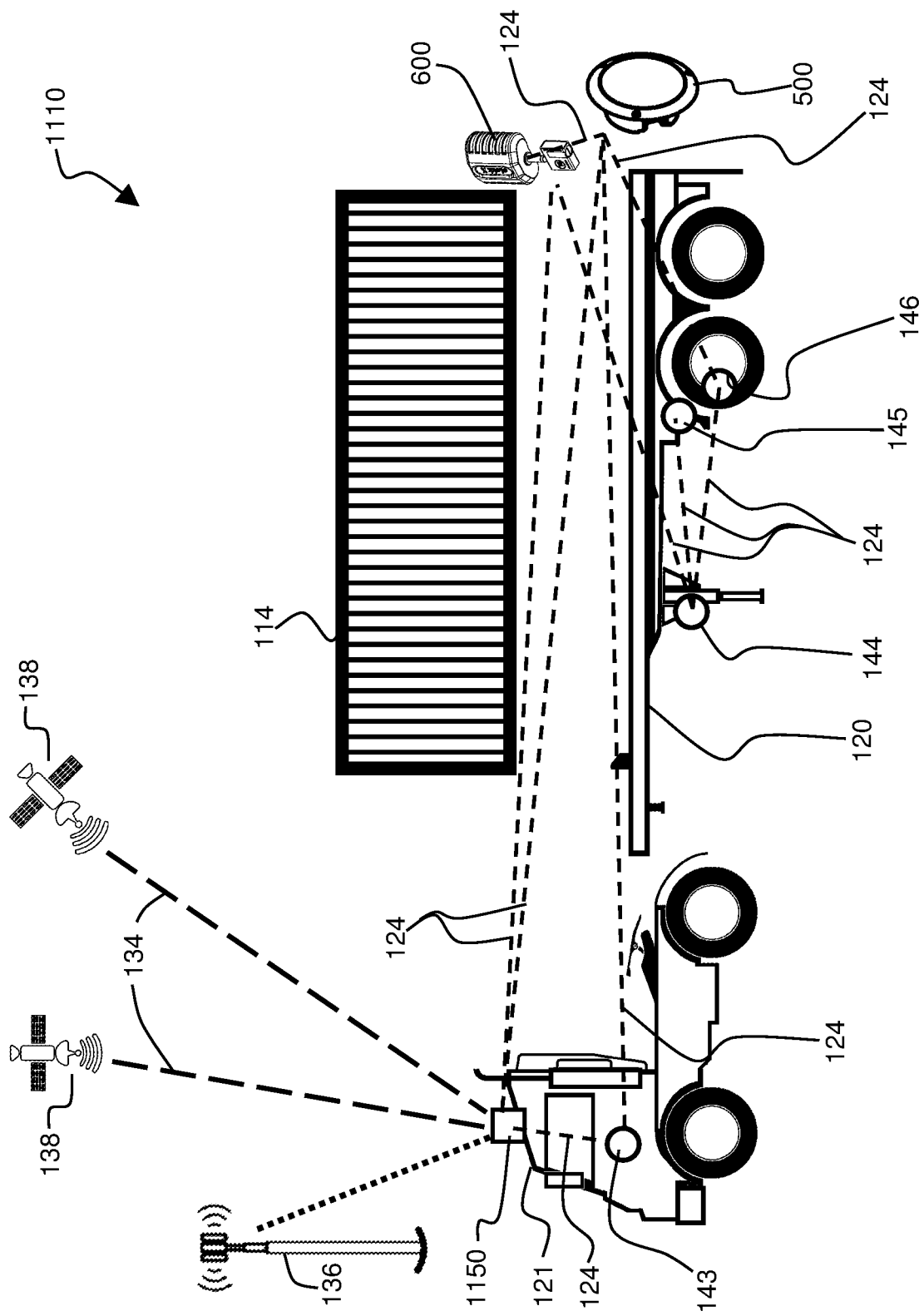
FIG. 24 shows a truck, chassis, and movable freight container system that incorporates an electromagnetic communications relay controller.

A yard for storing movable freight containers shown at 1100 in FIG. 23 and the truck, chassis, and movable freight container system shown at 1110 in FIG. 24 can comprise the following elements:

an electromagnetic wireless communications relay controller (sANT) device, at 1150;
an electronic tracking and/or monitoring device hidden in a vehicle tail light, at 500;
an electronic tracking and/or monitoring lock, shown at 600;
an alternate electronic tracking and/or monitoring lock, shown at 1000 in FIG. 2D;
a movable freight container, shown at 114;
a freight vehicle trailer, shown at 120;
a wireless mesh network communication connection, shown at 124;
a cellular communication tower, shown at 136;
a positioning satellite, shown at 138;
a wireless communication connection, shown at 132; and
a wireless positioning satellite signal reception, shown at 134.

Referring to these elements in FIG. 23 and FIG. 24, the device hidden in a vehicle tail light 500 and electronic lock 600 are fitted to the movable freight container 114. These devices 500 and 600 are in communication with the relay controller 1150 through the wireless mesh network 124. The relay controller or controllers 1150 could be located in a stationary position in the trailer yard, as in FIG. 23, or this controller 1150 (or controllers) could be located on a motor vehicle tractor 121, as shown in FIG. 24. The wireless mesh network 124 can connect multiple devices 500 and 600, and relay controllers 1150 to each other in a redundant mesh network. Since it is difficult for the devices 500 and 600 to receive electrical power while the freight containers 114 are parked in the yard, it is desired that the devices 500 and 600 can operate by drawing the least amount of electrical power possible. The reception of GPS (or other similar positioning satellite) information and the wireless transmission of information to the internet can both consume a lot of electrical power. Thus, the use of a relay controller 1150, that is electrically powered, can significantly reduce power consumption of the devices 500 and 600. The relay controller 1150 can also be placed in a location with a clearer view of cellular communication towers 136 and positioning satellites 138, which are typically at the base of a movable freight container 114 and might be obscured by fences and rooves. Thus, the relay controller 1150 can significantly reduce power consumption for the devices 500 and 600 while improving the ability to determine the position of the movable freight containers 114, and to communicate status information for the movable freight containers to the internet.

In addition the truck, chassis, and movable freight container system 1110 of FIG. 24 comprises:

a motor vehicle tractor, shown at 121;
a CAN bus adapter, shown at 143;
a freight vehicle landing gear sensor and/or communication node, shown at 144;
a freight vehicle braking system sensor and/or communication node, shown at 145; and
a tire sensor and/or communication node, shown at 146.

Referring to these additional elements in FIG. 24, the CAN bus adapter 143, landing gear sensor 144, braking system sensor 145, and tire sensors 146 are configured to communicate with each other through the same mesh network 124 as the vehicle tail light 500 and electronic lock 600.

Figure 25:
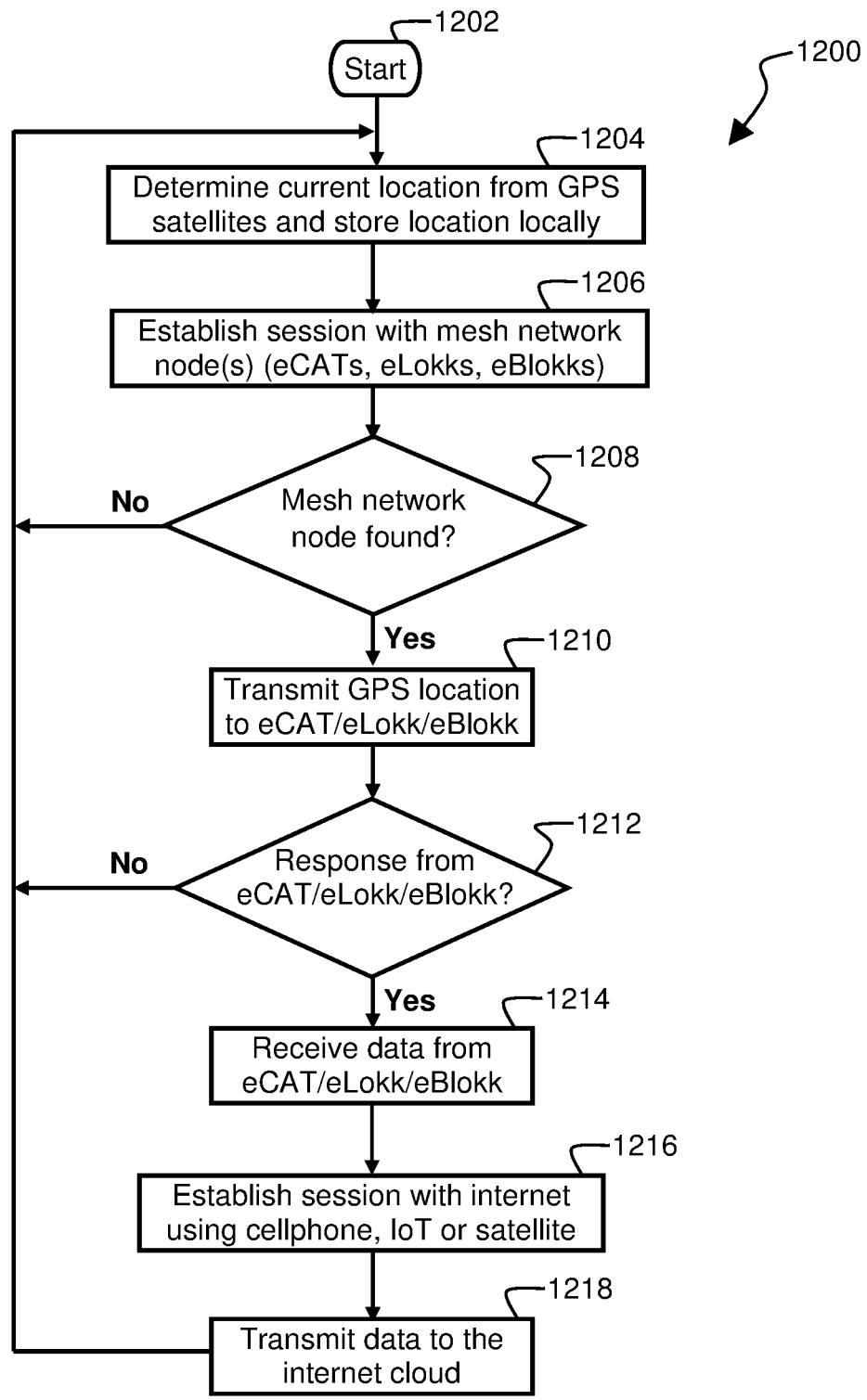
FIG. 25 shows a method for communicating between an electromagnetic communications relay controller and a device attached to a movable freight container when viewed from the electromagnetic communications relay controller.
Figure 26:
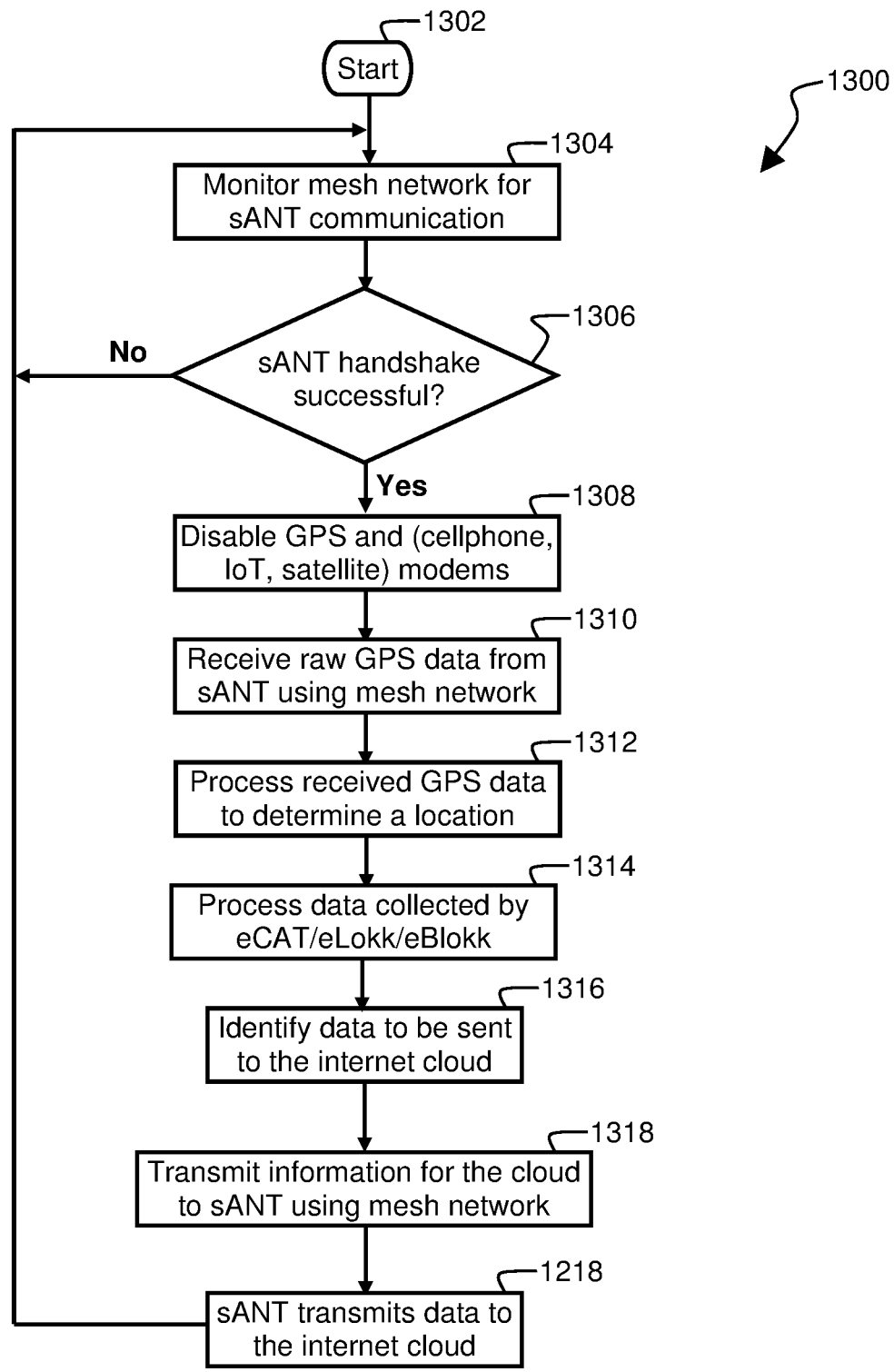
FIG. 26 shows a method for communicating between an electromagnetic communications relay controller and device attached to a movable freight container, when viewed from a device attached to a movable freight container.

One method that can be used for the relay controller (1150 of FIG. 23 and FIG. 24) to communicate with a vehicle tail light (500 in FIG. 23 and FIG. 24), electronic lock (600 in FIG. 23 and FIG. 24), or alternate electronic lock (1000 in FIG. 2D is shown at 1200 in FIG. 25 and at 1300 in FIG. 26. If the chassis 120 and/or container 114 are fitted with the vehicle tail light 500 and/or electronic lock 600, these devices 500 and 600 can have their GPS and Communication modems turned off or can be designed without GPS and cellular communication functionality, saving valuable battery power and potentially device cost. The method shown at 1200 in FIG. 25 in combination with the method shown at 1300 in FIG. 26 can then be used to connect these devices 500 and 600 to the internet. FIG. 3 shows the method 1200 used by the relay controller 1150 and FIG. 26 shows the method 1300 used by the vehicle tail light 500 and/or electronic lock 600.

Referring in detail to the relay controller method shown at 1200 in FIG. 25, the method is initiated at the step shown at 1202. Then, the relay controller method uses an electromagnetic wireless communications relay device, such as the devices shown at 1150 in FIG. 23 and FIG. 24 to determine the current location from satellites (GPS, GNSS, or similar), which is then stored locally, as shown at 1204. Next, communication with a mesh network node (or nodes) is established, as shown at 1206. The mesh network node(s) could be an electronic lock (or locks), such as those shown at 600 in FIG. 24 and other drawings, which can be called eLokks. The mesh network node (or nodes) could be devices hidden in trailer lights, such as the device shown at 500 in FIG. 24 and other drawings, which can be called eCATs. The mesh network node (or nodes) could be electronic tracking and monitoring locks of the type shown at 1000 in FIG. 2D and other drawings, which can be called eBlokks. As shown at branching step 1208, if an eCAT, eLokk, or eBlokk is not found, the process can continue to cycle through updating its GPS position, step 1204, and looking for mesh network nodes, step 1206. If a mesh network node is found, the process can move to step 1210 and transmit the GPS location to the eCAT, eLokk, or eBlokk.

Continuing with the method shown at 1200 in FIG. 25, the relay device can also query for a response from a mesh network node, as shown at branching step 1212. If no response is provided, the method loops back to step 1204. If a mesh network node gives a response, the relay device can receive the data, as shown at step 1214. This can be followed by the relay device establishing communication with the internet using a wireless (or wired) connection such as a cellphone connection, a satellite connection, or an IoT connection using any of the protocols discussed in this document, as shown at 1216. Once the connection is established, the relay device can transmit the location information (from GPS or similar) and the data collected from the mesh network nodes to the internet cloud, as shown at step 1218.

Referring in detail to the method for mesh network nodes to use for communicating with a relay device that is shown at 1300 in FIG. 26, the method is initiated at the step shown at 1302. Then the mesh network node method monitors the mesh network for any communication from the relay device, a step shown at 1304. Note that the relay device can be called an sANT and such a relay device is shown at 1150 in FIG. 23 and FIG. 24. Next, the process branches depending upon whether a handshake to set up communication with the relay device is successful, as shown at step 1306. If communication is not successful, the mesh network node goes back to step 1304 and continues to monitor the network. If communication is successful, the mesh network node can disable its GPS and long distance (cellphone, IoT, and/or satellite) modems, as shown at step 1308. This will greatly reduce power consumption and increase battery live for the mesh network node. Next, the mesh network node can receive raw GPS data from the relay device, as shown at step 1310. It can then process this GPS data (step 1312) to determine location. The mesh network node can also process data that it has collected, as shown at step 1314, and then identify which data should be send to the internet cloud, as shown at step 1316. This data can then be transmitted to the relay device (sANT) using the mesh network, as shown at 1318, for the relay device to transmit to the internet cloud, as shown at step 1218, which was also shown in FIG. 25. Once that's been completed, the mesh network node can continue to monitor the network, as shown at step 1304.

5. Additional Features and Fields of Use

The systems and methods described herein can be used in a variety of applications, including but not limited to:
(a) Monitoring of freight containers in a rail yard;
(b) Monitoring of freight containers on a ship or at a dock;
(c) Monitoring of truck trailers;
(d) Monitoring of delivery trucks;
(e) Monitoring of sealed air cargo containers;
(f) Collecting and forwarding sensor data in a smart chassis configuration;
(g) Acting as a communications node in a yard or traffic environment;
(h) Providing situation awareness in trucks operating in an autonomous driving mode; and
(i) Providing cargo and route information for customs and border control.

A number of variations and modifications of the disclosed embodiments can also be used. While the principles of the disclosure have been described above in connection with specific apparatuses and methods, it is to be clearly understood that this description is made only by way of example and not as limitation on the scope of the disclosure.

What is claimed is:
1. A locking system wherein:
the locking system is configured for secure attachment to a door of a movable freight container;
the system comprises an electronic lock module and a mechanical lock element;
the electronic lock module comprises:
an electronic lock module aperture;
an electronic lock module cavity;
a door handle retention region configured for securing a door handle, wherein the door handle retention region is between the electronic lock module aperture and the electronic lock module cavity; and
a lock mechanism configured for mechanical movement from an unlocked position to a locked position in response to an input device selected from the group of an electric motor and a mechanical key;
the mechanical lock element comprises a mechanical lock element shaft, wherein at least a portion of the mechanical lock element shaft is configured for:
insertion through the electronic lock module aperture;
placement across the door handle retention region in a manner that retains the door handle; and
insertion into the electronic lock module cavity;
the mechanical lock element shaft comprises:
a first magnet; and
a mechanical lock element shaft retaining feature configured for secure retention of the mechanical lock element by the lock mechanism when the mechanical lock element shaft portion is inserted into the electronic lock module cavity and the lock mechanism is in a locked position;
the electronic lock module further comprises a first magnetic field sensor, wherein the first magnetic field sensor is positioned in the electronic module at a location wherein the first magnetic field sensor is responsive to the first magnet during at least part of the insertion path of the mechanical lock element shaft portion into the electronic lock module aperture or the electronic lock module cavity; and
the electronic lock module comprises a processing component and a wireless communication component wherein:
the processing component is responsive to the first magnetic field sensor; and
the wireless communication component is configured for wirelessly communicating first magnetic field sensor information.

2. The locking system of claim 1 wherein:
the first magnetic field sensor is positioned in the electronic lock module at a location wherein the first magnetic field sensor is not responsive to the first magnet when the mechanical lock element shaft portion is positioned for secure retention by the lock mechanism;
the electronic lock module further comprises a second magnetic field sensor;
the second magnetic field sensor is positioned in the electronic lock module in a location wherein the second magnetic field sensor is responsive to the first magnet when the mechanical lock element shaft portion is positioned for secure retention by the lock mechanism;
the processing component generates magnetic field alarm information in response to the first magnetic field sensor and the second magnetic field sensor wherein the alarm signal is selected from the group of:
first magnetic field sensor and the second magnetic field sensor simultaneously detecting a magnetic field; and the first magnetic field sensor and the second magnetic field sensor simultaneously detecting the absence of a magnetic field; and the wireless communication component is configured for wirelessly transmitting the magnetic field alarm information.

3. The locking system of claim 2 wherein:

the mechanical lock element shaft is round;

the mechanical lock element retaining feature comprises a circular groove in the mechanical lock element shaft portion; and the lock mechanism comprises a lock cylinder and a plurality of lock pins.

4. The locking system of claim 3 wherein:

the electronic lock module is attached to the door of the movable freight container using metal fasteners through the door;

the locking system is a locking system for the door of a cargo trailer;

the door handle retention region is between the mechanical lock element and the door of the movable freight container;

the electronic lock module further comprises a door handle detection sensor wherein the door handle detection sensor is configured for detecting the presence of a door handle attached to the door of the cargo trailer using a sensor selected from the group of an inductive sensor, a capacitive sensor, an ultrasonic sensor and an optical sensor;

the electronic lock module further comprises a mechanical lock element keeper wherein the mechanical lock element keeper is configured for engagement with the circular groove in the mechanical lock element shaft portion;

mechanical movement from a locked position to an unlocked position comprises the rotation of the mechanical key in the lock cylinder; and the lock cylinder is oriented perpendicularly to the orientation of the mechanical lock element shaft.

5. The locking system of claim 1 wherein:

the mechanical lock element shaft portion further comprises a second magnet;

the electronic lock module further comprises a second magnetic field sensor and a third magnetic field sensor;

the first magnetic field sensor is responsive to the position of the mechanical lock element shaft portion, the position of the first magnet, and the position of the second magnet;

the second magnetic field sensor is responsive to the position of the mechanical lock element shaft portion, the position of the first magnet, and the position of the second magnet;

the third magnetic field sensor is responsive to the position of the mechanical lock element shaft position and the position of the third magnet; and the processing component is configured for generating magnetic field alarm information if the processing component detects an unexpected magnetic field sensor reading in response to the first magnetic field sensor, the second magnetic field sensor, and the third magnetic field sensor.

6. The locking system of claim 1 wherein:

the electronic lock module comprises an inertial measurement component for determining inertial information wherein:

the inertial measurement component further comprises a 3-axis accelerometer, a 3-axis gyroscope, and a 3-axis magnetometer; and the determination of inertial information comprises the use of a fusion filter wherein:

the fusion filter is selected from the group of a Kalman filter, a Madgwick filter, and a Mahony filter; and the fusion filter calculation is responsive to four digital quaternions;

the electronic lock module wireless communication component is configured for wirelessly transmitting the inertial information;

the electronic lock module is configured for determining geographic position information wherein the geographic position information comprises the geographic position of the locking system at a current time;

the electronic module comprises a first positioning component wherein the first positioning component is responsive to information received from a plurality of global navigation system satellite transmitters;

the electronic module comprises a second positioning component wherein the second positioning component is responsive to:

information of the geographic position of the locking system at a previous time; and inertial information from the inertial measurement component;

the locking system geographic information is responsive to the first positioning component if current information is available from the first positioning component;

the locking system geographic information is responsive to the second positioning component if current information is not available from the first positioning component;

the electronic lock module wireless communication component is configured for wirelessly transmitting the locking system geographic position;

the electronic lock module wireless communication component comprises a cellular wireless communications system transmitter comprising a subscriber identity module wherein the wireless communication transmitter is configured for sending the inertial information, and the geographic position information using a cellular communications frequency and cellular communications protocol;

the electronic lock module wireless communication component further comprises a wireless mesh network communication element wherein the wireless mech network communication element is configured for transmitting the inertial information, and the geographic position information using a wireless communication protocol selected from the group of WiFi, Zigbee and Xbee; and the locking system comprises a database connected to the internet wherein the database is configured to receive and store the first magnetic field sensor information, the inertial information, and the geographic position information from the electronic lock module wireless communication component.

7. The locking system of claim 1 wherein:

the first magnetic field sensor comprises a sensor selected from the group of:

a reed switch;

a Hall effect sensor; and a magnetoresistance sensor.

8. The locking system of claim 1 wherein:
the first magnetic field sensor comprises a Reed switch configured to close a first electrical circuit in the presence of a magnetic field and open the first electrical circuit in the absence of a magnetic field.

9. The locking system of claim 1 wherein:
the mechanical lock module further comprises the electric motor;
the electric motor is configured for moving the lock mechanism from an unlocked position to a locked position in response to an input received from device selected from the group of:
  a near field communications device; and
  a Bluetooth communications device.

10. The locking system of claim 1 wherein:
the first magnet is located in the mechanical lock mechanism lock element shaft portion in an orientation where the first magnet magnetic north-south pole axis is perpendicular to the axis of the mechanical lock element shaft; and
the mechanical lock element shaft further comprises a mechanical lock pin shaft orientation feature configured to prevent rotation of the mechanical lock element shaft 1014 in the electronic lock module.

11. The locking system of claim 1 wherein:
the first magnet is located in the mechanical lock mechanism lock element shaft portion in an orientation where the first magnet magnetic north-south pole axis is parallel to the axis of the mechanical lock element shaft.

12. The locking system of claim 1 wherein:
the mechanical lock element shaft portion comprises a circular cross section;
the first magnet comprises a hollow cylindrical shape;
one pole of the first magnet is located on the cylindrical exterior surface of the hollow cylindrical shape;
the other pole of the first magnet is located on the cylindrical interior surface of the hollow cylindrical shape; and
the center of the hollow cylindrical shape is aligned with the center of the mechanical lock element circular cross section.

13. The locking system of claim 1 wherein:
the electronic lock module is configured for determining geographic position information wherein the geographic position information comprises the geographic position of the locking system at a current time;
the electronic lock module wireless communication component is configured for wirelessly transmitting the locking system geographic position;
the locking system comprises a database connected to the internet wherein the database is configured to receive and store the geographic position information from the electronic lock module wireless communication component;
the locking system comprises non-volatile electronic memory configured for storing geographic boundary information comprising:
  an identifier field;
    a geozone type field;
    a center point latitude;
    a center point longitude; and
    a geozone radius; and
the locking system is configured for:
  determining whether the geographic position information indicates that the movable freight container is outside a region defined by the geographic boundary information; and
  initiating a geofencing alarm signal when the geographic position information indicates that the movable freight container is outside of a region defined by the geographic boundary information.

14. The locking system of claim 1 wherein:
the locking system is a locking system for the door of a cargo trailer;
the door handle retention region is between the mechanical lock element and the door of the movable freight container; and
the electronic lock module further comprises a mechanical lock element keeper wherein the mechanical lock element keeper is configured to hold the mechanical lock element in a position that allows the door handle to be rotated into the door handle retention region.

15. A lock, wherein:
the lock is configured for secure attachment to a door of a movable freight container;
the lock comprises an electronic module and a removable pin;
the removable pin comprises a shaft and a first magnet;
the electronic module comprises:
  a through hole;
  an annular receptacle;
  a door handle retention region located between the through hole and the annular receptacle;
  a lock mechanism for securely retaining the removable pin in the electronic module;
  a first magnetic field sensor wherein the first magnetic field sensor is positioned in the electronic module at a location where the first magnetic field sensor is responsive to the first magnet during at least part of the path of insertion of the shaft into the through hole, across the door handle retention region, and into the annular receptacle;
  a processing component wherein the processing component is responsive to the first magnetic field sensor; and
  a wireless communication component configured for wirelessly transmitting first magnetic field sensor information.

16. The lock of claim 15, wherein:
the first magnetic field sensor is positioned in the electronic module at a location wherein the first magnetic field sensor is not responsive to the first magnet when the shaft is securely retained by the lock mechanism;
the electronic module further comprises a second magnetic field sensor;
the second magnetic field sensor is positioned in the electronic lock module in a location wherein the second magnetic field sensor is responsive to the first magnet when the shaft is positioned for secure retention by the lock mechanism;
the processing component generates magnetic field alarm information in response to the first magnetic field sensor and the second magnetic field sensor wherein the alarm signal is selected from the group of:
  first magnetic field sensor and the second magnetic field sensor simultaneously detecting a magnetic field; and the first magnetic field sensor and the second magnetic field sensor simultaneously detecting the absence of a magnetic field; and the wireless communication component is configured for wirelessly transmitting the magnetic field alarm information.

17. The lock of claim 15, wherein:

the electronic module is attached to the door of the movable freight container using metal fasteners through the door;

the door handle retention region is configured for securing the handle of the movable freight container door;

the door handle retention region comprises a slot in the electronic module between the through hole and the annular receptacle;

the door handle retention region is between the removable pin and the freight container door when the lock is in use;

the wireless communication component is configured for wirelessly transmitting information to an electronic device located on the movable freight container using a wireless mesh protocol selected from the group of WiFi, Zbee, and Zigbee.

18. The lock of claim 15, wherein:

the electronic module further comprises a door handle detection sensor; and the door handle detection sensor is configured for detecting the presence of a handle attached to the door of the movable freight container using a sensor selected from the group of an inductive sensor, a capacitive sensor, an ultrasonic sensor and an optical sensor.

19. The lock of claim 15, wherein:

the shaft comprises a non-magnetic stainless steel;

the shaft is round;

the shaft comprises a retaining feature configured for secure retention of the pin by the lock mechanism; and the retaining feature comprises a circular groove in the shaft.

20. A locking method comprising the steps of:

establishing an electronic module that comprises:
   a hole;
   a cavity;
   a door handle retention region located between the hole and the cavity;
   a lock mechanism;
   a magnetic field sensor;
   a processing component; and
   a wireless communication component;

wherein the electronic module is configured for secure attachment to the door of a movable freight container;

placing a pin that comprises a shaft and a magnet:
   through the hole;
   across the door handle retention region; and
   into the cavity;

using the lock mechanism to retain the pin;

using the magnetic field sensor to detect the magnet when the pin travels through the hole, across the door handle region, or into the cavity; and using the processing component and the wireless communication component to wirelessly transmit magnetic field sensor information.

\* \* \* \* \*